US012260815B2

(12) United States Patent
Mou

(10) Patent No.: US 12,260,815 B2
(45) Date of Patent: Mar. 25, 2025

(54) DISPLAY PANEL AND DISPLAY DEVICE FOR PROLONGING LIFESPANS OF PIXELS

(71) Applicants: Chengdu BOE Optoelectronics Technology Co., Ltd., Sichuan (CN); BOE Technology Group Co., Ltd., Beijing (CN)

(72) Inventor: Xin Mou, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/795,883

(22) PCT Filed: Aug. 24, 2021

(86) PCT No.: PCT/CN2021/114387
§ 371 (c)(1),
(2) Date: Jul. 28, 2022

(87) PCT Pub. No.: WO2023/023957
PCT Pub. Date: Mar. 2, 2023

(65) Prior Publication Data

US 2024/0296791 A1 Sep. 5, 2024

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0842* (2013.01);
(Continued)

(58) Field of Classification Search
CPC combination set(s) only.
See application file for complete search history.

(56) References Cited

U.S. PATENT DOCUMENTS

2014/0292822 A1 10/2014 Lee et al.
2021/0056894 A1* 2/2021 Yang .................... G09G 3/2014
(Continued)

FOREIGN PATENT DOCUMENTS

CN 108364982 A 8/2018
CN 108922477 A 11/2018
(Continued)

OTHER PUBLICATIONS

Office Action dated Jan. 27, 2025 for Chinese Patent Application No. 202180002268.7 and English Translation.

*Primary Examiner* — Rodney Amadiz
(74) *Attorney, Agent, or Firm* — Ling Wu; Stephen Yang; Ling and Yang Intellectual Property

(57) ABSTRACT

A display panel includes a display area and a non-display area, wherein the display area includes pixel units arranged in array, at least one of the pixel units includes a sub-pixel of a first color, a sub-pixel of a second color and a sub-pixel of a third color, the first color, the second color and the third color are different colors, at least one sub-pixel includes a pixel circuit and a light emitting element, and the pixel circuit is connected to an anode of the light emitting element; the non-display area includes an anode voltage driving circuit connected to a sub-pixel and configured to provide an anode voltage control signal to a pixel circuit of the connected sub-pixel to provide a voltage signal to the anode of the light emitting element.

19 Claims, 32 Drawing Sheets

(52) U.S. Cl.
CPC ............... *G09G 2310/0286* (2013.01); *G09G 2310/061* (2013.01); *G09G 2310/08* (2013.01)

(56) References Cited

U.S. PATENT DOCUMENTS

| | | | | |
|---|---|---|---|---|
| 2021/0142725 | A1* | 5/2021 | Yu ........................ | G09G 3/3233 |
| 2022/0208874 | A1 | 6/2022 | Zhang et al. | |
| 2022/0310007 | A1* | 9/2022 | Zhou .................... | G09G 3/3233 |
| 2022/0335894 | A1* | 10/2022 | Zhou .................... | G09G 3/3266 |

FOREIGN PATENT DOCUMENTS

| | | | |
|---|---|---|---|
| CN | 109410843 | B | 7/2020 |
| CN | 111696486 | A | 9/2020 |
| CN | 111754922 | A | 10/2020 |
| CN | 112037715 | A | 12/2020 |
| CN | 112687237 | A | 4/2021 |
| CN | 112951160 | A | 6/2021 |

* cited by examiner

DISPLAY PANEL AND DISPLAY DEVICE FOR PROLONGING LIFESPANS OF PIXELS

CROSS-REFERENCE TO RELATED APPLICATION

This application is a national stage application of PCT Application No. PCT/CN2021/114387, which is filed on Aug. 24, 2021 and entitled "Display Panel and Display Device", the content of which is incorporated herein by reference in its entirety.

TECHNICAL FIELD

Embodiments of the present disclosure relate to, but are not limited to, the field of display technologies, and more particularly, to a display panel and a display device.

BACKGROUND

Organic light emitting diodes (OLEDs) and quantum-dot light emitting diodes (QLEDs), which are active light emitting display devices, have advantages such as self-luminescence, wide angle of view, high contrast, low power consumption, extremely high response speed, lightness and thinness, bendability, low cost, etc. With the continuous development of display technologies, flexible displays that use OLEDs or QLEDs as light emitting elements and control signals by thin film transistors (TFTs) have become mainstream products in the field of display at present.

SUMMARY

The following is a summary of subject matters described herein in detail. The summary is not intended to limit the protection scope of the claims.

In a first aspect, the present disclosure provides a display panel including a display area and a non-display area, wherein the display area includes pixel units arranged in array, at least one of the pixel units includes a sub-pixel of a first color, a sub-pixel of a second color and a sub-pixel of a third color, the first color, the second color and the third color are different colors, at least one sub-pixel includes a pixel circuit and a light emitting element, and the pixel circuit is connected to an anode of the light emitting element; the non-display area includes an anode voltage driving circuit connected to a sub-pixel and configured to provide an anode voltage control signal to a pixel circuit of the connected sub-pixel to provide a voltage signal to the anode of the light emitting element;

the anode voltage driving circuit includes K anode voltage driving sub-circuits arranged along a row direction; and each of the anode voltage driving sub-circuits is connected to sub-pixels of at least one color, and different anode voltage driving sub-circuits are connected to sub-pixels of different colors, K being a positive integer greater than or equal to 2.

In some possible implementations, the display area further includes 3N column of data signal lines, M rows of scan signal lines, M rows of reset signal lines and M rows of initial voltage lines, wherein M is the total number of rows of pixel units and N is the total number of columns of pixel units;

the pixel circuit includes a first transistor to a seventh transistor and a storage capacitor;

a control electrode of the first transistor is connected to a reset signal terminal, a first electrode of the first transistor is connected to an initial voltage terminal, a second electrode of the first transistor is connected to a second node, a control electrode of the second transistor is connected to a scan signal terminal, a first electrode of the second transistor is connected to the second node, and a second electrode of the second transistor is connected to a third node; a control electrode of the third transistor is connected to the second node, a first electrode of the third transistor is connected to a first node, and a second electrode of the third transistor is connected to the third node; a control electrode of the fourth transistor is connected to the scan signal terminal, a first electrode of the fourth transistor is connected to a data signal terminal, and a second electrode of the fourth transistor is connected to the first node; a control electrode of the fifth transistor is connected to a light emitting signal terminal, a first electrode of the fifth transistor is connected to a first power terminal, and a second electrode of the fifth transistor is connected to the first node; a control electrode of the sixth transistor is connected to the light emitting signal terminal, a first electrode of the sixth transistor is connected to the third node, and a second electrode of the sixth transistor is connected to the light emitting element; a control electrode of the seventh transistor is connected to an anode voltage control terminal, a first electrode of the seventh transistor is connected to an anode voltage signal terminal, a second electrode of the seventh transistor is connected to the anode of the light emitting element, a first end of the storage capacitor is connected to the first power terminal, and a second end of the storage capacitor is connected to the second node; and for a pixel circuit of a sub-pixel in row i and column j, the data signal terminal is connected to a data signal line in column j, the scan signal terminal is connected to a scan signal line in row i, the reset signal terminal is connected to a reset signal line in row i, and the initial voltage terminal is connected to an initial voltage line in row i, $1 \le i \le M$, $1 \le j \le 3N$.

In some possible implementations, when K=2, the K anode voltage driving sub-circuits are respectively a first anode voltage driving sub-circuit and a second anode voltage driving sub-circuit; the first anode voltage driving sub-circuit includes M cascaded first anode voltage driving shift registers, and the second anode voltage driving sub-circuit includes M cascaded second anode voltage driving shift registers; the display area further includes 2M rows of anode voltage control lines and 2M rows of anode voltage signal lines;

an anode voltage control line in row 2i-1 is connected to a first anode voltage driving shift register at stage i, and is connected to anode voltage control terminals of pixel circuits of sub-pixels of the first color and sub-pixels of the second color located in row i;

an anode voltage control line in row 2i is connected to a second anode voltage driving shift register at stage i, and is connected to anode voltage control terminals of pixel circuits of sub-pixels of the third color located in row i;

an anode voltage signal line in row 2i-1 is connected to anode voltage signal terminals of the pixel circuits of the sub-pixels of the first color and the sub-pixels of the second color located in row i; and an anode voltage signal line in row 2i is connected to anode voltage signal terminals of pixel circuits of sub-pixels of the third color located in row i.

In some possible implementations, when K=3, the K anode voltage driving sub-circuits are respectively a first anode voltage driving sub-circuit, a second anode voltage driving sub-circuit and a third anode voltage driving sub-circuit; the first anode voltage driving sub-circuit includes M cascaded first anode voltage driving shift registers, the second anode voltage driving sub-circuit includes M cascaded second anode voltage driving shift registers, and the third anode voltage driving sub-circuit includes M cascaded third anode voltage driving shift registers; the display area further includes 3M rows of anode voltage control lines and 3M rows of anode voltage signal lines;

an anode voltage control line in row 3i-2 is connected to the first anode voltage driving shift register at stage i, and is connected to the anode voltage control terminals of the pixel circuits of the sub-pixels of the first color located in row i;

an anode voltage control line in row 3i-1 is connected to the second anode voltage driving shift register at stage i, and is connected to the anode voltage control terminals of the pixel circuits of the sub-pixels of the second color located in row i;

an anode voltage control line in row 3i is connected to a third anode voltage driving shift register at stage i, and is connected to the anode voltage control terminals of the pixel circuits of the sub-pixels of the third color located in row i;

an anode voltage signal line in row 3i-2 is connected to the anode voltage signal terminals of the pixel circuits of the sub-pixels of the first color located in row i;

an anode voltage signal line in row 3i-1 is connected to the anode voltage signal terminals of the pixel circuits of the sub-pixels of the second color located in row i; and an anode voltage signal line in row 3i is connected to the anode voltage signal terminals of the pixel circuits of the sub-pixels of the third color located in row i.

In some possible implementations, when the sub-pixels are displayed, a driving mode of each sub-pixel includes a first driving mode, a second driving mode and a third driving mode;

when the driving mode of the sub-pixel is the first driving mode, the pixel circuit is configured to apply a driving current to the light emitting element continuously;

when the driving mode of the sub-pixel is the second driving mode, the pixel circuit is configured to apply a driving current to the light emitting element periodically, and stop applying the driving current during a time interval between any two adjacent applications of the driving current;

when the driving mode of the sub-pixel is the third driving mode, the pixel circuit is configured to apply a driving current to the light emitting element periodically, and to provide a negative bias voltage signal to the anode of the light emitting element during a time interval between any two adjacent applications of the driving current to cause the light emitting element not to emit light; and driving modes of sub-pixels connected to the same anode voltage driving shift register are the same.

In some possible implementations, when K=2, the driving modes of a sub-pixel of the first color and a sub-pixel of the second color are the same; the driving modes of the sub-pixel of the first color and the sub-pixel of the third color are different or the same; and when the driving modes of the sub-pixel of the first color and the sub-pixel of the third color located in row i are the same, a second duty cycle of an anode voltage control signal outputted by the first anode voltage driving shift register at stage i is different from a second duty cycle of an anode voltage control signal outputted by the second anode voltage driving shift register at stage i, and/or a voltage of a signal provided from the anode voltage signal line in row 2i-1 is different from a voltage of a signal provided from the anode voltage signal line in row 2i, wherein the second duty cycle is a ratio of a duration in which the anode voltage control signal is an inactive-level signal to second time, and the second time is the sum of the duration in which the anode voltage control signal is the inactive-level signal and a duration in which the anode voltage control signal is an active-level signal.

In some possible implementations, when K=3, the driving modes of at least two of a sub-pixel of the first color, a sub-pixel of the second color and a sub-pixel of the third color are different or the driving modes of the sub-pixel of the first color, the sub-pixel of the second color and the sub-pixel of the third color are the same; and when the driving modes of the sub-pixels of the three colors located in row i are the same, second duty cycles of at least two of anode voltage control signals outputted by the first anode voltage driving shift register at stage i, the second anode voltage driving shift register at stage i and the third anode voltage driving shift register at stage i are different, and/or voltages of at least two of signals provided from the anode voltage signal line in row 3i-2, the anode voltage signal line in row 3i-1 and the anode voltage signal line in row 3i are different, wherein the second duty cycle is a ratio of a duration in which the anode voltage control signal is an inactive-level signal to second time, and the second time is the sum of the duration in which the anode voltage control signal is the inactive-level signal and a duration in which the anode voltage control signal is an active-level signal.

In some possible implementations, when the driving mode of the sub-pixel is the second driving mode or the third driving mode, a frequency at which the pixel circuit applies the driving current to the light emitting element is about 1 Hz to 360 Hz.

In some possible implementations, the non-display area further includes a scan driving circuit, a reset driving circuit and a light emitting driving circuit;

the scan driving circuit is connected to a sub-pixel and configured to provide a scan control signal to a pixel circuit of the connected sub-pixel to provide a data signal to the first node, the reset driving circuit is connected to a sub-pixel and configured to provide a reset control signal to a pixel circuit of the connected sub-pixel to reset the second node, and the light emitting driving circuit is connected to a sub-pixel and configured to provide a light emitting control signal to a pixel circuit of the connected sub-pixel to provide a driving current to the light emitting element;

the light emitting driving circuit is located at one side of the display area, the scan driving circuit is located at one side of the light emitting driving circuit close to the display area, and the anode voltage driving circuit and the reset driving circuit are respectively located between the light emitting driving circuit and the scan driving circuit and between the scan driving circuit and the display area;

the scan driving circuit includes M cascaded scan shift registers, a scan shift register at stage i being connected to the scan signal line in row i; and the reset driving circuit includes M cascaded reset shift registers, a reset shift register at stage i being connected to a reset signal line in row i.

In some possible implementations, the light emitting driving circuit includes M cascaded first light emitting shift registers, and the display area further includes M rows of light emitting signal lines; and a light emitting signal line in row i is connected to a first light emitting shift register at stage i, and is connected to light emitting signal terminals of all sub-pixels located in row i.

In some possible implementations, the light emitting driving circuit includes K light emitting driving sub-circuits arranged along the row direction;

when K=2, the K light emitting driving sub-circuits are respectively a first light emitting driving sub-circuit and a second light emitting driving sub-circuit; the first light emitting driving sub-circuit includes M cascaded first light emitting shift registers, and the second light emitting driving sub-circuit includes M cascaded second light emitting shift registers; the display area further includes 2M rows of light emitting signal lines;

a light emitting signal line in row 2i-1 is connected to a first light emitting shift register at stage i, and is connected to light emitting signal terminals of the pixel circuits of the sub-pixels of the first color and the sub-pixels of the second color located in row i;

a light emitting signal line in row 2i is connected to a second light emitting shift register at stage i, and is connected to light emitting signal terminals of the pixel circuits of the sub-pixels of the third color located in row i;

a first duty cycle of a light emitting control signal outputted by the first light emitting shift register at stage i is different from a first duty cycle of a light emitting control signal outputted by the second light emitting shift register at stage i, wherein the first duty cycle is a ratio of a duration in which the light emitting control signal is an active-level signal to first time, and the first time is the sum of a duration in which the light emitting control signal is an inactive-level signal to the duration in which the light emitting control signal is the active-level signal;

when K=3, the K light emitting driving sub-circuits are respectively a first light emitting driving sub-circuit, a second light emitting driving sub-circuit and a third light emitting driving sub-circuit; the first light emitting driving sub-circuit includes M cascaded first light emitting shift registers, the second light emitting driving sub-circuit includes M cascaded second light emitting shift registers, and the third light emitting driving sub-circuit includes M cascaded third light emitting shift registers; the display area further includes 3M rows of light emitting signal lines;

a light emitting signal line in row 3i-2 is connected to a first light emitting shift register at stage i, and is connected to light emitting signal terminals of the pixel circuits of the sub-pixels of the first color located in row i;

a light emitting signal line in row 3i-1 is connected to a second light emitting shift register at stage i, and is connected to light emitting signal terminals of the pixel circuits of the sub-pixels of the second color located in row i;

a light emitting signal line in row 3i is connected to a third light emitting shift register at stage i, and is connected to light emitting signal terminals of the pixel circuits of the sub-pixels of the third color located in row i; and first duty cycles of light emitting control signals outputted by the first light emitting shift register at stage i, the second light emitting shift register at stage i and the third light emitting shift register at stage i are different.

In some possible implementations, the sum of the first duty cycle and the second duty cycle is less than 1; and the first duty cycle is about 30% to 99%.

In some possible implementations, a value of the voltage of the signal provided from the anode voltage signal line is about −0.1 volts to −10 volts, and the value of the voltage of the voltage signal provided from the anode voltage signal line is less than a reverse breakdown voltage of the light emitting element.

In some possible implementations, for the pixel circuit of each sub-pixel, when signals of the light emitting signal terminal are active-level signals, signals of the anode voltage control terminal are inactive-level signals, and when the signals of the anode voltage control terminal are active-level signals, the signals of the light emitting signal terminal are inactive-level signals; a duration in which the signals of the light emitting signal terminal are the inactive-level signal is greater than a duration in which the signals of the anode voltage control terminal are the active-level signal.

In some possible implementations, the anode voltage driving shift register includes M1 bias transistors and M2 bias capacitors, and the anode voltage driving shift register includes a first anode voltage driving shift register, a second anode voltage driving shift register or a third anode voltage driving shift register;

the light emitting shift register includes M3 light emitting transistors and M4 light emitting capacitors, and the light emitting shift register includes a first light emitting shift register, a second light emitting shift register or a third light emitting shift register;

each scan shift register includes M5 scan transistors and M6 scan capacitors; each reset shift register includes M5 reset transistors and M6 reset capacitors; a way to connect the M5 scan transistors with the M6 scan capacitors is the same as a way to connect the M5 reset transistors with the M6 reset capacitors, wherein M3 is not equal to M5 and M4 is not equal to M6;

M1 and M2 satisfy: M1=M5 and M2=M6 or M1=M3 and M2=M4;

when M1=M5 and M2=M6, a way to connect the M1 bias transistors with the M2 bias capacitors is the same as the way to connect the M5 scan transistors with the M6 scan capacitors; and when M1=M3 and M2=M4, the way to connect the M1 bias transistors with the M2 bias capacitors is the same as a way to connect the M3 light emitting transistors with the M4 light emitting capacitors.

In some possible implementations, for each sub-pixel, when M1=M3 and M2=M4, a difference between the duration in which the signals of the light emitting signal terminal are the inactive-level signals and the duration in which the signals of the anode voltage control terminal are the active-level signals is less than a threshold time difference, and the duration in which the signals of the anode voltage control terminal are the active-level signals is greater than a duration in which signals of the scan signal terminal are active-level signals.

In some possible implementations, for each sub-pixel, when M1=M5 and M2=M6, a difference between the duration in which the signals of the light emitting signal terminal are the inactive-level signals and the duration in which the signals of the anode voltage control terminal are the active-level signals is greater than the threshold time difference, and the duration in which the signals of the anode voltage control terminal are the active-level signals is equal to the duration in which the signals of the scan signal terminal are active-level signals.

In some possible implementations, the non-display area further includes a timing controller; an image displayed by the display panel includes N frames;

the timing controller is configured to provide a driving signal to a driving circuit to cause the same sub-pixel to implement switching between different driving modes within different frames; and the driving circuits include the anode voltage driving circuit, the light emitting driving circuit, the scan driving circuit and the reset driving circuit.

In second aspect, the present disclosure further provides a display device including the display panel described above.

After the drawings and the detailed description are read and understood, the other aspects may become clear.

BRIEF DESCRIPTION OF DRAWINGS

The drawings are intended to provide a understanding of the present disclosure and form a part of the specification, and are used to explain technical schemes of the present disclosure together with embodiments of the present disclosure, and not intended to form limitations to the technical schemes of the present disclosure.

DETAILED DESCRIPTION

Figure 1:
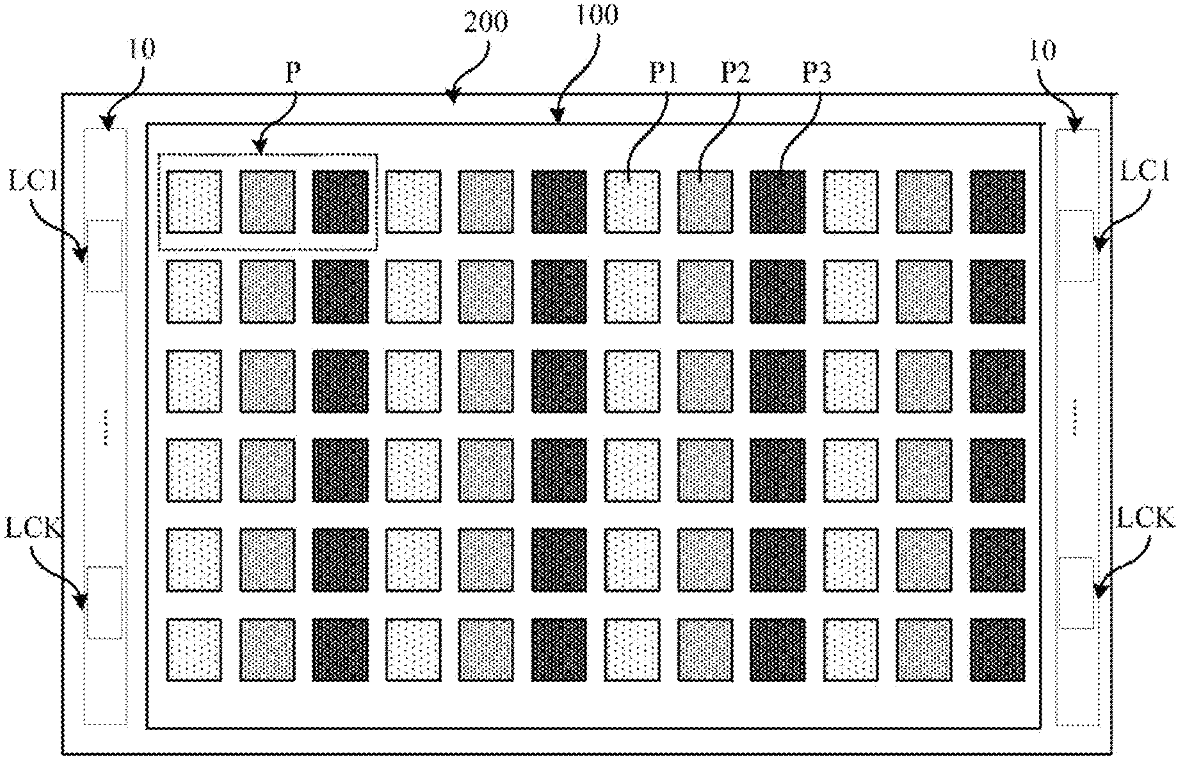
FIG. 1 is a schematic structural diagram of a display panel in accordance with an embodiment of the present disclosure.

In order to make objects, technical schemes and advantages of the present disclosure more clear, embodiments of the present disclosure will be described below in detail in combination with the drawings. It should be noted that implementations may be implemented in a number of different forms. Those of ordinary skills in the art may readily understand the fact that implementations and contents may be transformed into various forms without departing from the purpose and scope of the present disclosure. Therefore, the present disclosure should not be interpreted as being limited to the contents recorded in following implementations only. The embodiments in the present disclosure and features in the embodiments can be arbitrarily combined with each other without conflicts.

Sometimes for the sake of clarity, the sizes of various constituent elements, the thicknesses of layers or regions in the drawings may be exaggerated. Therefore, one implementation of the present disclosure is not necessarily limited to the sizes, and the shapes and sizes of various components in the drawings do not reflect the true proportion. In addition, the drawings schematically illustrate ideal examples, and one implementation of the present disclosure is not limited to the shapes or numerical values shown in the drawings.

Ordinal numerals such as “first”, “second”, “third” and the like in the specification are set to avoid confusion of the constituent elements, but not to set a limit in quantity.

For convenience, the terms such as “middle”, “upper”, “lower”, “front”, “back”, “vertical”, “horizontal”, “top”, “bottom”, “inside”, “outside” and the like indicating orientation or position relationships are used in the specification to illustrate position relationships between the constituent elements with reference to the drawings, and are intended to facilitate description of the specification and simplification of the description, but not to indicate or imply that the mentioned device or element must have a specific orientation or be constructed and operated in a specific orientation, therefore, they should not be understood as limitations to the present disclosure. The position relationships between the constituent elements are appropriately changed according to directions of the constituent elements described. Therefore, words and phrases used in the specification are not limited and appropriate substitutions may be made according to situations.

Unless otherwise specified and defined explicitly, the terms "installed", "coupled" and "connected" should be understood in a broad sense in the specification. For example, the connection may be a fixed connection, a detachable connection or an integrated connection, or may be a mechanical connection or an electrical connection, or may be a direct connection, an indirect connection through intermediate components, or communication inside two components. For those skilled in the art, the meanings of the above terms in the present disclosure can be understood according to the situations.

In the specification, "connection" includes a case where the constituent elements are connected together through an element with a certain electrical effect. The "element with the certain electrical effect" is not particularly limited as long as electrical signals can be sent and received between the connected constituent elements. Examples of the "element with the certain electrical action" not only include an electrode and a wiring, but also include a switching element such as a transistor, a resistor, an inductor, a capacitor, other elements with one or more functions, etc.

Those skilled in the art will understand that transistors used in all embodiments of the present disclosure may be thin film transistors or field effect transistors or other devices with the same characteristics. The thin film transistors may be oxide semiconductor thin film transistors, low temperature polysilicon thin film transistors, amorphous silicon thin film transistors or microcrystalline silicon thin film transistors. The thin film transistors may be selected as thin film transistors with bottom gate structures or thin film transistors with top gate structures as long as they can realize a switching function. Since a source and a drain of a transistor used here are symmetric, its drain and source can be interchanged.

In the specification, "parallel" refers to a state in which an angle formed by two straight lines is greater than −10° and less than 10°, and thus also includes a state in which the angle is greater than −5° and less than 5°. In addition, "vertical" refers to a state in which an angle formed by two straight lines is greater than 80° and less than 100°, and thus also includes a state in which the angle is greater than 85° and less than 95°.

In the specification, "film" and "layer" may be interchangeable. For example, sometimes "conducting layer" may be replaced by "conducting film". Similarly, sometimes "insulating film" may be replaced by "insulating layer".

"About" in the present disclosure refers to a case that boundaries are not defined strictly and quantities within process and measurement errors range are allowed.

A display panel includes sub-pixels of at least one color and a driving circuit. The sub-pixels of at least one color may include red sub-pixels, blue sub-pixels and green sub-pixels. Each of the sub-pixels includes a pixel circuit and a light emitting element. The driving circuit is configured to provide a driving signal to the pixel circuit to cause the pixel circuit to drive the light emitting element to emit light according to the driving signal.

Twelve 12.3 inch display panels made on the same glass substrate in the same batch in the same period are chosen and divided into four groups, A, B, C and D. Each group includes three display panels, the luminance and gamma voltage of each display panel are adjusted to be consistent (within a 2% error), and luminance attenuation curves of different pictures (red, blue, green and white) in each display panel are tested at high temperatures (85° C.) for 1000 hours under conditions shown in Table 1 (only one piece of data is listed for each group in the table). CIE (Commission Internationale de L 'Eclairage) in Table 1 represents the International Commission on Illumination; CIEx represents an abscissa in a chromaticity diagram formulated by the International Commission on Illumination; CIEy represents an ordinate in the chromaticity diagram formulated by the International Commission on Illumination. A driving mode CC indicates that a driving current is applied to the light emitting element continuously. A driving mode PC indicates that a driving current is applied to the light emitting element periodically and the application of the driving current is stopped during a time interval between any two adjacent applications of the driving current. A driving mode AC indicates that a driving current is applied to the light emitting element periodically and a negative bias voltage signal is provided to an anode of the light emitting element during a time interval between any two adjacent applications of the driving current to cause the light emitting element not to emit light. Duty is a ratio of a period of time during which the driving current is applied to the sum of the period of time during which the driving current is applied and a period of time during which the driving current is not applied, and a negative bias voltage refers to a value of a voltage of the negative bias signal.

TABLE 1

| Group | Color | Luminance | CIEx | CIEy | Test temperature | Driving mode |
|---|---|---|---|---|---|---|
| A | White | 403 | 0.307 | 0.319 | 85° C. | CC |
| | Red | 122 | 0.685 | 0.315 | | |
| | Green | 387 | 0.291 | 0.681 | | |
| | Blue | 48 | 0.133 | 0.066 | | |
| B | White | 405 | 0.307 | 0.322 | 85° C. | AC-85% Duty, negative bias voltage-1V |
| | Red | 119 | 0.686 | 0.312 | | |
| | Green | 386 | 0.293 | 0.681 | | |
| | Blue | 46 | 0.133 | 0.065 | | |
| C | White | 407 | 0.306 | 0.323 | 85° C. | AC-75% Duty, negative bias voltage-1V |
| | Red | 123 | 0.688 | 0.312 | | |
| | Green | 385 | 0.294 | 0.678 | | |
| | Blue | 47 | 0.135 | 0.063 | | |
| D | White | 399 | 0.308 | 0.321 | 85° C. | PC-85% Duty |
| | Red | 118 | 0.685 | 0.314 | | |
| | Green | 376 | 0.296 | 0.676 | | |
| | Blue | 45 | 0.132 | 0.065 | | |

The high temperature lifespans for the four groups A, B, C and D are tested at 85° C. according to the above conditions, and results of the lifespans of different sub-pixels R, G and B are shown in Table 2.

TABLE 2

| | A | B | C | D |
|---|---|---|---|---|
| R | 100% | 126% | 105% | 72% |
| G | 100% | 140% | 112% | 68.4% |
| B | 100% | 136% | 156% | 69.5% |

It can be seen from Table 2 that the lifespan in the driving mode CC after 1000 hours is taken as a reference, which is 100%. The lifespans of R, G and B in the mode AC-85% Duty is 126%, 140% and 136% of the mode CC, respectively. The lifespans of R, G and B in the mode AC-75% Duty is 105%, 112% and 156% of the mode CC, respectively. It can be seen that the lifespan of the blue sub-pixel in the mode AC-75% Duty is superior to that in the mode AC-85% Duty; the lifespans of the red and green sub-pixels in the mode AC-85% Duty is superior to that in the mode AC-75% Duty; the lifespan of R, G and B in the mode AC-75% Duty is inferior to that in the mode CC. It can be seen from the above experiments that conditions to implement maximization of the lifespans of the sub-pixels of different colors are different.

The driving circuits to which the sub-pixels of different colors are connected in the display panel are the same, thus the lifespans of the sub-pixels of different colors cannot be increased maximally, thereby decreasing the service life of the display panel.

Figure 2:
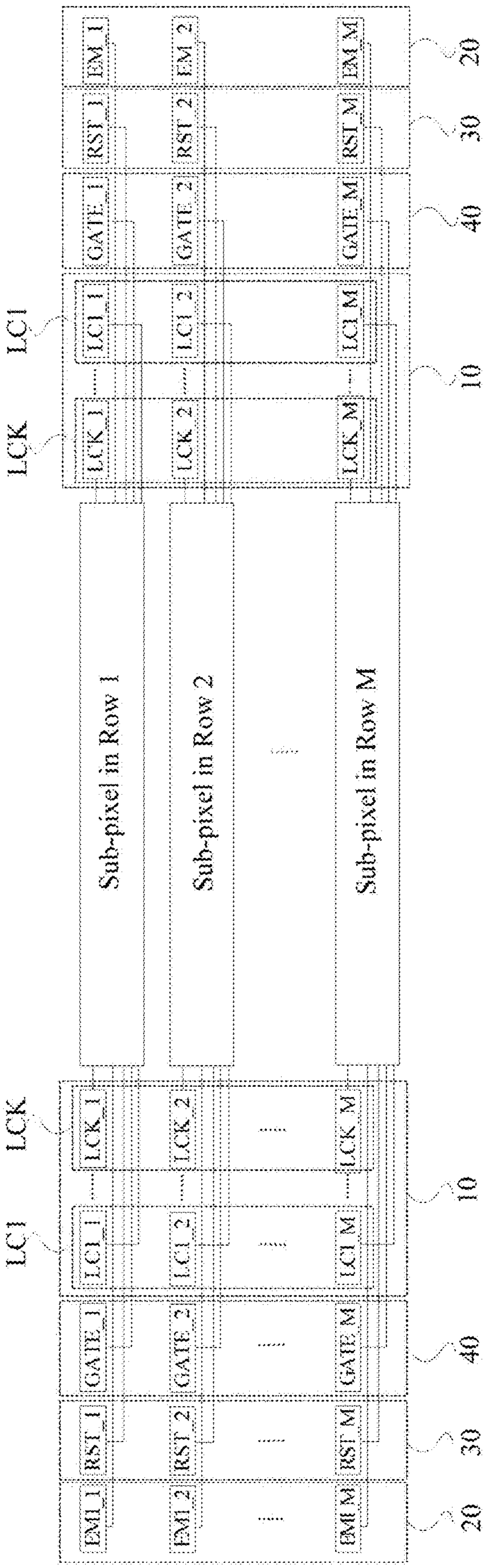
FIG. 2 is a first schematic structural diagram of a display panel in accordance with an exemplary embodiment.
Figure 3:
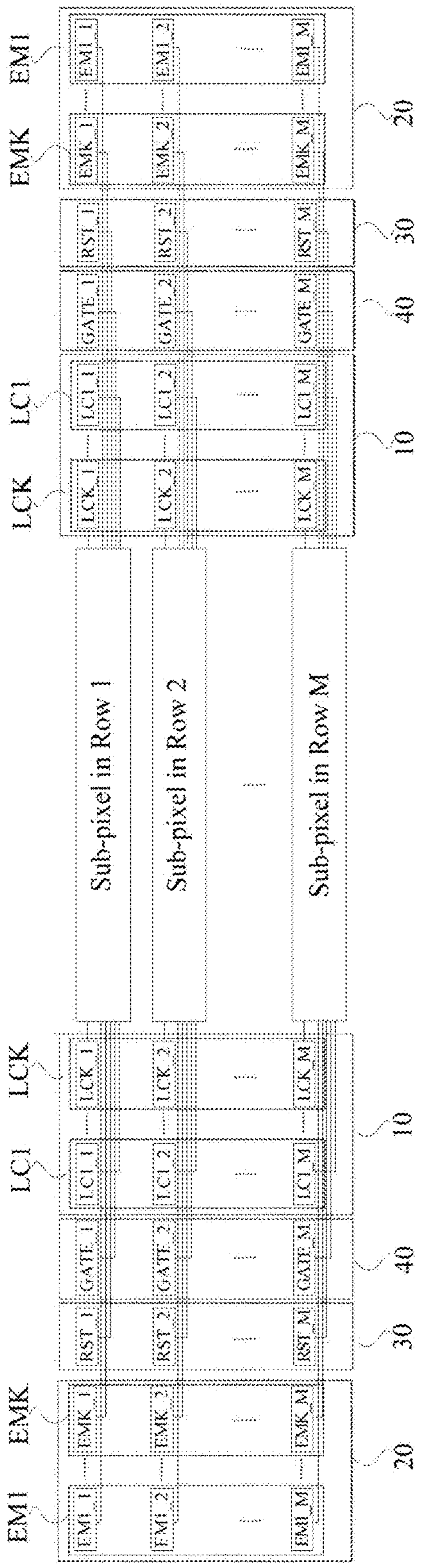
FIG. 3 is a second schematic structural diagram of a display panel in accordance with an exemplary embodiment.
Figure 4:
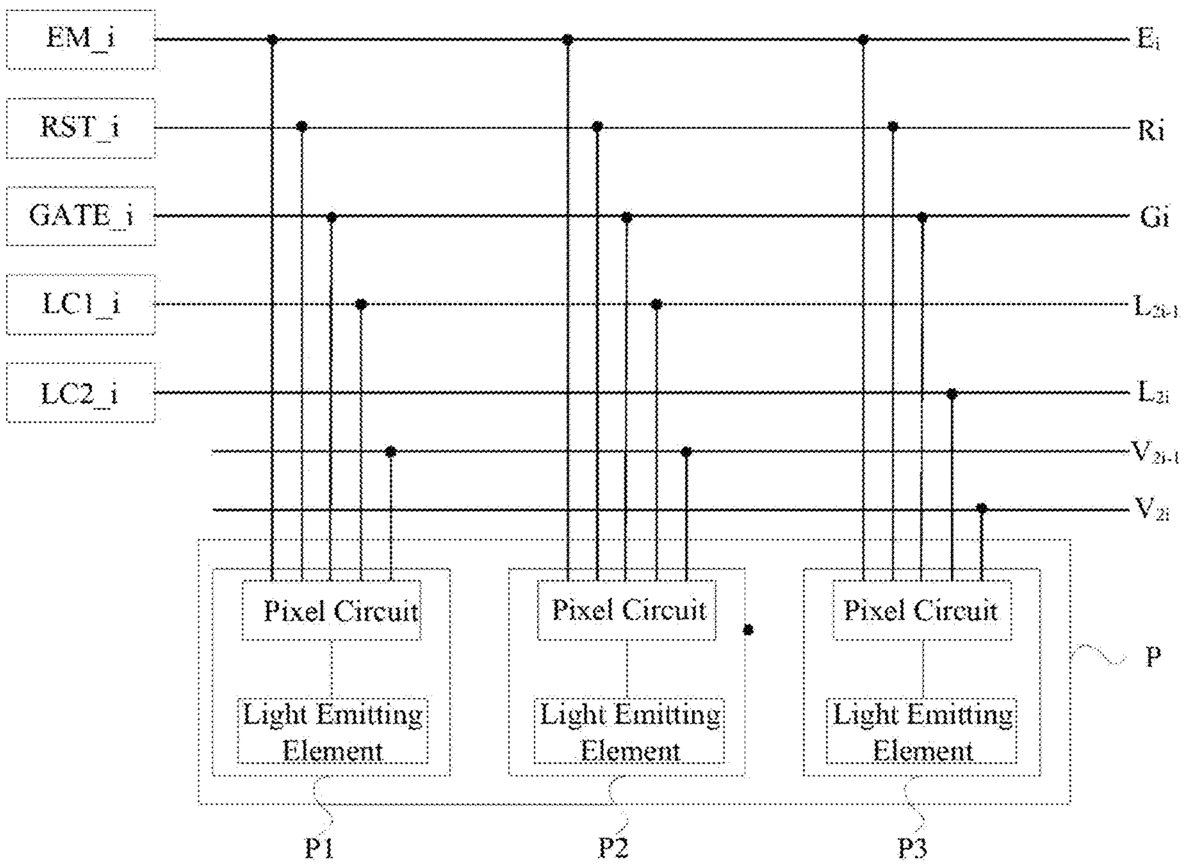
FIG. 4 is a first schematic diagram of connections of a pixel unit in accordance with an exemplary embodiment.
Figure 5:
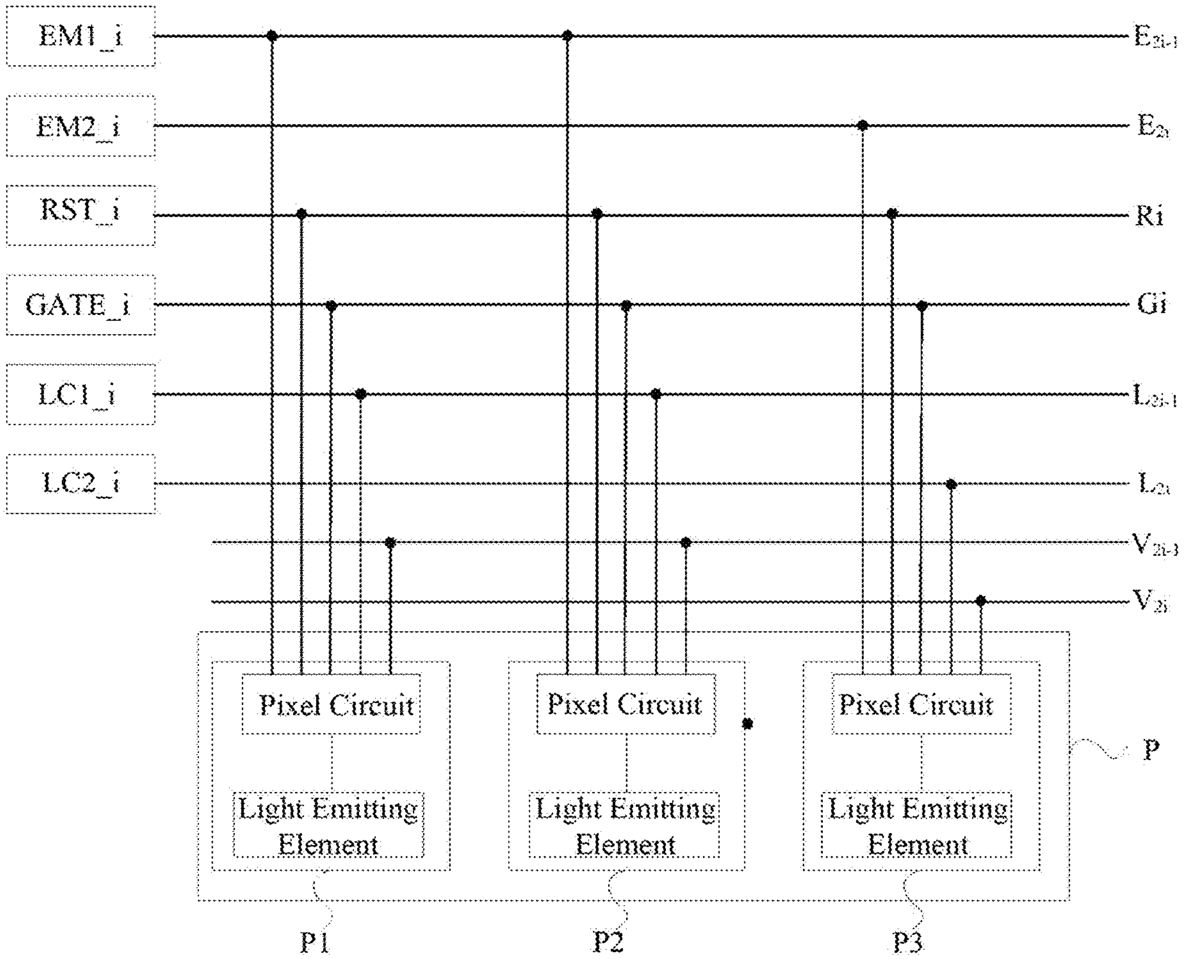
FIG. 5 is a second schematic diagram of connections of a pixel unit in accordance with an exemplary embodiment.
Figure 6:
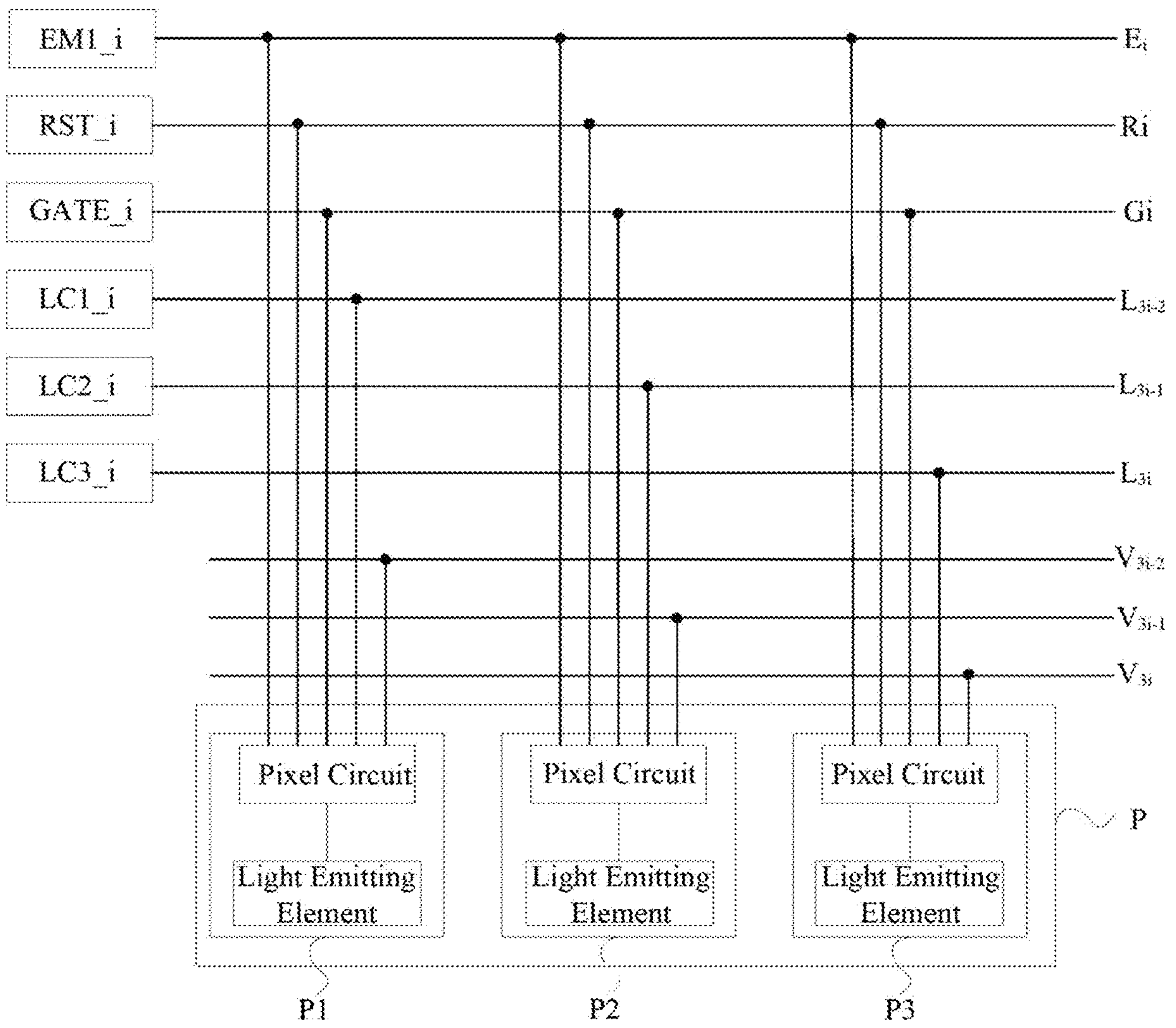
FIG. 6 is a third schematic diagram of connections of a pixel unit in accordance with an exemplary embodiment.
Figure 7:
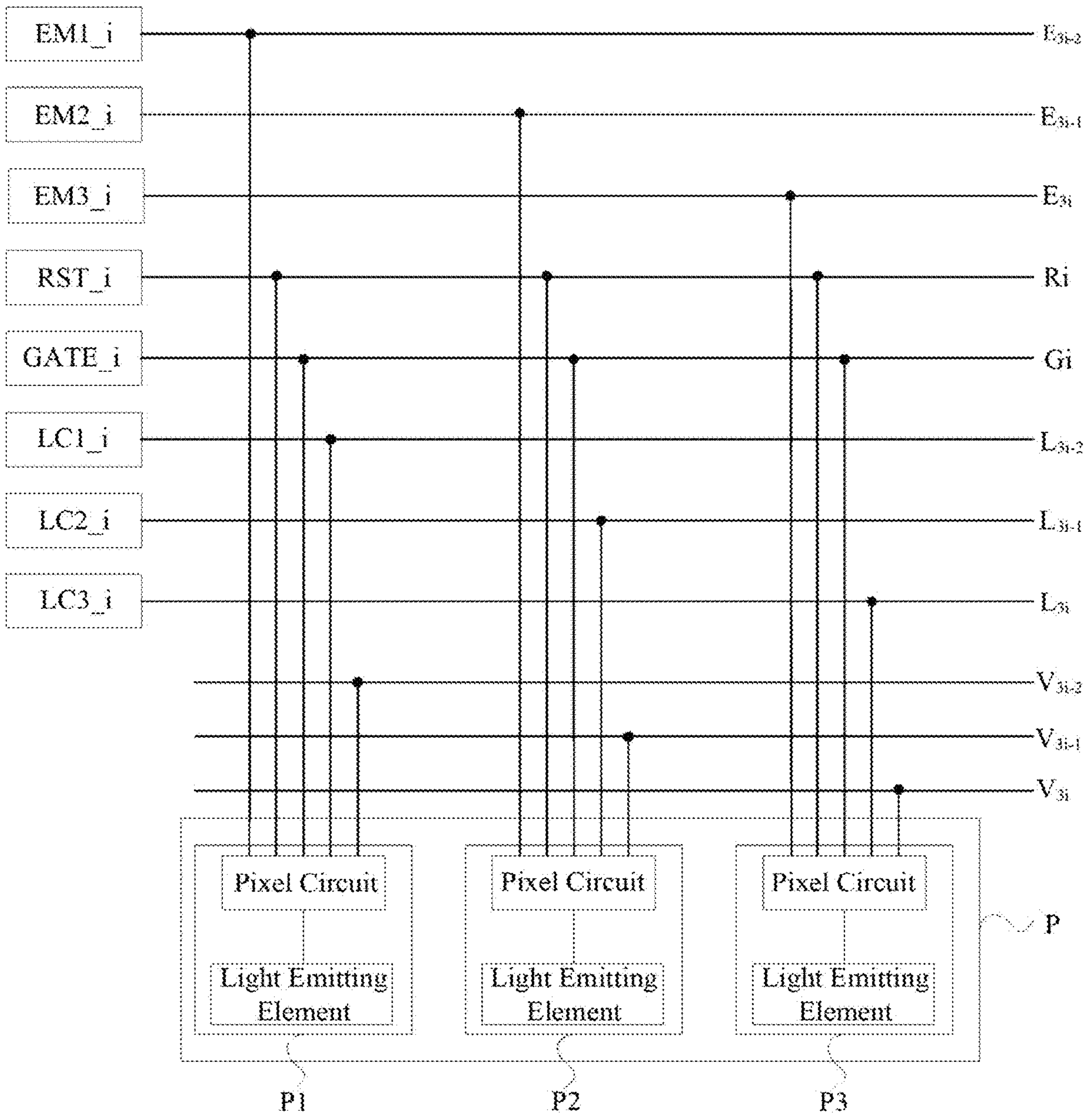
FIG. 7 is a fourth schematic diagram of connections of a pixel unit in accordance with an exemplary embodiment.

FIG. 1 is a schematic structural diagram of a display panel in accordance with an embodiment of the present disclosure, FIG. 2 is a first schematic structural diagram of a display panel in accordance with an exemplary embodiment, FIG. 3 is a second schematic structural diagram of a display panel in accordance with an exemplary embodiment, FIG. 4 is a first schematic diagram of connections of a pixel unit in accordance with an exemplary embodiment, FIG. 5 is a second schematic diagram of connections of a pixel unit in accordance with an exemplary embodiment, FIG. 6 is a third schematic diagram of connections of a pixel unit in accordance with an exemplary embodiment, and FIG. 7 is a fourth schematic diagram of connections of a pixel unit in accordance with an exemplary embodiment. As shown in FIGS. 1 to 7, the display panel in accordance with the embodiment of the present disclosure includes a display area 100 and a non-display area 200. The display area 100 includes pixel units P arranged in array, and at least one of the pixel units includes a sub-pixel P1 of a first color, a sub-pixel P2 of a second color and a sub-pixel P3 of a third color, the first color, the second color and the third color being different colors. At least one sub-pixel includes a pixel circuit and a light emitting element, and the pixel circuit is connected to an anode of the light emitting element. The non-display area 200 includes an anode voltage driving circuit 10 connected to a sub-pixel and configured to provide an anode voltage control signal to a pixel circuit of the connected sub-pixel to provide a voltage signal to the anode of the light emitting element. A pixel unit located in row i is illustrated in FIGS. 4 to 7 as an example.

In an exemplary embodiment, the anode voltage driving circuit 10 includes K anode voltage driving sub-circuits LC1 to LCK arranged along a row direction. Each of the anode voltage driving sub-circuits is connected to sub-pixels of at least one color, and different anode voltage driving sub-circuits are connected to sub-pixels of different colors, K being a positive integer greater than or equal to 2.

In an exemplary embodiment, the display panel may be an OLED display panel.

In an exemplary embodiment, the first color, the second color or the third color may be one of red, green and blue. Illustratively, the first color may be red, the second color may be blue, and the third color may be green, the present disclosure is not limited thereto.

In an exemplary embodiment, the sub-pixels in the pixel unit may be rectangular, rhombic, pentagonal or hexagonal in shape. For example, three sub-pixels may be arranged side by side horizontally, side by side vertically or in the shape of the Chinese character "品", the present disclosure is not limited thereto.

In an exemplary embodiment, K may be 2 or 3, and a value of K depends on structures and materials of the sub-pixels of different colors in the display panel, the present disclosure is not limited there to. The display panel is illustrated in FIG. 2 by taking K=3 as an example, and the display panel is illustrated in FIG. 3 by taking K=2 as an example.

In an exemplary embodiment, the anode voltage driving sub-circuits may be driven unilaterally or may be driven bilaterally. The anode voltage driving sub-circuits driven bilaterally are illustrated in FIG. 1.

In this embodiment, each anode voltage driving sub-circuit is connected to the sub-pixels of at least one color, different anode voltage driving sub-circuits are connected to the sub-pixels of different colors, and anode voltage control signals which can prolong the lifespans of the sub-pixels of different colors can be provided to the sub-pixels of different colors through different anode voltage driving sub-circuits, so as to increase the lifespans of the sub-pixels of different colors maximally.

In an exemplary embodiment, pixel units located in the first row and pixel units located in the last row may not be displayed, pixel units located in the second row to the penultimate row may be displayed, or pixel units in all rows may be displayed. Illustratively, when the pixel units located in the first row and the pixel units located in the last row are not displayed, structures of the pixel units in the first row and the pixel units located in the last row are the same as those of the pixel units located in the other rows, and the difference lies in that the pixel circuits of the sub-pixels in the pixel units in the first row and in the pixel units located in the last row do not output driving circuits and the light emitting elements do not emit light.

Figure 8:
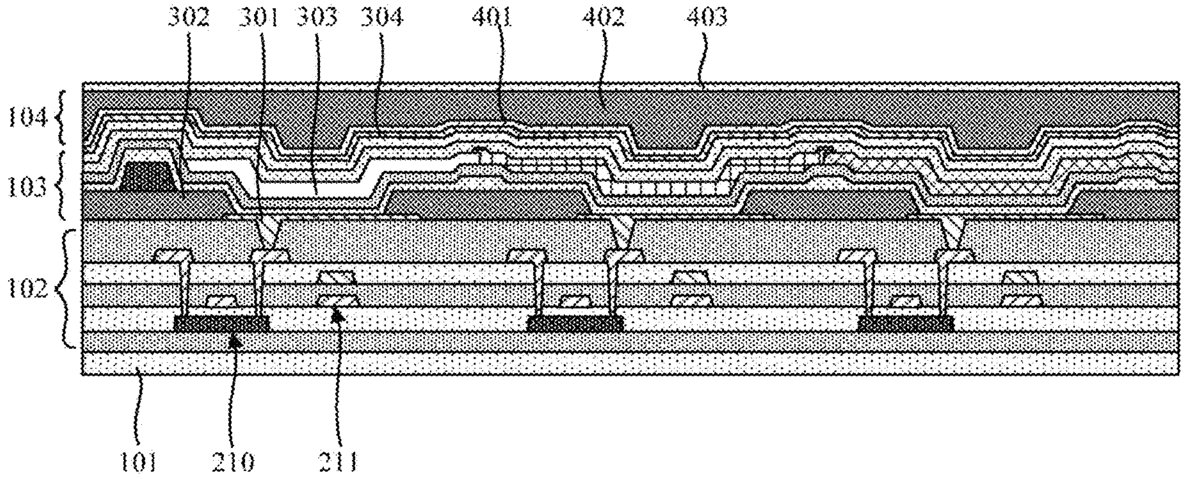
FIG. 8 is a schematic sectional view of a display panel.

FIG. 8 is a schematic sectional view of a display panel, which illustrates a structure of three sub-pixels of the OLED display panel. Referring to FIG. 8, in a plane perpendicular to the display panel, the display panel may include a driving circuit layer 102 disposed on a substrate 101, a light emitting structure layer 103 disposed at one side of the driving circuit layer 102 away from the substrate 101, and an encapsulation layer 104 disposed at one side of the light emitting structure layer 103 away from the substrate 101. In some possible implementations, the display panel may include other film layers, such as photo spacers, etc., the present disclosure is not limited thereto.

In an exemplary implementation, the substrate 101 may be a flexible substrate or may be a rigid substrate. The driving circuit layer 102 of each sub-pixel may include a plurality of transistors and a storage capacitor that form a pixel circuit. One transistor 101 and one storage capacitor 101A are shown in FIG. 4 as an example only. The light emitting structure layer 103 may include an anode 301, a pixel definition layer 302, an organic light emitting layer 303 and a cathode 304. The anode 301 is connected to a drain electrode of a driving transistor 210 through via holes, the organic light emitting layer 303 is connected to the anode 301, and the cathode 304 is connected to the organic light emitting layer 303. The organic light emitting layer 303 emits light of corresponding colors under driving of the anode 301 and the cathode 304. The encapsulation layer 104 may include a first encapsulation layer 401, a second encapsulation layer 402 and a third encapsulation layer 403 which are stacked. The first encapsulation layer 401 and the third encapsulation layer 403 may be made of inorganic materials, and the second encapsulation layer 402 may be made of an organic material. The second encapsulation layer 402 is disposed between the first encapsulation layer 401 and the third encapsulation layer 403, so as to ensure that external water vapor cannot enter the light emitting structure layer 103.

In an exemplary implementation, the organic light emitting layer 303 may include a hole injection layer (HIL), a hole transport layer (HTL), an electron block layer (EBL), a light emitting layer (EML), a hole block layer (HBL), an electron transport layer (ETL) and an electron injection layer (EIL) which are stacked. In an exemplary implementation, the hole injection layers of all the sub-pixels may be jointly connected layers, the electron injection layers of all the sub-pixels may be jointly connected layers, the hole transport layers of all the sub-pixels may be jointly connected layers, the electron transport layers of all the sub-pixels may be jointly connected layers, and the hole block layers of all the sub-pixels may be jointly connected layers. The light emitting layers of adjacent sub-pixels may overlap slightly with or be isolated from each other, and the electron block layers of adjacent sub-pixels may overlap slightly with or be isolated from each other.

The display panel in accordance with the embodiment of the present disclosure includes a display area and a non-display area, wherein the display area includes pixel units arranged in array, at least one of the pixel units includes a sub-pixel of a first color, a sub-pixel of a second color and a sub-pixel of a third color, the first color, the second color and the third color are different colors, at least one sub-pixel includes a pixel circuit and a light emitting element, and the pixel circuit is connected to an anode of the light emitting element; the non-display area includes an anode voltage driving circuit connected to a sub-pixel and configured to provide an anode voltage control signal to a pixel circuit of the connected sub-pixel to provide a voltage signal to the anode of the light emitting element; the anode voltage driving circuit includes K anode voltage driving sub-circuits arranged along a row direction; each of the anode voltage driving sub-circuits is connected to sub-pixels of at least one color, and different anode voltage driving sub-circuits are connected to sub-pixels of different colors. In the present disclosure, the lifespans of the sub-pixels of different colors can be increased maximally by providing the anode voltage driving circuit including the K anode voltage driving sub-circuits which are arranged along the row direction and connected to the sub-pixels of different colors, such that the lifespans of the sub-pixels of different colors can be increased maximally to decrease the difference between luminance attenuation speeds of the sub-pixels of different colors, thereby prolonging the service life of the display panel.

In an exemplary embodiment, the display area further includes 3N column of data signal lines, M rows of scan signal lines, M rows of reset signal lines and M rows of initial voltage lines, wherein M is the total number of rows of pixel units and N is the total number of columns of pixel units.

Figure 9:
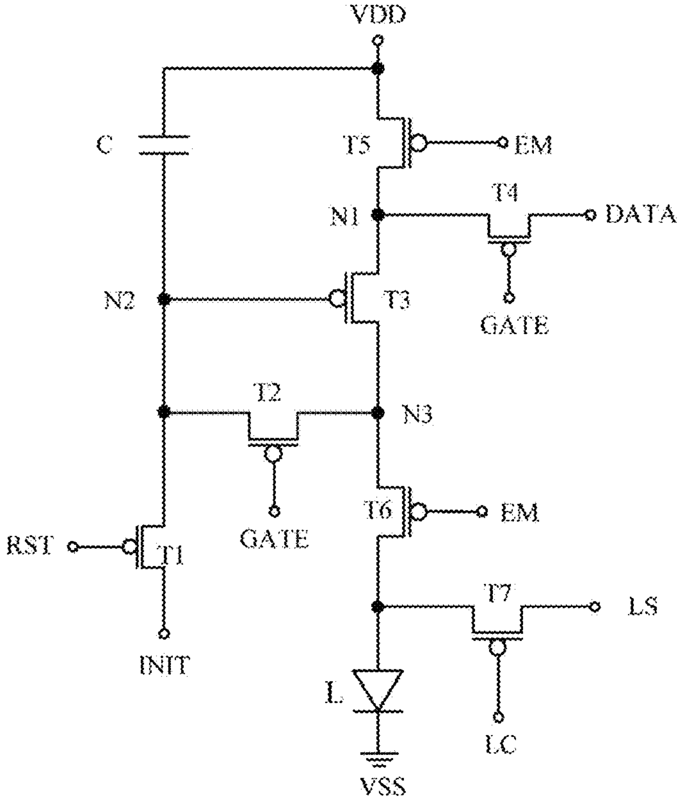
FIG. 9 is an equivalent circuit diagram of a pixel circuit.

FIG. 9 is an equivalent circuit diagram of a pixel circuit. As shown in FIG. 9, the pixel circuit in accordance with an exemplary embodiment may include: a first transistor T1 to a seventh transistor T7 and a storage capacitor C.

In an exemplary embodiment, a control electrode of the first transistor T1 is connected to a reset signal terminal RST, a first electrode of the first transistor T1 is connected to an initial signal terminal INIT, and a second electrode of the first transistor T1 is connected to a second node N2. A control electrode of the second transistor T2 is connected to a scan signal terminal GATE, a first electrode of the second transistor T2 is connected to the second node N2, and a second electrode of the second transistor T2 is connected to a third node N3. A control electrode of the third transistor T3 is connected to the second node N2, i.e., the control electrode of the third transistor T3 is connected to a second end of the storage capacitor C, a first electrode of the third transistor T3 is connected to a first node N1, and a second electrode of the third transistor T3 is connected to the third node N3. A control electrode of the fourth transistor T4 is connected to the scan signal terminal GATE, a first electrode of the fourth transistor T4 is connected to a data signal terminal DATA, and a second electrode of the fourth transistor T4 is connected to the first node N1. A control electrode of the fifth transistor T5 is connected to a light emitting signal terminal EM, a first electrode of the fifth transistor T5 is connected to a first power terminal VDD, and a second electrode of the fifth transistor T5 is connected to the first node N1. A control electrode of the sixth transistor T6 is connected to the light emitting signal terminal EM, a first electrode of the sixth transistor T6 is connected to the third node N3, and a second electrode of the sixth transistor T6 is connected to an anode of a light emitting element L. A control electrode of the seventh transistor T7 is connected to an anode voltage control terminal LC, a first electrode of the seventh transistor T7 is connected to an anode voltage signal terminal LS, and a second electrode of the seventh transistor T7 is connected to the anode of the light emitting element L. A first end of the storage capacitor C is connected to the first power terminal VDD, and the second end of the storage capacitor C is connected to the second node N2, that is, the second end of the storage capacitor C is connected to the control electrode of the third transistor T3.

For a pixel circuit of a sub-pixel in row i and column j, the data signal terminal is connected to a data signal line in column j, the scan signal terminal is connected to a scan signal line in row i, the reset signal terminal is connected to a reset signal line in row i, and the initial voltage terminal is connected to an initial voltage line in row i, $1 \le i \le M$, $1 \le j \le 3N$.

In an exemplary embodiment, the pixel circuit is configured to, under control of the scan signal line, receive a data voltage transmitted by the data signal line and output a corresponding current to the light emitting element, and the light emitting element is configured to emit light with corresponding luminance in response to the current outputted by a pixel circuit of a sub-pixel where the light emitting device is located.

In an exemplary embodiment, the first power terminal VDD can keep providing high-level signals, and the second power terminal VSS can keep providing low-level signals. A value of a voltage of a signal of the initial signal terminal VINT is less than a value of a voltage of a signal of the second power terminal VSS.

In an exemplary embodiment, the voltage of the signal of the second power terminal VSS is about −4.5 volts to −4 volts.

In an exemplary embodiment, the voltage of the signal of the initial signal terminal VINT is about −7 volts to −6.5 volts.

In an exemplary embodiment, the first transistor T1, the second transistor T2, the third transistor T4, the fourth transistor T5, the sixth transistor T6 and the seventh transistor T7 may be switching transistors. The third transistor T3 may be referred to as a driving transistor. The third transistor T3 determines a driving current flowing between the first power terminal VDD and the second power terminal VSS according to a potential difference between its control electrode and first electrode.

In an exemplary embodiment, the first transistor T1 to the seventh transistor T7 may be P-type transistors or N-type transistors. Use of the same type of transistors in the pixel circuit may simplify process flows, decrease process difficulties of the display panel, and improve the product yield rate. Illustratively, the first transistor T1 to the seventh transistor T7 may include P-type transistors and N-type transistors.

In an exemplary embodiment, as shown in FIGS. 2 and 3, when K=2, the K anode voltage driving sub-circuits are a first anode voltage driving sub-circuit LC1 and a second anode voltage driving sub-circuit LC2, respectively. The first anode voltage driving sub-circuit includes M cascaded first anode voltage driving shift registers LC1_1 to LC1_M, and the second anode voltage driving sub-circuit includes M cascaded second anode voltage driving shift registers LC2_1 to LC2_M.

In an exemplary embodiment, as shown in FIGS. 4 and 5, the display area may further include 2M rows of anode voltage control lines $L_1$ to $L_{2M}$ and 2M rows of anode voltage signal lines $V_1$ to $V_{2M}$.

In an exemplary embodiment, an anode voltage control line $L_{2i-1}$ in row 2i-1 is connected to a first anode voltage driving shift register LC1_i at stage i, and is connected to anode voltage control terminals of pixel circuits of sub-pixels of the first color and sub-pixels of the second color located in row i. An anode voltage control line $L_{2i}$ in row 2i is connected to a second anode voltage driving shift register LC2_i at stage i, and is connected to the anode voltage control terminals of pixel circuits of sub-pixels of the third color located in row i. An anode voltage signal line $V_{2i-1}$ in row 2i-1 is connected to anode voltage signal terminals of the pixel circuits of the sub-pixels of the first color and the sub-pixels of the second color located in row i. An anode voltage signal line $V_{2i}$ in row 2i is connected to anode voltage signal terminals of the pixel circuits of the sub-pixels of the third color located in row i.

In an exemplary embodiment, as shown in FIGS. 2 and 3, when K=3, the K anode voltage driving sub-circuits are a first anode voltage driving sub-circuit LC1, a second anode voltage driving sub-circuit LC2 and a third anode voltage driving sub-circuit LC3, respectively. The first anode voltage driving sub-circuit LC1 may include M cascaded first anode voltage driving shift registers LC1_1 to LC1_M. The second anode voltage driving sub-circuit may include M cascaded second anode voltage driving shift registers LC2_1 to LC2_M. The third anode voltage driving sub-circuit includes M cascaded third anode voltage driving shift registers LC3_1 to LC3_M.

In an exemplary embodiment, as shown in FIGS. 4 and 5, the display area may further include 3M rows of anode voltage control lines $L_1$ to $L_{3M}$ and 3M rows of anode voltage signal lines $V_1$ to $V_{3M}$.

In an exemplary embodiment, an anode voltage control line $L_{3i-2}$ in row 3i-2 is connected to a first anode voltage driving shift register LC1_i at stage i, and is connected to the anode voltage control terminals of the pixel circuits of the sub-pixels of the first color located in row i. An anode voltage control line $L_{3i-1}$ in row 3i-1 is connected to a second anode voltage driving shift register LC2_i at stage i, and is connected to the anode voltage control terminals of the pixel circuits of the sub-pixels of the second color located in row i. An anode voltage control line $L_{3i}$ in row 3i is connected to a third anode voltage driving shift register LC3_i at stage i, and is connected to the anode voltage control terminals of the pixel circuits of the sub-pixels of the third color located in row i. An anode voltage signal line $V_{3i-2}$ in row 3i-2 is connected to the anode voltage signal terminals of the pixel circuits of the sub-pixels of the first color located in row i. An anode voltage signal line $V_{3i-1}$ in row 3i-1 is connected to the anode voltage signal terminals of the pixel circuits of the sub-pixels of the second color located in row i. An anode voltage signal line $V_{3i}$ in row 3i is connected to the anode voltage signal terminals of the pixel circuits of the sub-pixels of the third color located in row i.

Figure 10A:
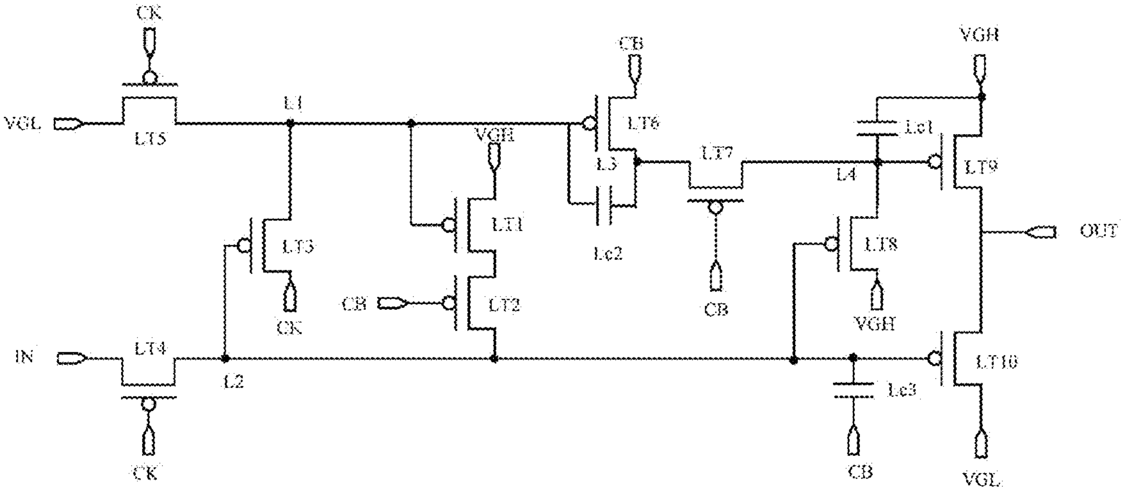
FIG. 10A is an equivalent circuit diagram of an anode voltage driving shift register.

FIG. 10A is an equivalent circuit diagram of an anode voltage driving shift register. As shown in FIG. 10A, in an exemplary embodiment, the anode voltage driving shift register includes a first bias transistor LT1 to a tenth bias transistor LT10 and a first bias capacitor Lc1 to a third bias capacitor Lc3.

In an exemplary embodiment, the anode voltage driving shift register includes a first anode voltage driving shift register, a second anode voltage driving shift register or a third anode voltage driving shift register.

In an exemplary embodiment, a control electrode of the first bias transistor LT1 is connected to a first node L1, a first electrode of the first bias transistor LT1 is connected to a first power terminal VGH, and a second electrode of the first bias transistor LT1 is connected to a first electrode of the second bias transistor LT2. A control electrode of the second bias transistor LT2 is connected to a second clock signal terminal CB, and a second electrode of the second bias transistor LT2 is connected to a second node L2. A control electrode of the third bias transistor LT3 is connected to the second node L2, a first electrode of the third bias transistor LT3 is connected to the first node L1, and a second electrode of the third bias transistor LT3 is connected to a first clock signal terminal CK. A control electrode of the fourth bias transistor LT4 is connected to the first clock signal terminal CK, a first electrode of the fourth bias transistor LT4 is connected to a signal input terminal IN, and a second electrode of the fourth bias transistor LT4 is connected to the second node L2. A control electrode of the fifth bias transistor LT5 is connected to the first clock signal terminal CK, a first electrode of the fifth bias transistor LT5 is connected to a second power terminal VGL, and a second electrode of the fifth bias transistor LT5 is connected to the first node L1. A control electrode of the sixth bias transistor LT6 is connected to the first node L1, a first electrode of the sixth bias transistor LT6 is connected to the second clock signal terminal CB, a second electrode of the sixth bias transistor LT6 is connected to a first electrode of the seventh bias transistor LT7, and a second electrode of the sixth bias transistor LT6 is connected to a third node L3. A control electrode of the seventh bias transistor LT7 is connected to the second clock signal terminal CB, a first electrode of the seventh bias transistor LT7 is connected to the third node L3, and a second electrode of the seventh bias transistor LT7 is connected to a fourth node L4. A control electrode of the eighth bias transistor LT8 is connected to the first node L1, a first electrode of the eighth bias transistor LT8 is connected to the fourth node L4, and a second electrode of the eighth bias transistor LT8 is connected to the first power terminal VGH. A control electrode of the ninth bias transistor LT9 is connected to the second node L4, a first electrode of the ninth bias transistor LT9 is connected to the first power terminal VGH, and a second electrode of the ninth bias transistor LT9 is connected to a signal output terminal OUT. A control electrode of the tenth bias transistor LT10 is connected to the first node L1, a first electrode of the tenth bias transistor LT10 is connected to the signal output terminal OUT, and a second electrode of the tenth bias transistor LT10 is connected to the second power terminal VGL. A first electrode slab of the first bias capacitor Lc1 is connected to the fourth node L4, and a second electrode slab of the first bias capacitor Lc1 is connected to the first power terminal VGH. A first electrode slab of the second bias capacitor Lc2 is connected to the first node L1, and a second electrode slab of the second bias capacitor Lc2 is connected to the third node L3. A first electrode slab of the third bias capacitor Lc3 is connected to the second node L2, and a second electrode slab of the third bias capacitor Lc3 is connected to the second clock signal terminal CB.

In some exemplary embodiments, the first power terminal VGH may keep providing high-level signals, and the second power terminal VGL may keep providing low-level signals.

In an exemplary embodiment, the first bias transistor LT1 to the tenth bias transistor LT10 may be P-type transistors or N-type transistors. Use of the same type of transistors in the light emitting driving circuit may simplify process flows, decrease process difficulties of the display panel, and improve the product yield rate.

Figure 10B:
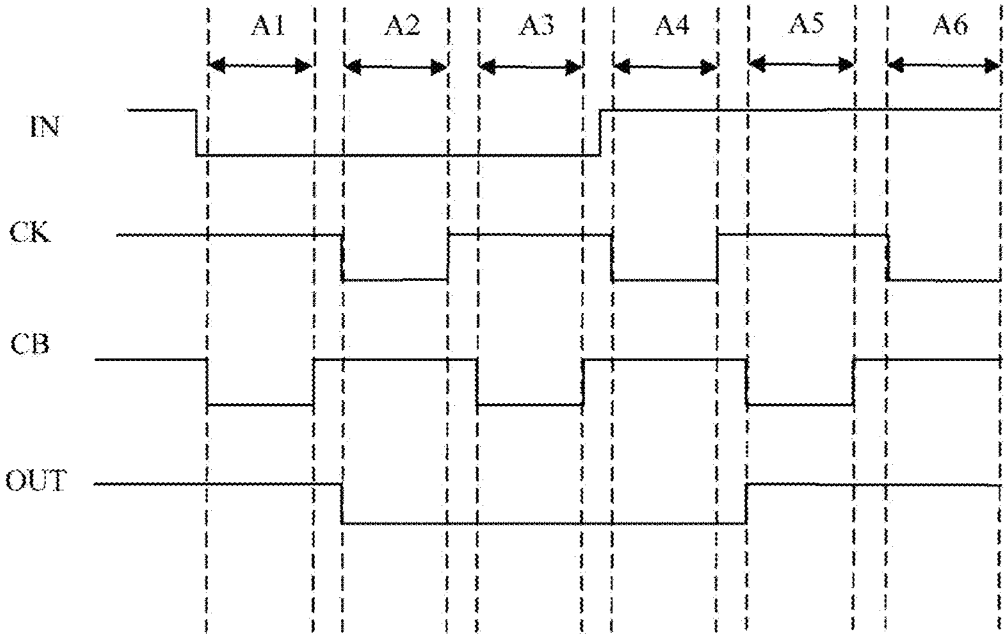
FIG. 10B is a working time sequence diagram of the anode voltage driving shift register provided in FIG. 10A.

FIG. 10B is a working time sequence diagram of the anode voltage driving shift register provided in FIG. 10A. The first to tenth bias transistors LT1 to LT10 being P-type transistors are illustrated in FIG. 10B as an example. As shown in FIG. 10B, a working process of the anode voltage driving shift register in accordance with an exemplary embodiment may include the following stages.

In a first stage A1, signals of the signal input terminal IN and the second clock signal terminal CB are low-level signals, and signals of the first clock signal terminal CK are high-level signals. The signals of the second clock signal terminal CB are low-level signals, and the second bias transistor LT2 and the seventh bias transistor LT7 are turned on. The signals of the first clock signal terminal CK are high-level signals, the fourth bias transistor LT4 and the fifth bias transistor LT5 are turned off, the signals of the signal input terminal IN cannot be written to the second node L2, the signals of the second power terminal VGL cannot be written to the first node L1, the third bias transistor LT3, the sixth bias transistor LT6, the eighth bias transistor LT8 and the tenth bias transistor LT10 are turned off, and the signal output terminal OUT maintains the high-level signals from the previous stage.

In a second stage A2, the signals of the signal input terminal IN and the first clock signal terminal CK are low-level signals, and the signals of the second clock signal terminal CB are high-level signals. The signals of the second clock signal terminal CB are high-level signals, and the second bias transistor LT2 and the seventh bias transistor LT7 are turned off. The signals of the first clock signal terminal CK are low-level signals, and the fourth bias transistor LT4 and the fifth bias transistor LT5 are turned on. The low-level signals of the signal input terminal IN are written to the second node L2, the third bias transistor LT3, the eighth bias transistor LT8 and the tenth bias transistor LT10 are turned on, the signals of the first clock signal terminal CK are written to the first node L1, the high-level signals of the first power terminal VGH are written to a fourth node R4, the ninth bias transistor LT9 is turned off, and the low-level signals of the second power terminal VGL are written to the signal output terminal OUT. The low-level signals of the second power terminal VGL are written to the first node L1, the first bias transistor LT1 and the sixth bias transistor LT6 are turned on, and the high-level signals of the second clock signal terminal CB is written to the third node L3. Because the seventh bias transistor LT7 is turned off, signals of the third node L3 cannot be written to the fourth node R4. The signal output terminal OUT outputs low-level signals in this stage.

In a third stage A3, the signals of the signal input terminal IN and the second clock signal terminal CB are low-level signals, and the signals of the first clock signal terminal CK are high-level signals. The signals of the first clock signal terminal CK are high-level signals, the fourth bias transistor LT4 and the fifth bias transistor LT5 are turned off, the signals of the signal input terminal IN cannot be written to the second node L2, and the signals of the second power terminal VGL cannot be written to the first node L1. Under the action of the third bias capacitor, signals of the second node L2 remain low-level signals, the third bias transistor LT3, the eighth bias transistor LT8 and the tenth bias transistor LT10 are turned on, the high-level signals of the first clock signal terminal CK are written to the first node L1, the first bias transistor LT1 and the sixth bias transistor LT6 are turned off, the high-level signals of the first power terminal VGH are written to the fourth node L4, and the low-level signals of the second power terminal VGL are written to the signal output terminal OUT. The signals of the third node L3 remain high-level signals, the signals of the second clock signal terminal CB are low-level signals, the second bias transistor LT2 and the seventh bias transistor LT7 are turned on, the signals of the third node L3 are written to the fourth node L4, the signals of the fourth node R4 remain high level signals, and the ninth bias transistor LT9 is turned off. The signal output terminal OUT outputs low-level signals in this stage.

In a fourth stage A4, the signals of the first clock signal terminal CK are low-level signals, and the signals of the signal input terminal IN and the second clock signal terminal CB are high-level signals. The signals of the second clock signal terminal CB are high-level signals, and the second bias transistor LT2 and the seventh bias transistor LT7 are turned off. The signals of the first clock signal terminal CK are low-level signals, and the fourth bias transistor LT4 and the fifth bias transistor LT5 are turned on. The high-level signals of the signal input terminal IN are written to the second node L2, the third bias transistor LT3, the eighth bias transistor LT8 and the tenth bias transistor LT10 are turned off, the signals of the first clock signal terminal CK cannot be written to the first node L1, the signals of the first power terminal VGH cannot be written to the fourth node L4, the signals of the second power terminal VGL cannot be written to the signal output terminal OUT, the low-level signals of the second power terminal VGL are written to the first node L1, the first bias transistor LT1 and the sixth bias transistor LT6 are turned on, and the signals of the second clock signal terminal CB are written to the third node L3. Because the seventh bias transistor LT7 is turned off, the signals of the third node L3 cannot be written to the fourth node L4. In this stage, the signal output terminal OUT maintains the low-level signals from the previous stage.

In a fifth stage A5, the signals of the second clock signal terminal CB are low-level signals, and the signals of the signal input terminal IN and the first clock signal terminal CK are high-level signals. The signals of the first clock signal terminal CK are high-level signals, the fourth bias transistor LT4 and the fifth bias transistor LT5 are turned off, the signals of the signal input terminal IN cannot be written to the second node L2, and the signals of the second power terminal VGL cannot be written to the first node L1. Under the action of the third bias capacitor RC3, the signals of the second node L2 remain the high-level signal from the previous stage. Under the action of the second bias capacitor RC2, signals of the first node LI remain the low-level signals from the previous stage, the first bias transistor LT1 and the sixth bias transistor LT6 are turned on, the high-level signals of the first power terminal VGH are written to the second node L2 to cause the second node L2 to maintain the high-level signals, the low-level signals of the second clock signal terminal CB are written to the third node L3, the signals of the third node L3 are written to the fourth node R4, the ninth bias transistor R9 is turned on, and the high-level signals of the first power terminal VGH are written to the signal output terminal OUT. The signal output terminal OUT outputs high-level signals in this stage.

In a sixth stage A6, the signals of the first clock signal terminal CK are low-level signals, and the signals of the signal input terminal IN and the second clock signal terminal CB are high-level signals. The signals of the second clock signal terminal CB are high-level signals, and the second bias transistor LT2 and the seventh bias transistor LT7 are turned off. The signals of the first clock signal terminal CK are low-level signals, and the fourth bias transistor LT4 and the fifth bias transistor LT5 are turned on. The high-level signals of the signal input terminal IN are written to the second node L2, the third bias transistor LT3, the eighth bias transistor LT8 and the tenth bias transistor LT10 are turned off, the signals of the first clock signal terminal CK cannot be written to the first node L1, the signals of the first power terminal VGH cannot be written to the fourth node L4, the signals of the second power terminal VGL cannot be written to the signal output terminal OUT, the low-level signals of the second power terminal VGL are written to the first node L1, the first bias transistor LT1 and the sixth bias transistor LT6 are turned on, and the signals of the second clock signal terminal CB are written to the third node L3. Because the seventh bias transistor LT7 is turned off, the signals of the third node L3 cannot be written to the fourth node L4. In this stage, the signal output terminal OUT maintains the high-level signals from the previous stage.

After the sixth stage A6, the fifth and sixth stages of the anode voltage driving shift register are performed alternately until the signals of the signal input terminal IN become low-level signals.

The anode voltage driving shift register in the present disclosure, which is a 10T3C circuit structure, can output long-duration pulse signals, and can bias signals of the anode of the light emitting element for a longer time, thereby prolonging the service life of the display panel.

Figure 11A:
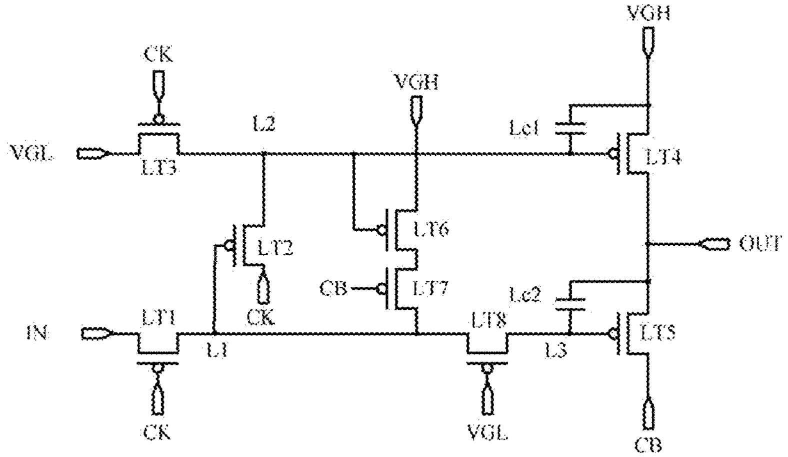
FIG. 11A is an equivalent circuit diagram of another anode voltage driving shift register.

FIG. 11A is an equivalent circuit diagram of another anode voltage driving shift register. As shown in FIG. 11A, in an exemplary embodiment, the anode voltage driving shift register includes a first bias transistor LT1 to an eighth bias transistor LT8, a first bias capacitor Lc1 and a second bias capacitor Lc2.

In an exemplary embodiment, the anode voltage driving shift register may include a first anode voltage driving shift register, a second anode voltage driving shift register or a third anode voltage driving shift register.

In an exemplary embodiment, a control electrode of the first bias transistor LT1 is connected to a first clock signal terminal CK, a first electrode of the first bias transistor LT1 is connected to a signal input terminal IN, and a second electrode of the first bias transistor LT1 is connected to a first node L1. A control electrode of the second bias transistor LT2 is connected to the first node L1, a first electrode of the second bias transistor LT2 is connected to a second node L2, and a second electrode of the second bias transistor LT2 is connected to the first clock signal terminal CK. A control electrode of the third bias transistor LT3 is connected to the first clock signal terminal CK, a first electrode of the third bias transistor LT3 is connected to a second power terminal VGL, and a second electrode of the third bias transistor LT3 is connected to the second node L2. A control electrode of the fourth bias transistor LT4 is connected to the second node L2, a first electrode of the fourth bias transistor LT4 is connected to a first power terminal VGH, and a second electrode of the fourth bias transistor LT4 is connected to a signal output terminal OUT. A control electrode of the fifth bias transistor LT5 is connected to a third node L3, a first electrode of the fifth bias transistor LT5 is connected to the signal output terminal OUT, and a second electrode of the fifth bias transistor LT5 is connected to a second clock signal terminal CB. A control electrode of the sixth bias transistor LT6 is connected to the second node L2, a first electrode of the sixth bias transistor LT6 is connected to the first power terminal VGH, a second electrode of the sixth bias transistor LT6 is connected to a first electrode of the seventh bias transistor LT7. A control electrode of the seventh bias transistor LT7 is connected to the second clock signal terminal CB, and a second electrode of the seventh bias transistor LT7 is connected to the first node L1. A control electrode of the eighth bias transistor LT8 is connected to the second power terminal VGL, a first electrode of the eighth bias transistor LT8 is connected to the first node L1, and a second electrode of the eighth bias transistor LT8 is connected to the third node L3. A first electrode slab of the first bias capacitor Lc1 is connected to the first power terminal VGH, and a second electrode slab of the first bias capacitor Lc1 is connected to the second node L2. A first electrode slab of the second bias capacitor Lc2 is connected to the signal output terminal OUT, and a second electrode slab of the second bias capacitor Lc2 is connected to the third node L3.

In some exemplary embodiments, the first power terminal VGH may keep providing high-level signals, and the second power terminal VGL may keep providing low-level signals.

In an exemplary embodiment, the first bias transistor LT1 to the eighth bias transistor LT8 may be P-type transistors or N-type transistors. Use of the same type of transistors in the anode voltage driving shift register may simplify process flows, decrease process difficulties of the display panel, and improve the product yield rate.

Figure 11B:
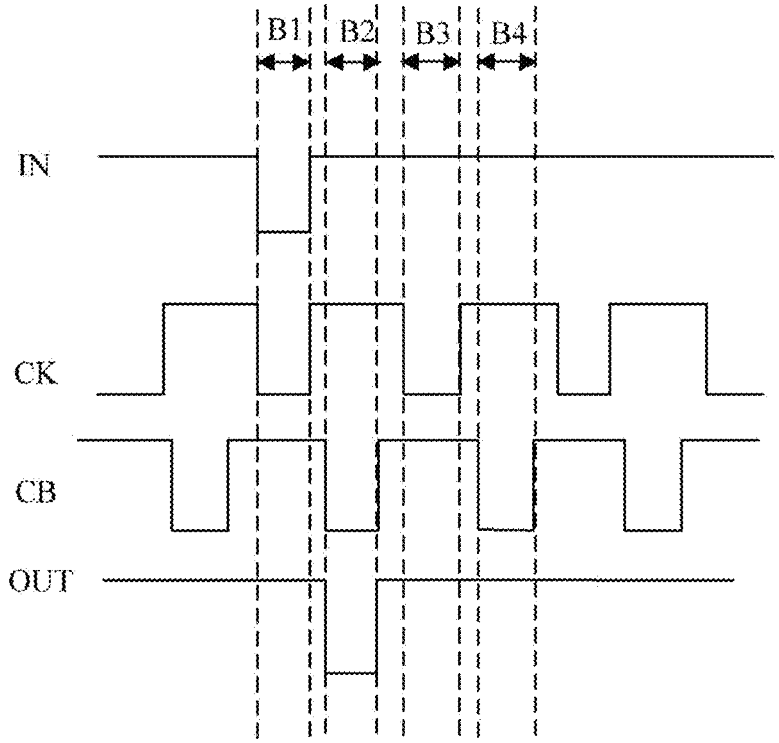
FIG. 11B is a working time sequence diagram of the anode voltage driving shift register provided in FIG. 11A.

FIG. 11B is a working time sequence diagram of the anode voltage driving shift register provided in FIG. 11A. The first to eighth bias transistors LT1 to LT8 being P-type transistors are illustrated in FIG. 11B as an example. As shown in FIG. 11B, a working process of the anode voltage driving shift register in accordance with an exemplary embodiment may include the following stages.

In a first stage B1, signals of the signal input terminal IN and the first clock signal terminal CK are low-level signals, signals of the second clock signal terminal CB are high-level signals. The signals of the first clock signal terminal CK are low-level signals, the first bias transistor LT1 and the third bias transistor LT3 are turned on, and signals of the eighth bias transistor LT8 receive the low-level signals of the second power terminal VGL to keep it turned on. The signals of the signal input terminal IN are written to the first node L1, signals of the first node L1 are written to a third node L3, the fifth bias transistor LT5 is turned on, and the signals of the second clock signal terminal CB are transmitted to the signal output terminal OUT via the fifth bias transistor LT5. In addition, the low-level signals of the second power terminal VGL are written to the second node L2, the fourth bias transistor LT4 and the sixth bias transistor LT6 are turned on, and the high-level signals of the first power terminal VGH are written to the signal output terminal OUT. Because the signals of the second clock signal terminal CB are high-level signals, the seventh bias transistor LT7 is turned off. Signals outputted by the signal output terminal OUT are high-level signals in this stage.

In a second stage B2, the signals of the signal input terminal IN and the first clock signal terminal CK are high-level signals, the signals of the second clock signal terminal CB are low-level signals. The signals of the first clock signal terminal CK are high-level signals, the first bias transistor LT1 and the third bias transistor LT3 are turned off, the signals of the first node L1 remain low-level signals, and the signals of the eighth bias transistor LT8 receive the low-level signals of the second power terminal VGL to keep it turned on. Due to the bootstrap action of the second bias capacitor LC2, the fifth bias transistor LT5 is turned on, and the signals of the second clock signal terminal CB are written to the signal output terminal OUT. In addition, the signals of the first clock signal terminal CK are low-level signals, the second bias transistor LT2 is turned on, and the signals of the first clock signal terminal CK are written to the second node L2, thus both the fourth bias transistor LT4 and the sixth bias transistor LT6 are turned off. The signals outputted by the signal output terminal OUT are low-level signals in this stage.

In a third stage B3, the signals of the first clock signal terminal CK are low-level signals, and the signals of the signal input terminal IN and the second clock signal terminal CB are high-level signals. The signals of the first clock signal terminal CK are low-level signals, the first bias transistor LT1 and the third bias transistor LT3 are turned on, the signals of the signal input terminal IN are written to the first node L1, and the second bias transistor LT2 is turned off. Because the eighth bias transistor LT8 keeps being turned on, the signals of the first node L1 are written to the third node L3, and the fifth bias transistor LT5 is turned off. The signals of the second power terminal VGL are written to the second node L2, the fourth bias transistor LT4 and the sixth bias transistor LT6 are turned on, and the high-level signals of the third power terminal VGH are written to the signal output terminal OUT. The signals outputted by the signal output terminal OUT are high-level signals in this stage.

In a fourth stage B4, the signals of the second clock signal terminal CB are low-level signals, and the signals of the signal input terminal IN and the first clock signal terminal CK are high-level signals. The signals of the first clock signal terminal CK are high-level signals, the first bias transistor LT1 and the third bias transistor LT3 are turned off, the signals of the first node L1 remain the high-level signals from the previous stage, and the second bias transistor LT2 is turned off. Because the eighth bias transistor LT8 keep being turned on, the signals of the first node L1 are written to the third node L3, and the fifth bias transistor LT5 is turned off. Signals of the second node L2 remain low-level signals, the fourth bias transistor LT4 and the sixth bias transistor LT6 are turned on, and the high-level signals of the third power terminal VGH are written to the signal output terminal OUT. The output signal of the signal output terminal OUT are high-level signals it this stage.

After the fourth stage B4, the third and fourth stages of the anode voltage driving shift register are performed alternately until the signals of the signal input terminal IN become low-level signals.

Figure 12A:
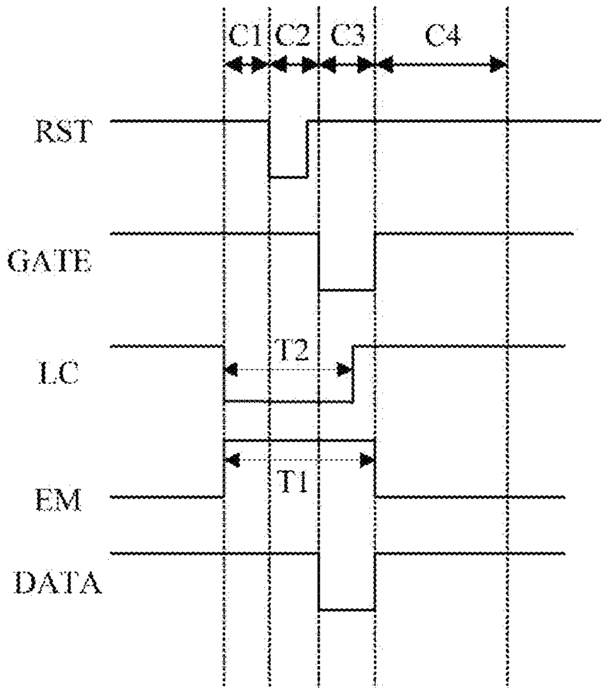
FIG. 12A is a first working time sequence diagram of a pixel circuit.
Figure 12B:
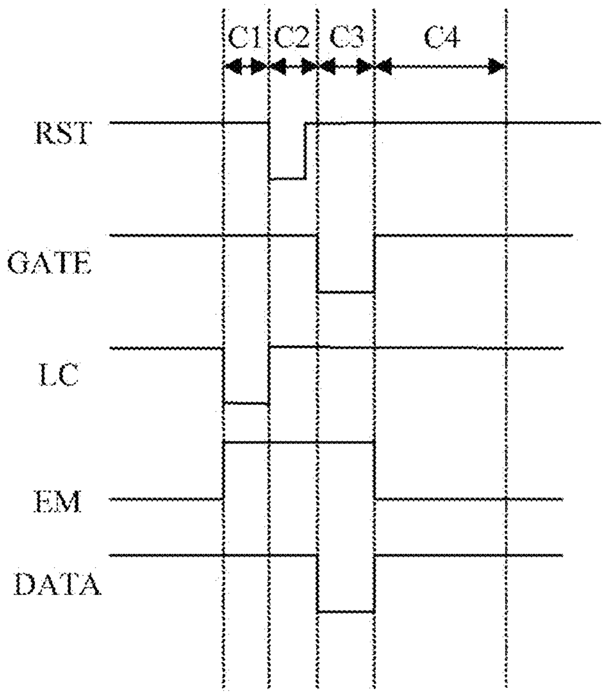
FIG. 12B is a second working time sequence diagram of a pixel circuit.

FIG. 12A is a first working time sequence diagram of a pixel circuit, and FIG. 12B is a second working time sequence diagram of the pixel circuit. Signals of an anode voltage control terminal in the working time sequence diagram of FIG. 12A are generated by the anode voltage driving shift register provided in FIG. 10A. Signals of an anode voltage control terminal in the working time sequence diagram of FIG. 12B is generated by the anode voltage driving shift register provided in FIG. 11A. An exemplary embodiment of the present disclosure will be described below through the working process of the pixel circuit shown in FIG. 12A. The pixel circuit in FIG. 9 includes seven transistors (the first transistor T1 to the seventh transistor T7), one storage capacitor C, and eight signal input terminals (the data signal terminal DATA, the scan signal terminal GATE, the reset signal terminal RST, the initial signal terminal INIT, the light emitting signal terminal EM, the anode voltage control terminal LC and the anode voltage signal terminal LS). The seven transistors being all P-type transistors are illustrated as an example in FIG. 12A. The working process of the pixel circuit may include the following stages.

In a first stage C1, signals of the anode voltage control terminal LC are low-level signals, and signals of the reset signal terminal RST, the scan signal terminal GATE and the light emitting signal terminal EM are high-level signals. The signals of the anode voltage control terminal LC are low-level signals to cause the seventh transistor T7 to be turned on, and signals of the anode voltage signal terminal LS are provided to the anode of the light emitting element L, to initialize (reset) the anode of the light emitting element L and clear its internal pre-stored voltage to complete the initialization, so as to ensure that the light emitting element L does not emit light. The signals of the reset signal terminal RST, the scan signal terminal GATE and the light emitting signal terminal EM are high-level signals, to cause the first transistor T1, the second transistor T2, the fourth transistor T4, the fifth transistor T5 and the sixth transistor T6 to be turned off. The light emitting element does not emit light in this stage.

In a second stage C2, the signals of the anode voltage control terminal LC and the reset signal terminal RST are low-level signals, and the signals of the scan signal terminal GATE and the light emitting signal terminal EM are high-level signals. The signals of the anode voltage control terminal LC remain low-level signals, to cause the seventh transistor T7 to keep being turned on, and the signals of the anode voltage signal terminal LS are provided to the anode of the light emitting element L continuously, to keep initializing (resetting) the anode of the light emitting element L. The signals of the reset signal terminal RST are low-level signals, to cause the first transistor T1 to keep being turned on, and signals of the initial signal terminal INIT are provided to the second node N2 to initialize the storage capacitor C to clear the original data voltage in the storage capacitor. The signals of the scan signal terminal GATE and the light emitting signal terminal EM are high-level signals, to cause the second transistor T2, the fourth transistor T4, the fifth transistor T5, the sixth transistor T6 and the seventh transistor T7 to be turned off. The light emitting element L does not emit light in this stage.

In a third stage C3, which is called a data writing stage or a threshold compensation stage, the signals of the anode voltage control terminal LC and the scan signal terminal GATE are low-level signals, the signals of the reset signal terminal RST and the light emitting signal terminal EM are high-level signals, and the data signal terminal D outputs a data voltage. In this stage, because signals of the second node are low-level signals, the third transistor T3 is turned on. The signals of the anode voltage control terminal LC remain low-level signals, to cause the seventh transistor T7 to keep being turned on, and the signals of the anode voltage signal terminal LS are provided to the anode of the light emitting element L continuously, to keep initializing (resetting) the anode of the light emitting element L. The signals of the scan signal terminal GATA are low-level signals, to cause the second transistor T2 and the fourth transistor T4 to be turned on. The second transistor T2 and the fourth transistor T4 are turned on, to cause the data voltage outputted by the data signal terminal DATA to be provided to the second node N2 through the first node N1, the turned-on third transistor T3, the third node N3 and the turned-on second transistor T2 until the voltage of the second node N2 become Vd-|Vth|, wherein Vd is the data voltage outputted by the data signal terminal DATA and Vth is a threshold voltage of the third transistor T3. The signals of the reset signal terminal RST and the light emitting signal terminal EM are high-level signals, to cause the first transistor T1, the fifth transistor T5 and the sixth transistor T6 to be turned off. The light emitting element EL does not emit light in this stage.

In a fourth stage C4, which is called a light emitting stage, the signals of the light emitting signal terminal EM are low-level signals, and the signals of the anode voltage control terminal LC, the reset signal terminal RST and the scan signal terminal GATE are high-level signals. The signals of the light emitting signal terminal EM are low-level signals, to cause the fifth transistor T5 and the sixth transistor T6 to be turned on, and a power supply voltage outputted by the first power terminal VDD provides a driving voltage to the anode of the light emitting element L through the fifth transistor T5, third transistor T3 and sixth transistor T6, which are turned on, to drive the light emitting element L to emit light. The signals of the anode voltage control terminal LC, the reset signal terminal RST and the light emitting signal terminal EM are high-level signals, to cause the first transistor T1, the second transistor T2, the fourth transistor T4 and the seventh transistor T7 to be turned off.

In a driving process of the pixel circuit, a driving current flowing through the third transistor T3 (the driving transistor) is determined by a voltage difference between the control electrode and first electrode of the third transistor T3. Because the voltage of the second node N2 is Vdata-|Vth|, the driving current of the third transistor T3 satisfies:

$$I = K*(Vgs - Vth)^2 = K*[Vdd - Vd + |Vth|) - Vth]^2 = K*[(Vdd - Vd]^2$$

wherein I is the driving current flowing through the third transistor T3, that is, the driving current for driving the OLED, K is a constant, Vgs is the voltage difference between the control electrode and the first electrode of the third transistor T3, Vth is the threshold voltage of the third transistor T3, Vd is the data voltage outputted by the data signal terminal DATA, and Vdd is the power supply voltage outputted by the first power terminal VDD.

The working process of the pixel circuit in FIG. 12B is similar to that of the pixel circuit in FIG. 12A, and the only difference between them is that the signals of the anode voltage control terminal LC in the pixel circuit in FIG. 12B are low-level signals only in the first stage and are high-level signals in the second and third stages, that is, the seventh transistor T7 is turned off in the second and third stages, and the signals of the anode voltage signal terminal cannot be written to the anode of the light emitting element. A duration in which the signals of the anode voltage control terminal LC of the pixel circuit in FIG. 12B are active-level signals is less than a duration in which the signals of the anode voltage control terminal LC of the pixel circuit in FIG. 12A are active-level signals.

In an exemplary embodiment, for the pixel circuit of each sub-pixel, the signals of the anode voltage control terminal LC are inactive-level signals when the signals of the light emitting signal terminal EM are active-level signals, and the signals of the light emitting signal terminal EM are inactive-level signals when the signals of the anode voltage control terminal LC are active-level signals. A duration in which the signals of the light emitting signal terminal are inactive-level signals is greater than a duration in which the signals of the anode voltage control terminal are active-level signals.

In an exemplary embodiment, when the sub-pixels are displayed, the driving mode of each sub-pixel may include a first driving mode, a second driving mode and a third driving mode. When the driving mode of the sub-pixel is the first driving mode, the pixel circuit is configured to apply a driving current to the light emitting element continuously. When the driving mode of the sub-pixel is the second driving mode, the pixel circuit is configured to apply a driving current to the light emitting element periodically and stop applying the driving current during a time interval between any two adjacent applications of the driving current. When the driving mode of the sub-pixel is the third driving mode, the pixel circuit is configured to apply a driving current to the light emitting element periodically, and to provide a negative bias voltage signal to the anode of the light emitting element during a time interval between any two adjacent applications of the driving current to cause the light emitting element not to emit light.

In an exemplary embodiment, driving modes of sub-pixels connected to the same anode voltage driving shift register are the same.

In an exemplary embodiment, when the driving mode of the sub-pixel is the second driving mode or the third driving mode, a frequency at which the pixel circuit applies the driving current to the light emitting element is about 1 Hz to 360 Hz.

In an exemplary embodiment, the driving mode of the same sub-pixel may be different at different temperatures.

In an exemplary embodiment, as shown in FIGS. 2 and 3, the non-display area may further include a light emitting driving circuit 20, a reset driving circuit 30 and a scan driving circuit 40. The scan driving circuit 40 is connected to a sub-pixel and configured to provide a scan control signal to a pixel circuit of the connected sub-pixel to provide a data signal to the first node. The reset driving circuit 30 is connected to a sub-pixel and configured to provide a reset control signal to a pixel circuit of the connected sub-pixel to reset the second node. The light emitting driving circuit 20 is connected to a sub-pixel and configured to provide a light emitting control signal to a pixel circuit of the connected sub-pixel to provide a driving current to the light emitting element.

In an exemplary embodiment, the light emitting driving circuit is located at one side of the display area, the scan driving circuit is located at one side of the light emitting driving circuit close to the display area, and the anode voltage driving circuit and the reset driving circuit are respectively located between the light emitting driving circuit and the scan driving circuit and between the scan driving circuit and the display area.

In an exemplary embodiment, the scan driving circuit includes M cascaded scan shift registers, a scan shift register at stage i being connected to the scan signal line in row i. The reset driving circuit includes M cascaded reset shift registers, a reset shift register at stage i being connected to a reset signal line in row i.

In an exemplary embodiment, the anode voltage driving circuit may be located between the light emitting driving circuit and the scan driving circuit, and the reset driving circuit may be located between the scan driving circuit and the display area, or the anode voltage driving circuit may be located between the scan driving circuit and the display area, and the reset driving circuit may be located between the light emitting driving circuit and the scan driving circuit. The anode voltage driving circuit being located between the scan driving circuit and the display area and the reset driving circuit being located between the light emitting driving circuit and the scan driving circuit are illustrated in FIG. 2 and FIG. 3 as an example.

In an exemplary embodiment, the driving circuit may be driven unilaterally or may be driven bilaterally. The driving circuit includes the anode voltage driving circuit 10, the light emitting driving circuit 20, the reset driving circuit 30 and the scan driving circuit 40. The driving circuit being driven bilaterally is illustrated in FIG. 2 and FIG. 3 as an example, the present disclosure is not limited thereto.

In an exemplary embodiment, the light emitting driving circuit may be located at the left and right sides of the display area or may be located at the left side of the display area or may be located at the right side of the display area.

In an exemplary embodiment, as shown in FIGS. 2, 4, and 6, the light emitting driving circuit 20 includes M cascaded first light emitting shift registers EM1_1 to EM1_M. The display area may further include M rows of light emitting signal lines $E_1$ to $E_M$. A light emitting signal line $E_i$ in row i is connected to a first light emitting shift register EM1_i at stage i, and is connected to light emitting signal terminals of all sub-pixels located in row i.

In an exemplary embodiment, as shown in FIG. 2, the light emitting driving circuit 20 includes K light emitting driving sub-circuits EM1 to EMK arranged along the row direction.

In an exemplary embodiment, as shown in FIGS. 2 and 5, when K=2, the K light emitting driving sub-circuits are respectively a first light emitting driving sub-circuit EM1 and a second light emitting driving sub-circuit EM2. The first light emitting driving sub-circuit includes M cascaded first light emitting shift registers EM1_1 to EM1_M, and the second light emitting driving sub-circuit includes M cascaded second light emitting shift registers EM2_1 to EM2_M.

In an exemplary embodiment, as shown in FIG. 5, the display area may further include 2M rows of light emitting signal lines $E_1$ to $E_{2M}$. A light emitting signal line $E_{2i-1}$ in row 2i-1 is connected to a first light emitting shift register EM1_i at stage i, and is connected to light emitting signal terminals of the pixel circuits of the sub-pixels of the first color and the sub-pixels of the second color located in row i. A light emitting signal line $E_{2i}$ in row 2i is connected to a second light emitting shift register EM2_i at stage i, and is connected to light emitting signal terminals of the pixel circuits of the sub-pixels of the third color in row i.

In an exemplary embodiment, a first duty cycle of a light emitting control signal outputted by the first light emitting shift register at stage i is different from a first duty cycle of a light emitting control signal outputted by the second light emitting shift register at stage i. The first duty cycle is a ratio of a duration in which the light emitting control signal is an active-level signal to first time, and the first time is the sum of a duration in which the light emitting control signal is an inactive-level signal to the duration in which the light emitting control signal is the active-level signal.

In an exemplary embodiment, as shown in FIGS. 2 and 7, when K=3, the K light emitting driving sub-circuits are respectively a first light emitting driving sub-circuit EM1, a second light emitting driving sub-circuit EM2 and a third light emitting driving sub-circuit EM3. The first light emitting driving sub-circuit includes M cascaded first light emitting shift registers EM1_1 to EM1_M, the second light emitting driving sub-circuit includes M cascaded second light emitting shift registers EM2_1 to EM2_M, and the third light emitting driving sub-circuit includes M cascaded third light emitting shift registers EM3_1 to EM3_M.

In an exemplary embodiment, as shown in FIG. 7, the display area may further include 3M rows of light emitting signal lines $E_1$ to $E_{3M}$. A light emitting signal line $E_{3i-2}$ in row 3i-2 is connected to a first light emitting shift register EM1_i at stage i, and is connected to light emitting signal terminals of the pixel circuits of the sub-pixels of the first color located in row i. A light emitting signal line $E_{3i-1}$ in row 3i-1 is connected to a second light emitting shift register EM2_i at stage i, and is connected to light emitting signal terminals of the pixel circuits of the sub-pixels of the second color located in row i. A light emitting signal line $E_{3i}$ in row 3i is connected to a third light emitting shift register EM3_i at stage i, and is connected to light emitting signal terminals of the pixel circuits of the sub-pixels of the third color located in row i.

In an exemplary embodiment, first duty cycles of light emitting control signals outputted by the first light emitting shift register at stage i, the second light emitting shift register at stage i and the third light emitting shift register at stage i are different.

Figure 13A:
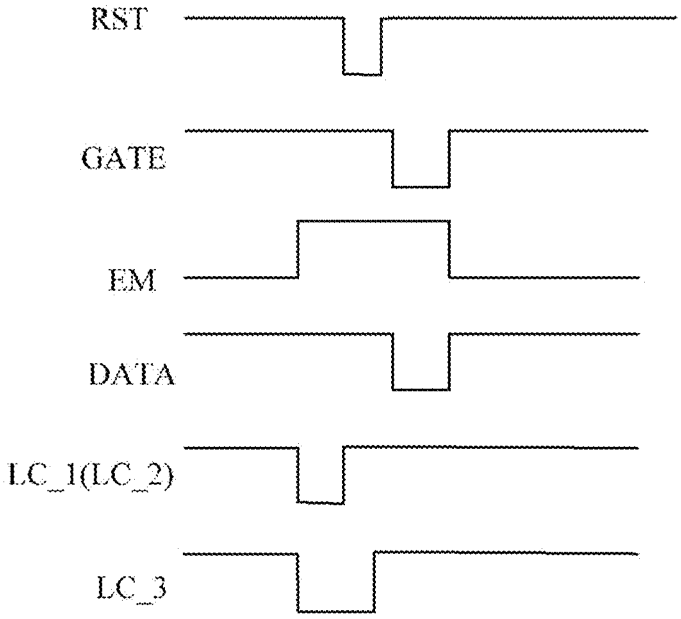
FIG. 13A is a first working time sequence diagram of a plurality of sub-pixels in a pixel unit.
Figure 13B:
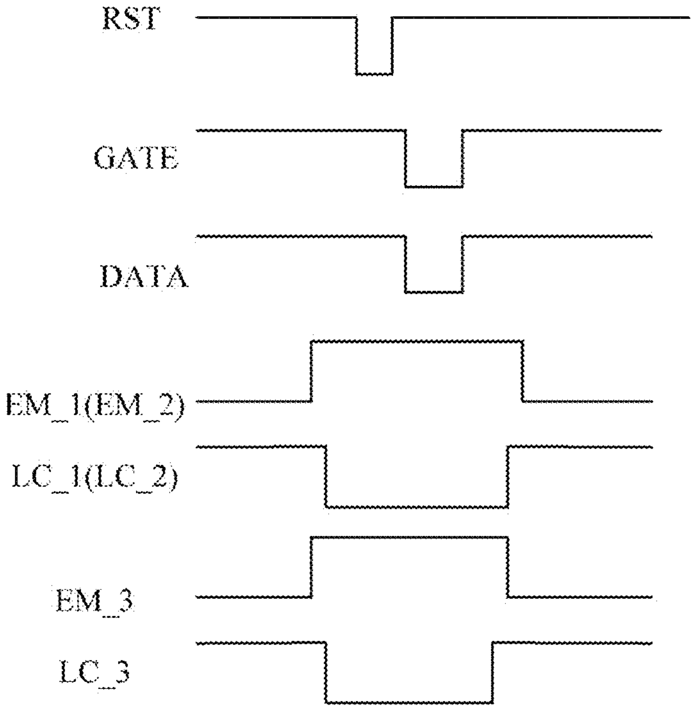
FIG. 13B is a second working time sequence diagram of a plurality of sub-pixels in a pixel unit.

In an exemplary embodiment, FIG. 13A is a first working time sequence diagram of a plurality of sub-pixels in a pixel unit, and FIG. 13B is a second working time sequence diagram of the plurality of sub-pixels in the pixel unit. Sub-pixels located in the same row being connected to the same light emitting signal line are illustrated in FIG. 13A as an example. Sub-pixels located in the same row being connected to two light emitting signal lines are illustrated in FIG. 13B as an example. LC_1 is a signal of an anode voltage control signal terminal of a sub-pixel of the first color, LC_2 is a signal of an anode voltage control signal terminal of a sub-pixel of the second color, and LC_3 is a signal of an anode voltage control signal terminal of a sub-pixel of the third color. EM_1 is a signal of a light emitting signal terminal of the sub-pixel of the first color, EM_2 is a signal of a light emitting signal terminal of the sub-pixel of the second color, and EM_3 is a signal of a light emitting signal terminal of the sub-pixel of the third color. Because the sub-pixel of the first color and the sub-pixel of the second color are connected to the same anode voltage driving shift register, LC_1 and LC_2 are the same signal. Because the sub-pixel of the first color and the sub-pixel of the second color are connected to the same light emitting shift register, EM_1 and EM_2 are the same signal.

When K=2, driving modes of the sub-pixel of the first color and the sub-pixel of the second color are the same. Driving modes of the sub-pixel of the first color and the sub-pixel of the third color may be different or the same.

In an exemplary embodiment, when the driving modes of the sub-pixel of the first color and the sub-pixel of the third color are different, the driving mode of the sub-pixel of the first color may be one of three driving modes, the driving mode of the sub-pixel of the third color may be a driving mode other than the driving mode of the sub-pixel of the first color. For example, the driving mode of the sub-pixel of the first color may be a first driving mode, and the driving mode of the sub-pixel of the third color may be a second driving mode or a third driving mode; or the driving mode of the sub-pixel of the first color may be the second driving mode, and the driving mode of the sub-pixel of the third color may be the first driving mode or the third driving mode; or the driving mode of the sub-pixel of the first color may be the third driving mode, and the driving mode of the sub-pixel of the third color may be the first driving mode or the second driving mode.

When the driving modes of the sub-pixel of the first color and the sub-pixel of the third color located in row i are the same, a second duty cycle of an anode voltage control signal outputted by the first anode voltage driving shift register at stage i is different from a second duty cycle of an anode voltage control signal outputted by the second anode voltage driving shift register at stage i, and/or a voltage of a voltage signal provided from the anode voltage signal line in row 2i-1 is different from a voltage of a voltage signal provided from the anode voltage signal line in row 2i. The second duty cycle is a ratio of a duration in which the anode voltage control signal is an inactive-level signal to second time, and the second time is the sum of the duration in which the anode voltage control signal is the inactive-level signal and a duration in which the anode voltage control signal is an active-level signal. The second duty cycle of the anode voltage control signal outputted by the first anode voltage driving shift register at stage i being different from the second duty cycle of the anode voltage control signal outputted by the second anode voltage driving shift register at stage i is illustrated in FIGS. 13A and 13B as an example.

In an exemplary embodiment, when the driving modes of the sub-pixel of the first color and the sub-pixel of the third color are the same and both are the second driving mode, the anode voltage control signals outputted by the first anode voltage driving shift register and the second anode voltage driving shift register are different.

In an exemplary embodiment, when the driving modes of the sub-pixel of the first color and the sub-pixel of the third color are the same and both are the third driving mode, the anode voltage control signals outputted by the first anode voltage driving shift register and the second anode voltage driving shift register are different, and/or the voltages of the voltage signals provided from the anode voltage signal line in row 2i-1 and the anode voltage signal line in row 2i are different.

Figure 14A:
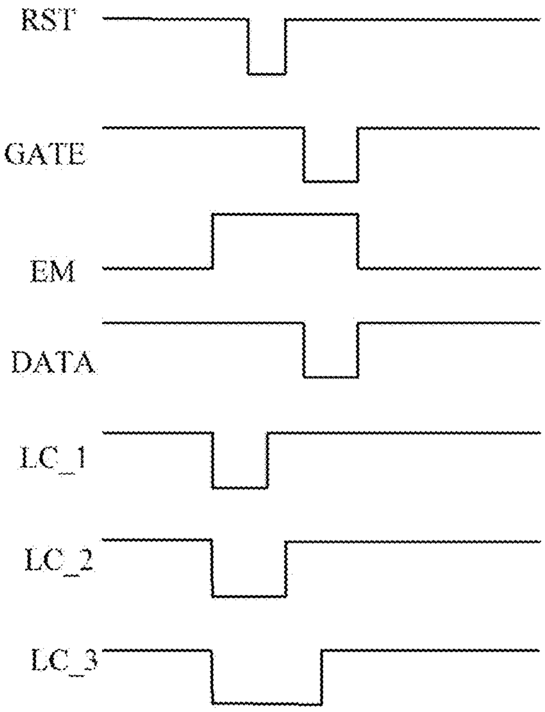
FIG. 14A is a third working time sequence diagram of a plurality of sub-pixels in a pixel unit.
Figure 14B:
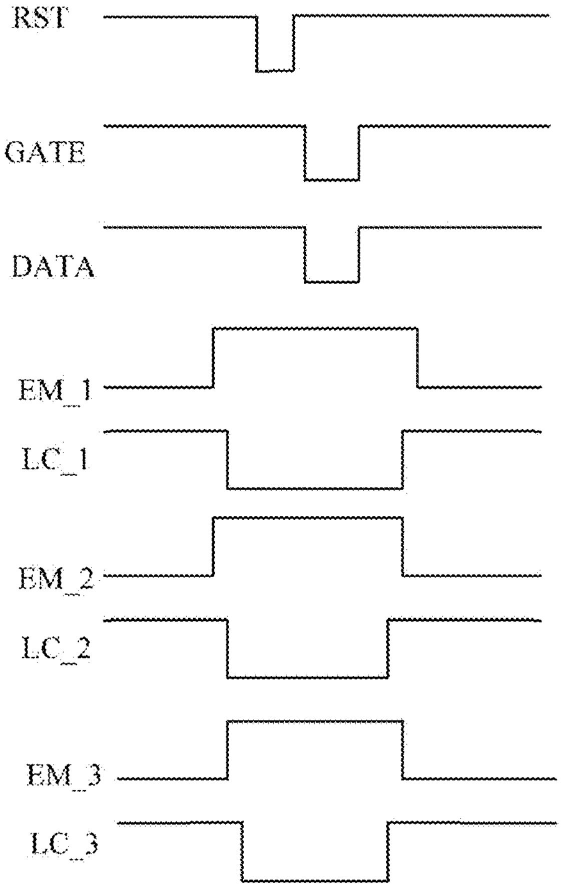
FIG. 14B is a fourth working time sequence diagram of a plurality of sub-pixels in a pixel unit.

In an exemplary embodiment, FIG. 14A is a third working time sequence diagram of a plurality of sub-pixels in a pixel unit, and FIG. 14B is a fourth working time sequence diagram of the plurality of sub-pixels in the pixel unit. Sub-pixels located in the same row being connected to the same light emitting signal line are illustrated in FIG. 14A as an example. Sub-pixels located in the same row being connected to three light emitting signal lines are illustrated in FIG. 14B as an example. LC_1 is a signal of an anode voltage control signal terminal of a sub-pixel of the first color, LC_2 is a signal of an anode voltage control signal terminal of a sub-pixel of the second color, and LC_3 is a signal of an anode voltage control signal terminal of a sub-pixel of the third color. EM_1 is a signal of a light emitting signal terminal of the sub-pixel of the first color, EM_2 is a signal of a light emitting signal terminal of the sub-pixel of the second color, and EM_3 is a signal of a light emitting signal terminal of the sub-pixel of the third color. When K=3, the driving modes of at least two of a sub-pixel of the first color, a sub-pixel of the second color and a sub-pixel of the third color are different or the driving modes of the sub-pixel of the first color, the sub-pixel of the second color and the sub-pixel of the third color are the same.

In an exemplary embodiment, the driving modes of the sub-pixel of the first color, the sub-pixel of the second color and the sub-pixel of the third color may all be different. The driving mode of the sub-pixel of the first color may be the first driving mode, the driving mode of the sub-pixel of the second color may be one of the second driving mode and the third driving mode, and the driving mode of the sub-pixel of the third color may be the other of the second driving mode and the third driving mode; or the driving mode of the sub-pixel of the first color may be the second driving mode, the driving mode of the sub-pixel of the second color may be one of the first driving mode and the third driving mode, and the driving mode of the sub-pixel of the third color may be the other of the first driving mode and the third driving mode; or the driving mode of the sub-pixel of the first color may be the third driving mode, the driving mode of the sub-pixel of the second color may be one of the first driving mode and the second driving mode, and the driving mode of the sub-pixel of the third color may be the other of the first driving mode and the second driving mode. Two of the driving modes of the sub-pixel of the first color, the sub-pixel of the second color and the sub-pixel of the third color are the same and are different from the remaining one of the driving modes of the sub-pixel of the first color, the sub-pixel of the second color and the sub-pixel of the third color. Taking the driving modes of the sub-pixel of the second color and the sub-pixel of the third color being the same as an example, the driving mode of the sub-pixel of the first color may be the first driving mode, and the driving mode of the sub-pixel of the second color may be the second driving mode or the third driving mode; or the driving mode of the sub-pixel of the first color may be the second driving mode, and the driving mode of the sub-pixel of the second color may be the first driving mode or the third driving mode; or the driving mode of the sub-pixel of the first color may be the third driving mode, and the driving mode of the sub-pixel of the second color may be the first driving mode or the second driving mode.

When the driving modes of the sub-pixels of the three colors located in row i are the same, second duty cycles of at least two of anode voltage control signals outputted by the first anode voltage driving shift register at stage i, the second anode voltage driving shift register at stage i and the third anode voltage driving shift register at stage i are different, and/or voltages of at least two of voltage signals provided by an anode voltage signal line in row 3i-2, an anode voltage signal line in row 3i-1 and an anode voltage signal line in row 3i are different. The second duty cycle is a ratio of a duration in which the anode voltage control signal is an inactive-level signal to second time, and the second time is the sum of the duration in which the anode voltage control signal is the inactive-level signal and a duration in which the anode voltage control signal is an active-level signal.

In an exemplary embodiment, when the driving modes of the sub-pixels of the first color to the third color are the same and are all the second driving mode, the anode voltage control signals outputted by the first anode voltage driving shift register and the second anode voltage driving shift register are different.

In an exemplary embodiment, when the driving modes of the sub-pixel of the first color and the sub-pixel of the third color are the same and both are the third driving mode, the anode voltage control signals outputted by the first anode voltage driving shift register to the third anode voltage driving shift register are different, and/or the voltages of the voltage signals provided from the anode voltage signal lines in row 3i-2 to row 3i are different.

In an exemplary embodiment, the sum of the first duty cycle and the second duty cycle may be less than 1.

In an exemplary embodiment, the first duty cycle may be about 30% to 99%.

In an exemplary embodiment, a value of the voltage of the voltage signal provided from the anode voltage signal line is about −0.1 volts to −10 volts, and the value of the voltage of the voltage signal provided from the anode voltage signal line is less than a reverse breakdown voltage of the light emitting element.

In the present disclosure, the value of the voltage of the voltage signal provided from the anode voltage signal line is less than the reverse breakdown voltage of the light emitting element, such that the light emitting element can be protected, thereby preventing the light emitting element from being broken down.

In an exemplary embodiment, a working process of the pixel circuit includes a light emitting stage and a non-light emitting stage. When signals of the light emitting signal terminal are active-level signals, the pixel circuit is in the light emitting stage, and when signals of the light emitting signal terminal are inactive-level signals, the pixel circuit is in the non-light emitting stage. When the driving mode of the sub-pixel is the second driving mode or the third driving mode, the non-light emitting stage includes a first non-light emitting sub-stage and a plurality of second non-light emitting sub-stages, and the light emitting stage includes a plurality of light emitting sub-stages. The first non-light emitting sub-stage occurs before the light emitting stage, and the second non-light emitting sub-stages occur between adjacent light emitting sub-stages; the light-emitting sub-stages are divided into L first periods of time, and the second non-light emitting sub-stages are divided into L second periods of time; the signals of the anode voltage control terminal in the second non-light emitting sub-stages are active-level signals. For the m-th light emitting sub-stage and the n-th second non-light emitting sub-stage, the s-th second period of time occurs between the s-th first period of time and the (s+1)-th first period of time, and the t-th first period of time occurs between the (t−1)-th second period of time and the (s+1)-th second period of time.

In the present disclosure, by dividing the light emitting sub-stages and the second non-light emitting sub-stages when the driving mode of the sub-pixel is the second driving mode or the third driving mode, a flicker phenomenon occurring in the display panel can avoided, thereby improving the display effect of the display panel.

In an exemplary embodiment, a timing controller may also be provided in the non-display area; an image displayed by the display panel includes N frames. The timing controller is configured to provide a driving signal to a driving circuit to cause the same sub-pixel to implement switching between different driving modes within different frames; the driving circuits include the anode voltage driving circuit, the light emitting driving circuit, the scan driving circuit and the reset driving circuit.

The lifespans of the sub-pixels of different colors are different under different conditions. In the present disclosure, free switching between the first driving mode, the second driving mode and the third driving mode can be implemented through the timing controller, so that the lifespans of the sub-pixels of different colors can be increased under different conditions, thereby prolonging the lifespan of white light in the display panel.

In an exemplary embodiment, the non-display area may further include a source driving circuit. The source driving circuit is connected to a data signal line and is configured to provide data signals to the data signal line.

In an exemplary embodiment, the timing controller and the source driving circuit may be disposed at the upper side or the lower side of the display area.

In an exemplary embodiment, the timing controller may provide gray-scale values and control signals adaptable to specifications of the source driving circuit to the source driving circuit, provide clock signals and scan start signals adaptable to specifications of the scan driving circuit to the scan driving circuit, and provide clock signals and emission stop signals adaptable to specifications of the light emitting driving circuit to the light emitting driving circuit.

In an exemplary embodiment, the source driving circuit may generate a data voltage to be provided to the data signal line using the gray-scale values and control signals received from the timing controller.

In an exemplary embodiment, the scan driving circuit may generate scan signals to be provided to a scan line by receiving the clock signals and the scan start signals from the timing controller. For example, the scan driving circuit may provide the scan signals to the scan line sequentially. For example, the scan driving circuit may be composed of a plurality of cascaded shift registers, and may allow each shift register to sequentially generate the scan signals under the control of the clock signals.

In an exemplary embodiment, the light emitting driving circuit may generate light emitting signals to be provided to the light emitting signal lines by receiving the clock signals and the emission stop signal from the timing controller. For example, the light emitting driving circuit may sequentially provide the light emitting signals to the light emitting signal lines. For example, the light emitting driving circuit may be composed of a plurality of cascaded shift registers, and may allow each shift register to sequentially generate the light emitting signals under the control of the clock signals.

In an exemplary embodiment, the anode voltage driving shift register includes M1 bias transistors and M2 bias capacitors, and the anode voltage driving shift register includes a first anode voltage driving shift register, a second anode voltage driving shift register or a third anode voltage driving shift register. The light emitting shift register includes M3 light emitting transistors and M4 light emitting capacitors, and the light emitting shift register includes a first light emitting shift register, a second light emitting shift register or a third light emitting shift register. Each scan shift register includes M5 scan transistors and M6 scan capacitors; each reset shift register includes M5 reset transistors and M6 reset capacitors; a way to connect the M5 scan transistors with the M6 scan capacitors is the same as a way to connect the M5 reset transistors with the M6 reset capacitors, wherein M3 is not equal to M5 and M4 is not equal to M6. M1 and M2 satisfy: M1=M5 and M2-M6 or M1=M3 and M2=M4.

In an exemplary embodiment, when M1=M5 and M2=M6, a way to connect the M1 bias transistors with the M2 bias capacitors is the same as the way to connect the M5 scan transistors with the M6 scan capacitors.

In an exemplary embodiment, when M1=M3 and M2=M4, the way to connect the M1 bias transistors with the M2 bias capacitors is the same as a way to connect the M3 light emitting transistors with the M4 light emitting capacitors.

In an exemplary embodiment, for each sub-pixel, when M1=M3 and M2=M4, a difference between the duration in which the signal of the light emitting signal terminal is the inactive-level signal and the duration in which the signal of the anode voltage control terminal is the active-level signal is less than a threshold time difference, and the duration in which the signal of the anode voltage control terminal is the active-level signal is greater than a duration in which a signal of the scan signal terminal is an active-level signal.

In an exemplary embodiment, for each sub-pixel, when M1=M5 and M2=M6, a difference between the duration in which the signal of the light emitting signal terminal is the inactive-level signal and the duration in which the signal of the anode voltage control terminal is the active-level signal is greater than the threshold time difference, and the duration in which the signal of the anode voltage control terminal is the active-level signal is equal to the duration in which the signal of the scan signal terminal is the active-level signal.

In an exemplary embodiment, as shown in FIGS. 2 to 7, the scan driving circuit includes M cascaded scan shift registers GATE_1 to GATE_M, and the scan shift register GATE_i at stage i is connected to the scan signal line $G_i$ in row i.

Figure 15A:
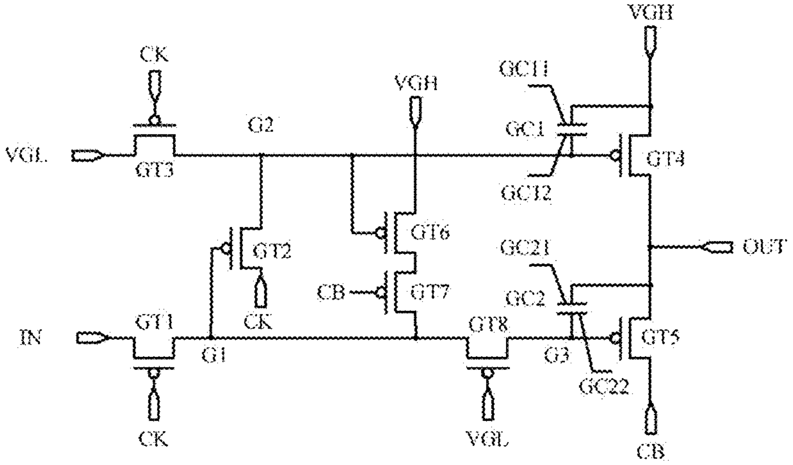
FIG. 15A is an equivalent circuit diagram of a scan shift register.

FIG. 15A is an equivalent circuit diagram of a scan shift register. As shown in FIG. 15A, in an exemplary embodiment, each scan shift register includes a first to eighth scan transistor GT1 to GT8, a first scan capacitor GC1 and a second scan capacitor GC2. A way to connect the eight bias transistors with the two bias capacitors in FIG. 11A and a way to connect the eight scan transistors with the two scan capacitors in FIG. 15A are illustrated as an example.

In an exemplary embodiment, a control electrode of the first scan transistor GT1 is connected to a first clock signal terminal CK, a first electrode of the first scan transistor GT1 is connected to a signal input terminal IN, and a second electrode of the first scan transistor GT1 is connected to a first node G1. A control electrode of the second scan transistor GT2 is connected to the first node G1, a first electrode of the second scan transistor GT2 is connected to a second node G2, and a second electrode of the second scan transistor GT2 is connected to the first clock signal terminal CK. A control electrode of the third scan transistor GT3 is connected to the first clock signal terminal CK, a first electrode of the third scan transistor GT3 is connected to a second power terminal VGL, and a second electrode of the third scan transistor GT3 is connected to the second node G2. A control electrode of the fourth scan transistor GT4 is connected to the second node G2, a first electrode of the fourth scan transistor GT4 is connected to a first power terminal VGH, and a second electrode of the fourth scan transistor GT4 is connected to an output terminal OUT. A control electrode of the fifth scan transistor GT5 is connected to a third node G3, a first electrode of the fifth scan transistor GT5 is connected to the signal output terminal OUT, and a second electrode of the fifth scan transistor GT5 is connected to a second clock signal terminal CB. A control electrode of the sixth scan transistor GT6 is connected to the second node G2, a first electrode of the sixth scan transistor GT6 is connected to the first power terminal VGH, and a second electrode of the sixth scan transistor GT6 is connected to a first electrode of the seventh scan transistor GT7. A control electrode of the seventh scan transistor GT7 is connected to the second clock signal terminal CB, and a second electrode of the seventh scan transistor GT7 is connected to the first node G1. A control electrode of the eighth scan transistor GT8 is connected to the second power terminal VGL, a first electrode of the eighth scan transistor GT8 is connected to the first node G1, and a second electrode of the eighth scan transistor GT8 is connected to the third node G3. A first electrode slab of the first scan capacitor GC1 is connected to the first power terminal VGH, and a second electrode slab of the first scan capacitor GC1 is connected to the second node G2. A first electrode slab of the second scan capacitor GC2 is connected to the signal output terminal OUT, and a second electrode slab of the second scan capacitor GC2 is connected to the third node G3.

In some exemplary implementations, the first power terminal VGH may keep providing high-level signals, and the second power terminal VGL may keep providing low-level signals.

In an exemplary embodiment, the first scan transistor GT1 to the eighth scan transistor GT8 may be P-type transistors or N-type transistors. Use of the same type of transistors in the scan driving circuit may simplify process flows, decrease process difficulties of the display panel, and improve the product yield rate.

Figure 15B:
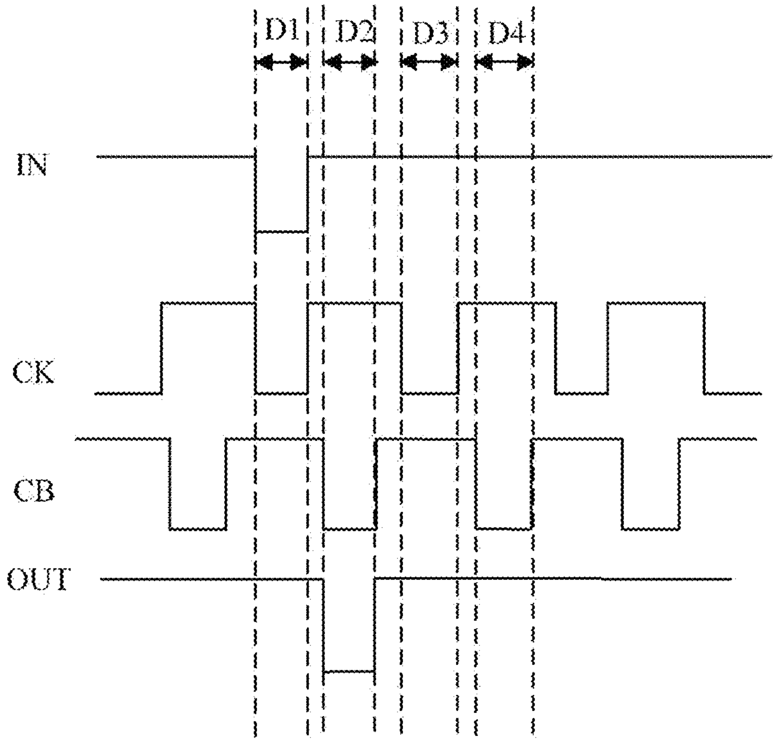
FIG. 15B is a working time sequence diagram of the scan shift register provided in FIG. 15A.

FIG. 15B is a working time sequence diagram of the scan shift register provided in FIG. 15A. The first to eighth scan transistors GT1 to GT8 are P-type transistors are illustrated in FIG. 15B as an example. As shown in FIG. 15B, a working process of a scan shift register in accordance with an exemplary embodiment may include the following stages.

In a first stage D1, signals of the signal input terminal IN and the first clock signal terminal CK are low-level signals, and signals of the second clock signal terminal CB are high-level signals. The signals of the first clock signal terminal CK are low-level signals, the first scan transistor GT1 and the third scan transistor GT3 are turned on, and signals of the eighth scan transistor GT8 receive low-level signals of the second power terminal VGL to keep it turned on. The signals of the signal input terminal IN are written to the first node G1, signals of the first node G1 are written to the third node G3, the fifth scan transistor GT5 is turned on, and the signals of the second clock signal terminal CB are transmitted to the signal output terminal OUT via the fifth scan transistor GT5. In addition, the low-level signals of the second power terminal VGL are written to the second node G2, the fourth scan transistor GT4 and the sixth scan transistor GT6 are turned on, and the high-level signals of the first power terminal VGH are written to the signal output terminal OUT. Because the signals of the second scanning clock signal terminal CB are high-level signals, the seventh scan transistor GT7 is turned off. Signals outputted by the signal output terminal OUT are high-level signals in this stage.

In a second stage D2, the signals of the signal input terminal IN and the first clock signal terminal CK are high-level signals, and the signals of the second clock signal terminal CB are low-level signals. The signals of the first clock signal terminal CK are high-level signals, the first scan transistor GT1 and the third scan transistor GT3 are turned off, the signals of the first node G1 remain low-level signals, and the signals of the eighth scan transistor GT8 receive the low-level signals of the second power terminal VGL to keep it turned on. Due to the bootstrap action of the second scan capacitor GC2, the fifth scan transistor GT5 is turned on, and the signals of the second clock signal terminal CB are written to the signal output terminal OUT. In addition, the signals of the first clock signal terminal CK are high-level signals, the second scan transistor GT2 is turned on, and the signals of the first clock signal terminal CK are written to the second node G2, thus both the fourth scan transistor GT4 and the sixth scan transistor GT6 are turned off. The signals outputted by the signal output terminal OUT are low-level signals in this stage.

In a third stage D3, the signals of the first clock signal terminal CK are low-level signals, and the signals of the signal input terminal IN and the second clock signal terminal CB are high-level signals. The signals of the first clock signal terminal CK are low-level signals, the first scan transistor GT1 and the third scan transistor GT3 are turned on, the signals of the signal input terminal IN are written to the first node G1, and the second scan transistor GT2 is turned off. Because the eighth scan transistor GT8 keeps being turned on, the signals of the first node G1 are written to the third node G3, and the fifth scan transistor GT5 is turned off. The signals of the second power terminal VGL are written to the second node G2, the fourth scan transistor GT4 and the sixth scan transistor GT6 are turned on, and the high-level signals of the third power terminal VGH are written to the signal output terminal OUT. Signals outputted by the signal output terminal OUT are high-level signals in this stage.

In a fourth stage D4, the signals of the second clock signal terminal CB are low-level signals, and the signals of the signal input terminal IN and the first clock signal terminal CK are high-level signals. The signals of the first clock signal terminal CK are high-level signals, the first scan transistor GT1 and the third scan transistor GT3 are turned off, the first node G1 maintains the high-level signals from the previous stage, and the second scan transistor GT2 is turned off. Because the eighth scan transistor GT8 keeps being turned on, the signals of the first node G1 are written to the third node G3, and the fifth scan transistor GT5 is turned off. The second node G2 maintains low-level signals, the fourth scan transistor GT4 and the sixth scan transistor GT6 are turned on, and the high-level signals of the first power terminal VGH are written to the signal output terminal OUT. The signals outputted by the signal output terminal OUT are high-level signals in this stage.

After the fourth stage D4, the third and fourth stages of the scan shift register are performed alternately until the signals of the signal input terminal IN become low-level signals.

In an exemplary embodiment, as shown in FIGS. 2 to 7, the reset driving circuit 40 includes M cascaded reset shift registers RST_1 to RST_M, and a reset shift register RST_i at stage i is connected to a reset signal line Ri in row i.

Figure 16A:
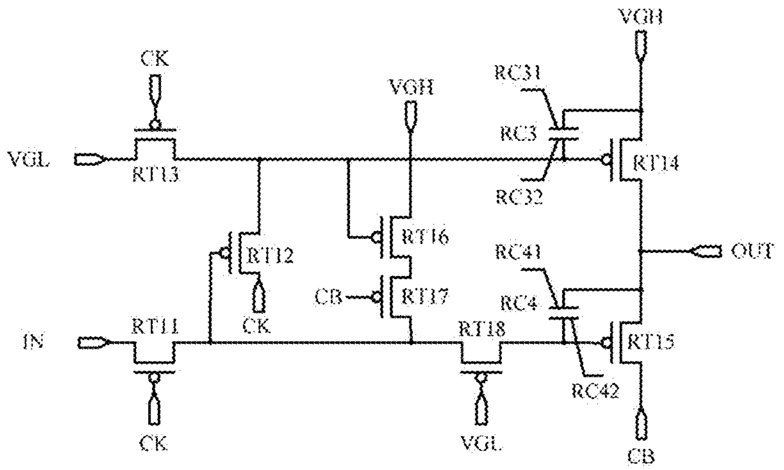
FIG. 16A is an equivalent circuit diagram of a reset shift register.

FIG. 16A is an equivalent circuit diagram of a reset shift register. As shown in FIG. 16A, in an exemplary embodiment, each reset driving circuit includes a first reset transistor RT1 to an eighth reset transistor RT8, a first reset capacitor RC1 and a second reset capacitor RC2.

In an exemplary embodiment, a control electrode of the first reset transistor RT1 is connected to a first clock signal terminal CK, a first electrode of the first reset transistor RT1 is connected to a signal input terminal IN, and a second electrode of the first reset transistor RT1 is connected to a first node R1. A control electrode of the second reset transistor RT2 is connected to the first node R1, a first electrode of the second reset transistor RT2 is connected to a second node R2, and a second electrode of the second reset transistor RT2 is connected to the first clock signal terminal CK. A control electrode of the third reset transistor RT3 is connected to the first clock signal terminal CK, a first electrode of the third reset transistor RT3 is connected to a second power terminal VGL, and a second electrode of the third reset transistor RT3 is connected to the second node R2. A control electrode of the fourth reset transistor RT4 is connected to the second node R2, a first electrode of the fourth reset transistor RT4 is connected to a first power terminal VGH, and a second electrode of the fourth reset transistor RT4 is connected to a signal output terminal OUT. A control electrode of the fifth reset transistor RT5 is connected to a third node R3, a first electrode of the fifth reset transistor RT5 is connected to the signal output terminal OUT, and a second electrode of the fifth reset transistor RT5 is connected to a second clock signal terminal CB. A control electrode of the sixth reset transistor RT6 is connected to the second node R2, a first electrode of the sixth reset transistor RT6 is connected to the first power terminal VGH, and a second electrode of the sixth reset transistor RT6 is connected to a first electrode of the seventh reset transistor RT7. A control electrode of the seventh reset transistor RT7 is connected to the second clock signal terminal CB, and a second electrode of the seventh reset transistor RT7 is connected to the first node R1. A control electrode of the eighth reset transistor RT8 is connected to a second power terminal VGL, a first electrode of the eighth reset transistor RT8 is connected to the first node R1, and a second electrode of the eighth reset transistor RT8 is connected to the third node R3. A first electrode slab of the first reset capacitor RC1 is connected to the first power terminal VGH, and a second electrode slab of the first reset capacitor RC1 is connected to the second node R2. A first electrode slab of the second reset capacitor RC2 is connected to the signal output terminal OUT, and a second electrode slab of the second reset capacitor RC2 is connected to the third node R3.

In an exemplary embodiment, the first power terminal VGH may keep providing high-level signals, and the second power terminal VGL may keep providing low-level signals.

In an exemplary embodiment, the first reset transistor RT1 to the eighth reset transistor RT8 may be P-type transistors or N-type transistors. Use of the same type of transistors in the reset shift register may simplify process flows, decrease process difficulties of the display panel, and improve the product yield rate.

Figure 16B:
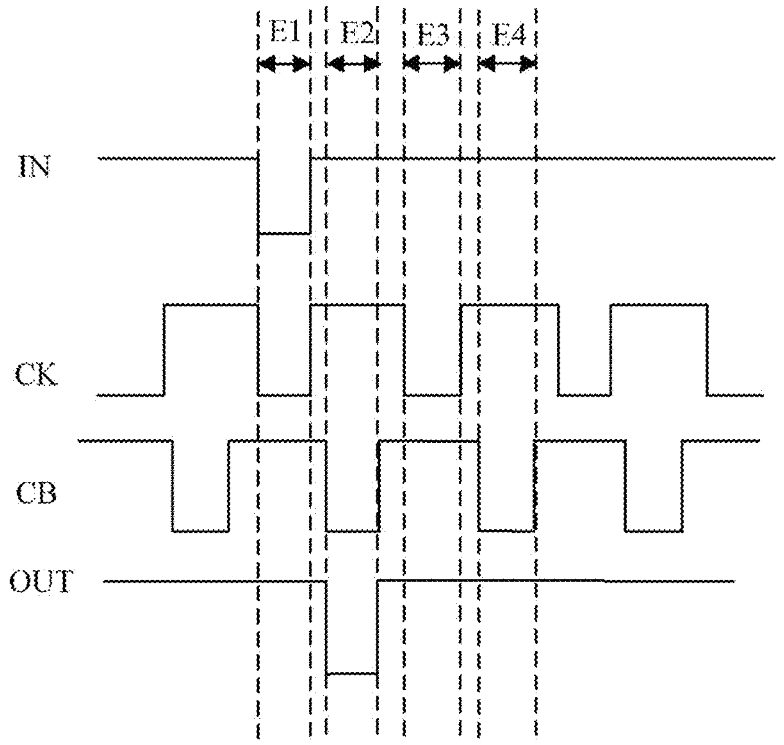
FIG. 16B is a working time sequence diagram of the reset shift register provided in FIG. 16A.

FIG. 16B is a working time sequence diagram of the reset shift register provided in FIG. 16A. The first reset transistor RT1 to the eighth reset transistor RT8 being P-type transistors are illustrated in FIG. 16B. As shown in FIG. 16B, a working process of the reset shift register in accordance with an exemplary embodiment may include the following stages.

In a first stage E1, signals of the signal input terminal IN and the first clock signal terminal CK are low-level signals, and signals of the second clock signal terminal CB are high-level signals. The signals of the first clock signal terminal CK are low-level signals, the first reset transistor RT1 and the third reset transistor RT3 are turned on, and signals of the eighth reset transistor RT8 receive low-level signals of the second power terminal VGL to keep it turned on. The signals of the signal input terminal IN are written to the first node R1, signals of the first node R1 are written to the third node R3, the fifth reset transistor RT5 is turned on, and the signals of the second clock signal terminal CB are transmitted to the signal output terminal OUT via the fifth reset transistor RT5. In addition, the low-level signals of the second power terminal VGL are written to the second node R2, the fourth reset transistor RT4 and the sixth reset transistor RT6 are turned on, and the high-level signals of the first power terminal VGH are written to the signal output terminal OUT. Because the signals of the second clock signal terminal CB are high-level signals, the seventh reset transistor RT7 is turned off. Signals outputted by the signal output terminal OUT are high-level signals in this stage.

In a second stage E2, the signals of the signal input terminal IN and the first clock signal terminal CK are high-level signals, and the signals of the second clock signal terminal CB are low-level signals. The signals of the first clock signal terminal CK are high-level signals, the first reset transistor RT1 and the third reset transistor RT3 are turned off, the signals of the first node R1 remain low-level signals, and the signals of the eighth reset transistor RT8 receive low-level signals of the second power terminal VGL to keep it turned on. Due to the bootstrap action of the fourth reset capacitor RC4, the fifth reset transistor RT5 is turned on, and the signals of the second clock signal terminal CB are written to the signal output terminal OUT. In addition, the signals of the first clock signal terminal CK are high-level signals, the second reset transistor RT2 is turned on, and the signals of the first clock signal terminal CK are written to the second node R2, thus both the fourth reset transistor RT4 and the sixth reset transistor RT6 are turned off. The signals outputted by the signal output terminal OUT are low-level signals in this stage.

In a third stage E3, the signals of the first clock signal terminal CK are low-level signals, and the signals of the signal input terminal and the second clock signal terminal CB are high-level signals. The signals of the first clock signal terminal CK are low-level signals, the first reset transistor RT1 and third reset transistor RT3 are turned on, the signals of the signal input terminal IN are written to the first node R1, and the second reset transistor RT2 is turned off. Because the eighth reset transistor RT8 keeps being turned on, the signals of the first node R1 are written to the third node R3, and the fifth reset transistor RT5 is turned off. The signals of the second power terminal VGL are written to the second node R2, the fourth reset transistor RT4 and the sixth reset transistor RT6 are turned on, and the high-level signals of the third power terminal VGH are written to the signal output terminal OUT. The signals outputted by the signal output terminal OUT are high-level signals in this stage.

In a fourth stage E4, the signals of the second clock signal terminal CB are low-level signals, and the signals of the signal input terminal IN and the first clock signal terminal CK are high-level signals. The signals of the first clock signal terminal CK are high-level signals, the first reset transistor RT1 and the third reset transistor RT3 are turned off, the first node R1 maintain the high-level signals from the previous stage, and the second reset transistor RT2 is turned off. Because the eighth reset transistor RT8 keeps being turned on, the signals of the first node R1 are written to the third node R3, and the fifth reset transistor RT5 is turned off. The second node R2 maintain low-level signals, the fourth reset transistor RT4 and the sixth reset transistor RT6 are turned on, and the high-level signals of the third power terminal VGH are written to the signal output terminal OUT. The signals outputted by the signal output terminal OUT are high-level signals in this stage.

After the fourth stage E4, the third and fourth stages of the second reset shift register are performed alternately until the signals of the signal input terminal IN become low-level signals.

Figure 17A:
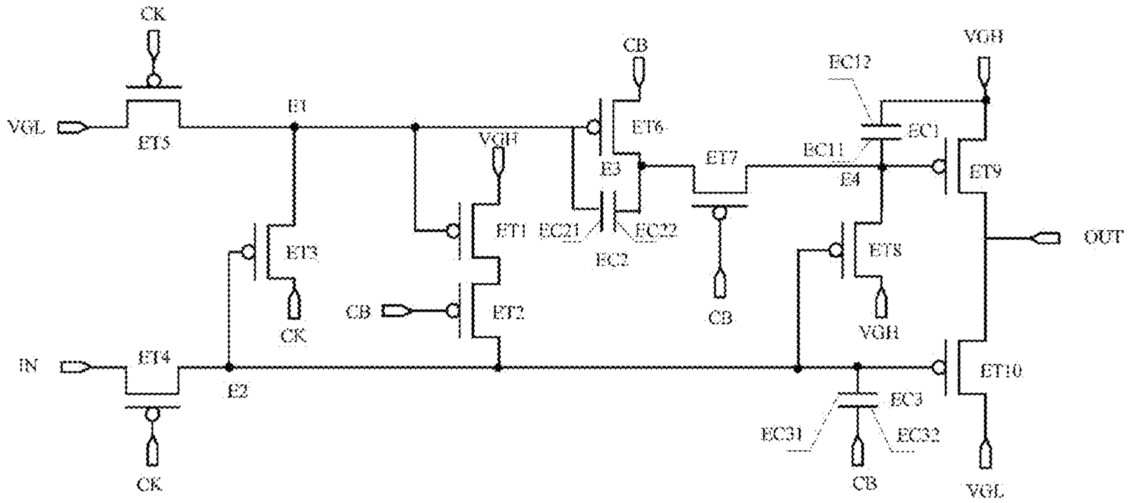
FIG. 17A is an equivalent circuit diagram of a light emitting shift register.

FIG. 17A is an equivalent circuit diagram of a light emitting shift register. As shown in FIG. 17A, the light emitting shift register includes first to tenth light emitting transistors ET1 to ET10 and first to third light emitting capacitors EC1 to EC3. A way to connect the ten bias transistors with the three bias capacitors in FIG. 10A being the same as a way to connect the ten light emitting transistors with the three light emitting capacitors in FIG. 17A is illustrated as an example.

In an exemplary embodiment, the light emitting shift register may also be a 12T3C structure, and the anode voltage bias shift register may also be a 12T3C structure, the present disclosure is not limited thereto.

In an exemplary embodiment, the light emitting shift register includes a first light emitting shift register, a second light emitting shift register or a third light emitting shift register.

In an exemplary embodiment, a control electrode of the first light emitting transistor ET1 is connected to a first node E1, a first electrode of the first light emitting transistor ET1 is connected to a first power terminal VGH, and a second electrode of the first light emitting transistor ET1 is connected to a first electrode of the second light emitting transistor ET2. A control electrode of the second light emitting transistor ET2 is connected to a second clock signal terminal CB, and a second electrode of the second light emitting transistor ET2 is connected to a second node E2. A control electrode of the third light emitting transistor ET3 is connected to the second node E2, a first electrode of the third light emitting transistor ET3 is connected to the first node E1, and a second electrode of the third light emitting transistor ET3 is connected to a first clock signal terminal CK. A control electrode of the fourth light emitting transistor ET4 is connected to the first clock signal terminal CK, a first electrode of the fourth light emitting transistor ET4 is connected to a signal input terminal IN, and a second electrode of the fourth light emitting transistor ET4 is connected to the second node E2. A control electrode of the fifth light emitting transistor ET5 is connected to the light emitting signal terminal CK, a first electrode of the fifth light emitting transistor ET5 is connected to a second power terminal VGL, and a second electrode of the fifth light emitting transistor ET5 is connected to the first node E1. A control electrode of the sixth light emitting transistor ET6 is connected to the first node E1, a first electrode of the sixth light emitting transistor ET6 is connected to the second clock signal terminal CB, a second electrode of the sixth light emitting transistor ET6 is connected to a first electrode of the seventh light emitting transistor ET7, and the second electrode of the sixth light emitting transistor ET6 is connected to a third node E3. A control electrode of the seventh light emitting transistor ET7 is connected to the second clock signal terminal CB, the first electrode of the seventh light emitting transistor ET7 is connected to the third node E3, and a second electrode of the seventh light emitting transistor ET7 is connected to a fourth node E4. A control electrode of the eighth light emitting transistor ET8 is connected to the first node E1, a first electrode of the eighth light emitting transistor ET8 is connected to the fourth node E4, and a second electrode of the eighth light emitting transistor ET8 is connected to the first power terminal VGH.

A control electrode of the ninth light emitting transistor ET9 is connected to the fourth node E4, a first electrode of the ninth light emitting transistor ET9 is connected to the first power terminal VGH, and a second electrode of the ninth light emitting transistor ET9 is connected to a signal output terminal OUT. A control electrode of the tenth light emitting transistor ET10 is connected to the first node El, a first electrode of the tenth light emitting transistor ET10 is connected to the signal output terminal OUT, and a second electrode of the tenth light emitting transistor ET10 is connected to the second power terminal VGL. A first electrode slab EC11 of the first light emitting capacitor EC1 is connected to the first node E4, and a second electrode slab EC12 of the first light emitting capacitor EC1 is connected to the first power terminal VGH. A first electrode slab EC21 of the second light emitting capacitor EC2 is connected to the first node E1, and a second electrode slab EC22 of the second light emitting capacitor EC2 is connected to the third node E3. A first electrode slab EC31 of the third light emitting capacitor EC3 is connected to the second node E2, and a second electrode slab EC32 of the third light emitting capacitor EC3 is connected to the second clock signal terminal CB.

In an exemplary embodiment, the first power terminal VGH may keep providing high-level signals, and the second power terminal VGL may keep providing low-level signals.

In an exemplary embodiment, the first light emitting transistor ET1 to the tenth light emitting transistor ET10 may be P-type transistors or N-type transistors. Use of the same type of transistors in the light emitting driving circuit may simplify process flows, decrease process difficulties of the display panel, and improve the product yield rate.

Figure 17B:
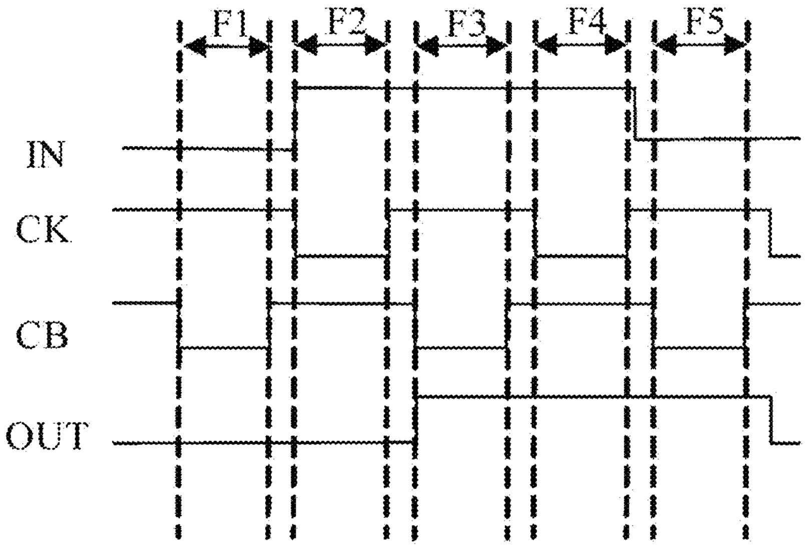
FIG. 17B is a working time sequence diagram of the light emitting shift register provided in FIG. 17A.

FIG. 17B is a working time sequence diagram of the light emitting shift register provided in FIG. 17A. The first to tenth light emitting transistors ET1 to ET10 being P-type transistors are illustrated in FIG. 17B. As shown in FIG. 17B, a working process of the light emitting shift register in accordance with an exemplary embodiment may include the following stages.

In a first stage F1, signals of the signal input terminal IN and the second clock signal terminal CB are low-level signals, and signals of the first clock signal terminal CK are high-level signals. The signals of the first clock signal terminal CK are high-level signals, the fourth light emitting transistor ET4 and the fifth light emitting transistor ET5 are turned off, the signals of the signal input terminal IN cannot be written to the second node E2, and the signals of the second power terminal VGL cannot be written to the first node E1. Under the action of the third light emitting capacitor EC3, signals of the second node E2 remain low-level signals, the third light emitting transistor ET3, the eighth light emitting transistor ET8 and the tenth light emitting transistor ET10 are turned on, the high-level signals of the first clock signal terminal CK are written to the first node E1, the first light emitting transistor ET1 and the sixth light emitting transistor ET6 are turned off, the high-level signals of the first power terminal VGH are written to the fourth node E4, and the low-level signals of the second power terminal VGL are written to the signal output terminal OUT. Signals of the third node E3 remain high-level signals, signals of the second clock signal terminal CB are low-level signals, the second light emitting transistor ET2 and the seventh light emitting transistor ET7 are turned on, the signals of the third node E3 are written to the fourth node E4, signals of the fourth node E4 remain high-level signals, and the ninth light emitting transistor ET9 is turned off. The signal output terminal OUT outputs low-level signals in this stage.

In a second stage F2, the signals of the first clock signal terminal CK are low-level signals, and the signals of the signal input terminal IN and the second clock signal terminal CB are high-level signals. The signals of the second clock signal terminal CB are high-level signals, and the second light emitting transistor ET2 and the seventh light emitting transistor ET7 are turned off. The signals of the first clock signal terminal CK are low-level signals, and the fourth light emitting transistor ET4 and the fifth light emitting transistor ET5 are turned on. The high-level signals of the signal input terminal IN are written to the second node E2, the third light emitting transistor ET3, the eighth light emitting transistor ET8 and the tenth light emitting transistor ET10 are turned off, the signals of the first clock signal terminal CK cannot be written to the first node E1, the signals of the first power terminal VGH cannot be written to the fourth node E4, the signals of the second power terminal VGL cannot be written to the signal output terminal OUT, the low-level signals of the second power terminal VGL are written to the first node E1, the first light emitting transistor ET1 and the sixth light emitting transistor ET6 are turned on, and the signals of the second clock signal terminal CB are written to the third node E3. Because the seventh light emitting transistor ET7 is turned off, the signals of the third node E3 cannot be written to the fourth node E4. The signal output terminal OUT maintains the low-level signals from the previous stage in this stage.

In a third stage F3, the signals of the second clock signal terminal CB are low-level signals, and the signals of the signal input terminal IN and of the first clock signal terminal CK are high-level signals. The signals of the first clock signal terminal CK are high-level signals, the fourth light emitting transistor ET4 and the fifth light emitting transistor ET5 are turned off, the signals of the signal input terminal IN cannot be written to the second node E2, and the signals of the second power terminal VGL cannot be written to the first node E1. Under the action of the third light emitting capacitor EC3, the signals of the second node E2 remain the high-level signals from the previous stage. Under the action of the second light emitting capacitor EC2, the signals of the first node E1 remain the low-level signals from the previous stage, the first light emitting transistor ET1 and the sixth light emitting transistor ET6 are turned on, the high-level signals of the first power terminal VGH are written to the second node E2 to cause the second node E2 to maintain the high-level signals, the low-level signals of the second clock signal terminal CB are written to the third node E3, the signals of the third node E3 are written to the fourth node E4, the ninth light emitting transistor E9 is turned on, and the high-level signals of the first power terminal VGH are written to the signal output terminal OUT. The signal output terminal OUT outputs high-level signals in this stage.

In a fourth stage F4, the signals of the first clock signal terminal CK are low-level signals, and the signals of the signal input terminal IN and the second clock signal terminal CB are high-level signals. The signals of the second clock signal terminal CB are high-level signals, and the second light emitting transistor ET2 and the seventh light emitting transistor ET7 are turned off. The signals of the first clock signal terminal CK are low-level signals, and the fourth light emitting transistor ET4 and the fifth light emitting transistor ET5 are turned on. The high-level signals of the signal input terminal IN are written to the second node E2, the third light emitting transistor ET3, the eighth light emitting transistor ET8 and the tenth light emitting transistor ET10 are turned off, the signals of the first clock signal terminal CK cannot be written to the first node E1, the signals of the first power terminal VGH cannot be written to the fourth node E4, the signals of the second power terminal VGL cannot be written to the signal output terminal OUT, the low-levels signal of the second power terminal VGL are written to the first node E1, the first light emitting transistor ET1 and the sixth light emitting transistor ET6 are turned on, and the signals of the second clock signal terminal CB are written to the third node E3. Because the seventh light emitting transistor ET7 is turned off, the signals of the third node E3 cannot be written to the fourth node E4. The signal output terminal OUT maintains the high-level signals from the previous stage in this stage.

In a fifth stage F5, the signals of the first clock signal terminal CK are high-level signals, and the signals of the signal input terminal IN and the second clock signal terminal CB are low-level signals. The signals of the first clock signal terminal CK are high-level signals, the fourth light emitting transistor ET4 and the fifth light emitting transistor ET5 are turned off, the signals of the signal input terminal IN cannot be written to the second node E2, and the signals of the second power terminal VGL cannot be written to the first node E1. Under the action of the third light emitting capacitor EC3, the signals of the second node E2 remain the high-level signals from the previous stage. Under the action of the second light emitting capacitor EC2, the signals of the first node E1 remain the low-level signals from the previous stage, the first light emitting transistor ET1 and the sixth light emitting transistor ET6 are turned on, the high-level signals of the first power terminal VGH are written to the second node E2 to cause the second node E2 to maintain the high-level signals, the low-level signals of the second clock signal terminal CB are written to the third node E3, the signals of the third node E3 are written to the fourth node E4, the ninth light emitting transistor E9 is turned on, and the high-level signals of the first power terminal VGH are written to the signal output terminal OUT. The signal output terminal OUT outputs high-level signals in this stage.

Figure 18:
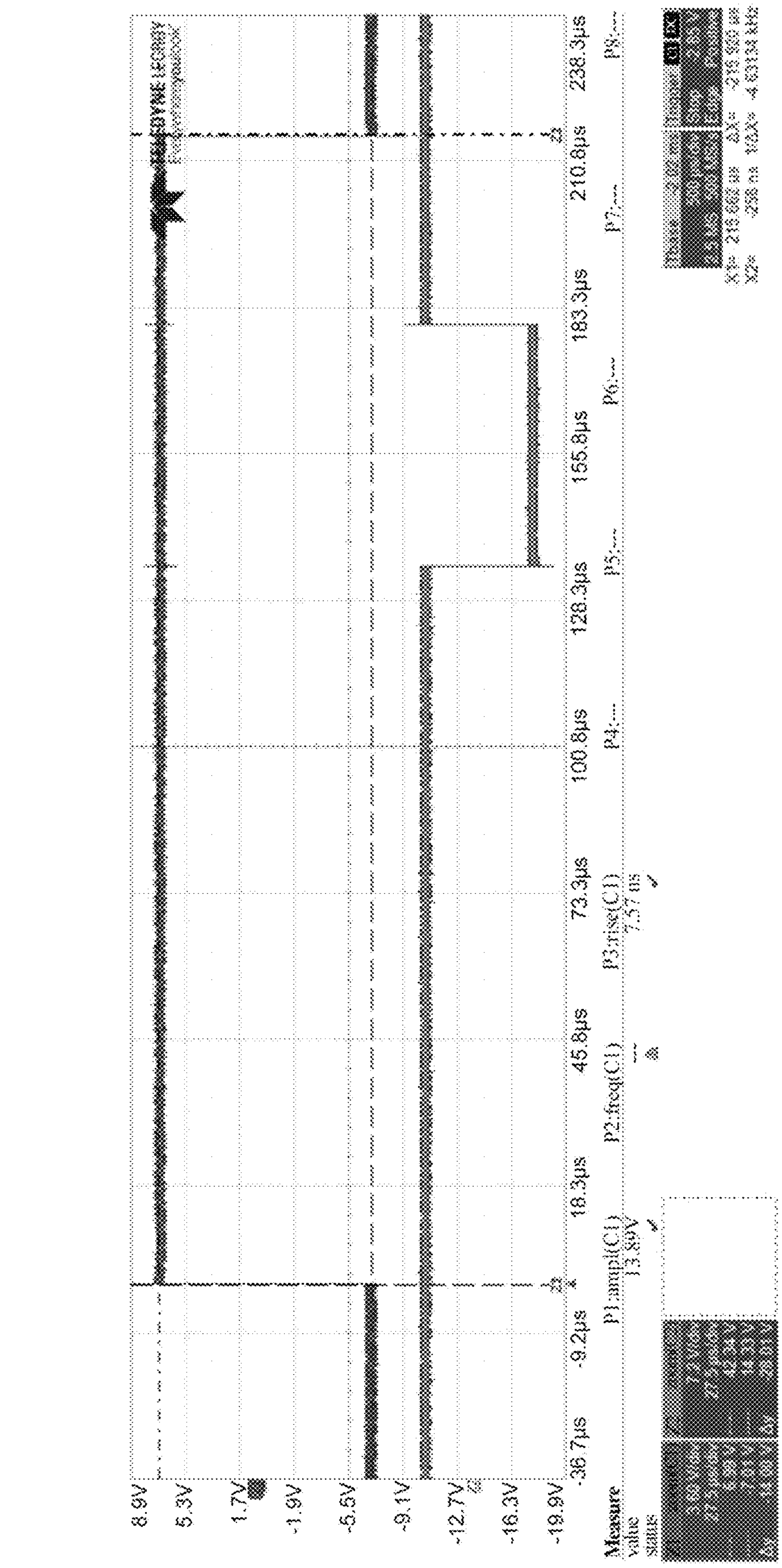
FIGS. 18 and 19 are waveform graphs of input signals of driving circuits in accordance with an exemplary embodiment.
Figure 19:
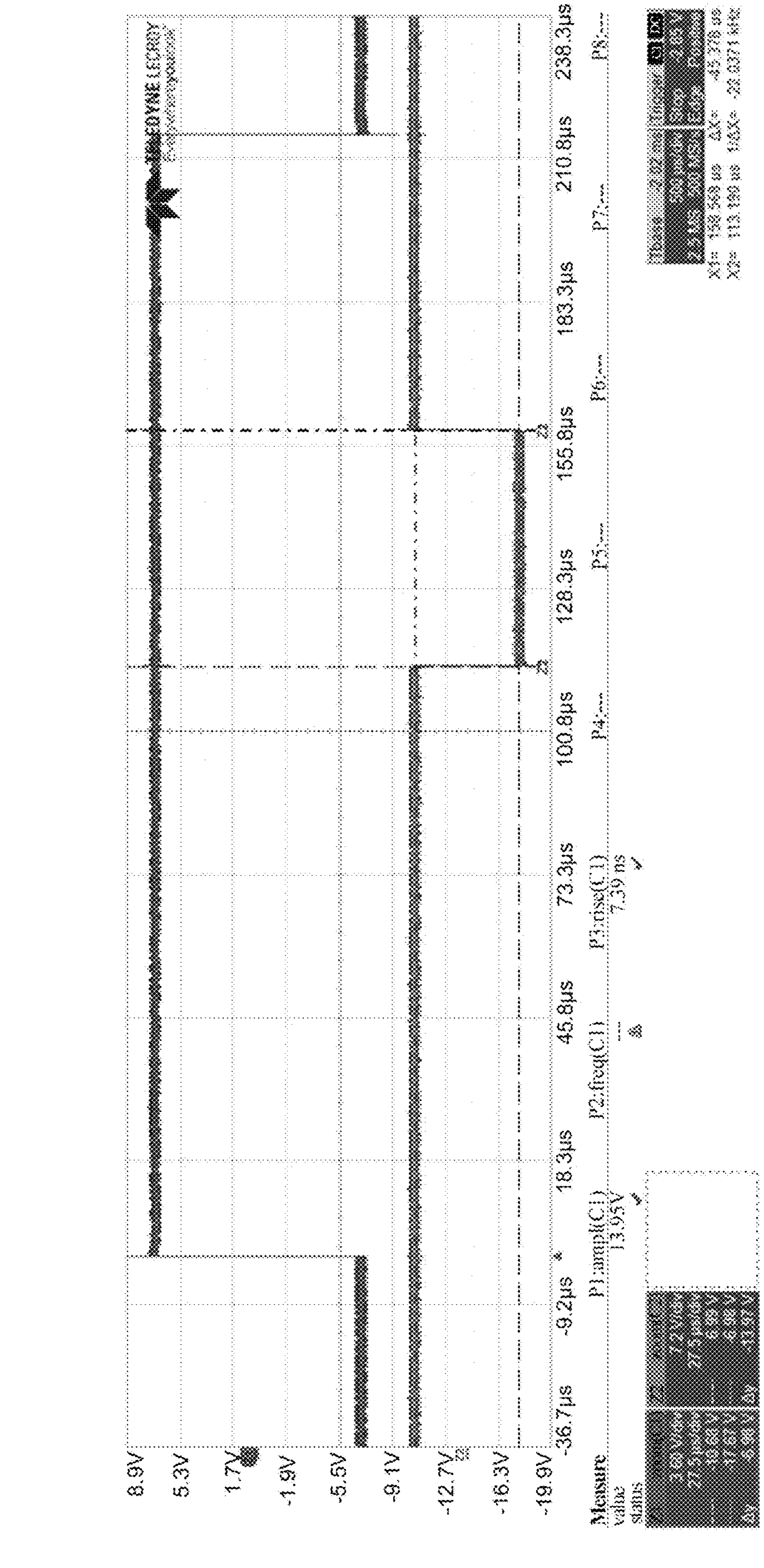

In an exemplary embodiment, FIGS. 18 and 19 are waveform graphs of input signals of driving circuits in accordance with an exemplary embodiment; and FIGS. 20 to 33 are waveform graphs of output signals of driving circuits in accordance with an exemplary embodiment. The waveform graphs with the resolution being 1920*720, the frequency being 60 Hz, a frame being 733 rows and 1H time being 1/60/733=22.74 μs are illustrated in FIGS. 18 to 33 as examples. The waveform graphs of the signals in FIGS. 18 to 33 are measured waveform graphs.

Figure 20:
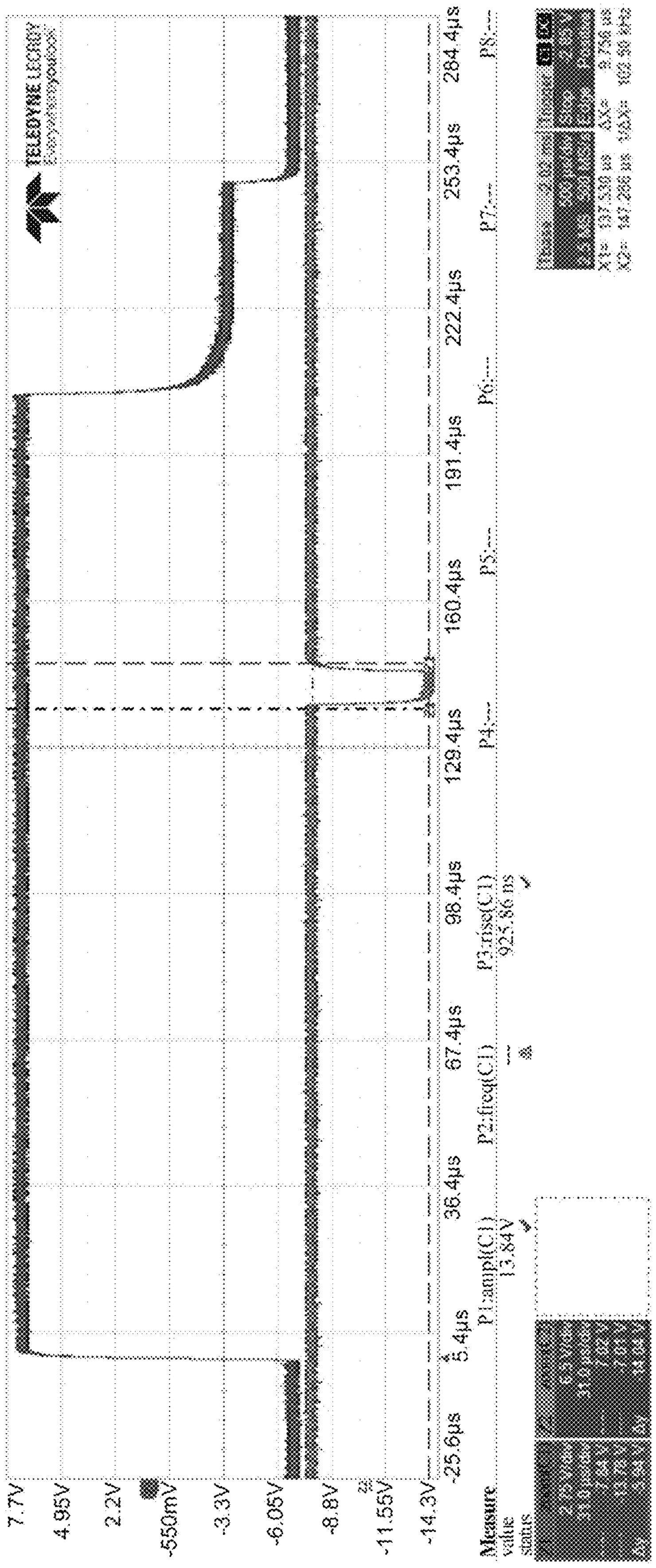
FIGS. 20 to 33 are waveform graphs of output signals of driving circuits in accordance with an exemplary embodiment.
Figure 21:
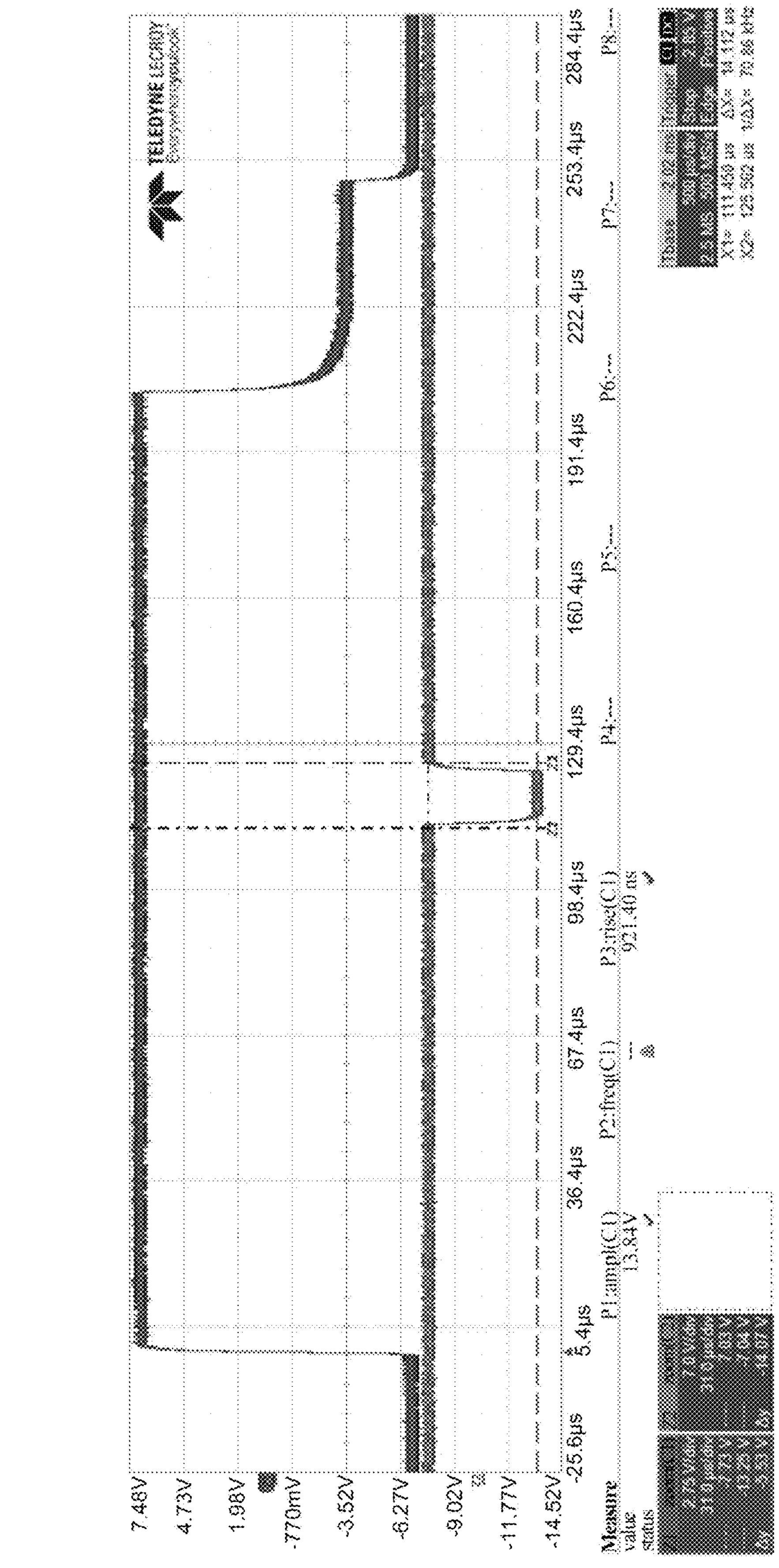

As shown in FIG. 18, what's in the upper portion is a waveform graph of an input signal of a light emitting driving circuit, and what's in the lower portion is a waveform graph of an input signal of a scan driving circuit. As shown in FIG. 19, what's in the upper portion is a waveform graph of an input signal of a light emitting driving circuit, and what's in the lower portion is a waveform graph of an input signal of a reset driving circuit. As shown in FIG. 20, what's in the upper portion is a waveform graph of an output signal of a light emitting driving circuit, and what's in the lower portion is a waveform graph of an output signal of a scan driving circuit. As shown in FIG. 21, what's in the upper portion is a waveform graph of an input signal of a light emitting driving circuit, and what's in the lower portion is a waveform graph of an input signal of a reset driving circuit. Within one frame, a period of time during which the input signal of the light emitting driving circuit is disabled is 9H (9*22.74≈204.64 μs, which is measured to be 215.92 μs in FIG. 18, and the measured value of which conforms to its theoretical value), and a period of time during which the input signal of the reset driving circuit is enabled is 2H (45.47 μs, which is measured to be 45.39 μs in FIG. 19, and the measured value of which conforms to its theoretical value). As shown in FIGS. 20 and 21, the output signal of the reset driving circuit is earlier than the output signal of the scan driving circuit.

Figure 22:
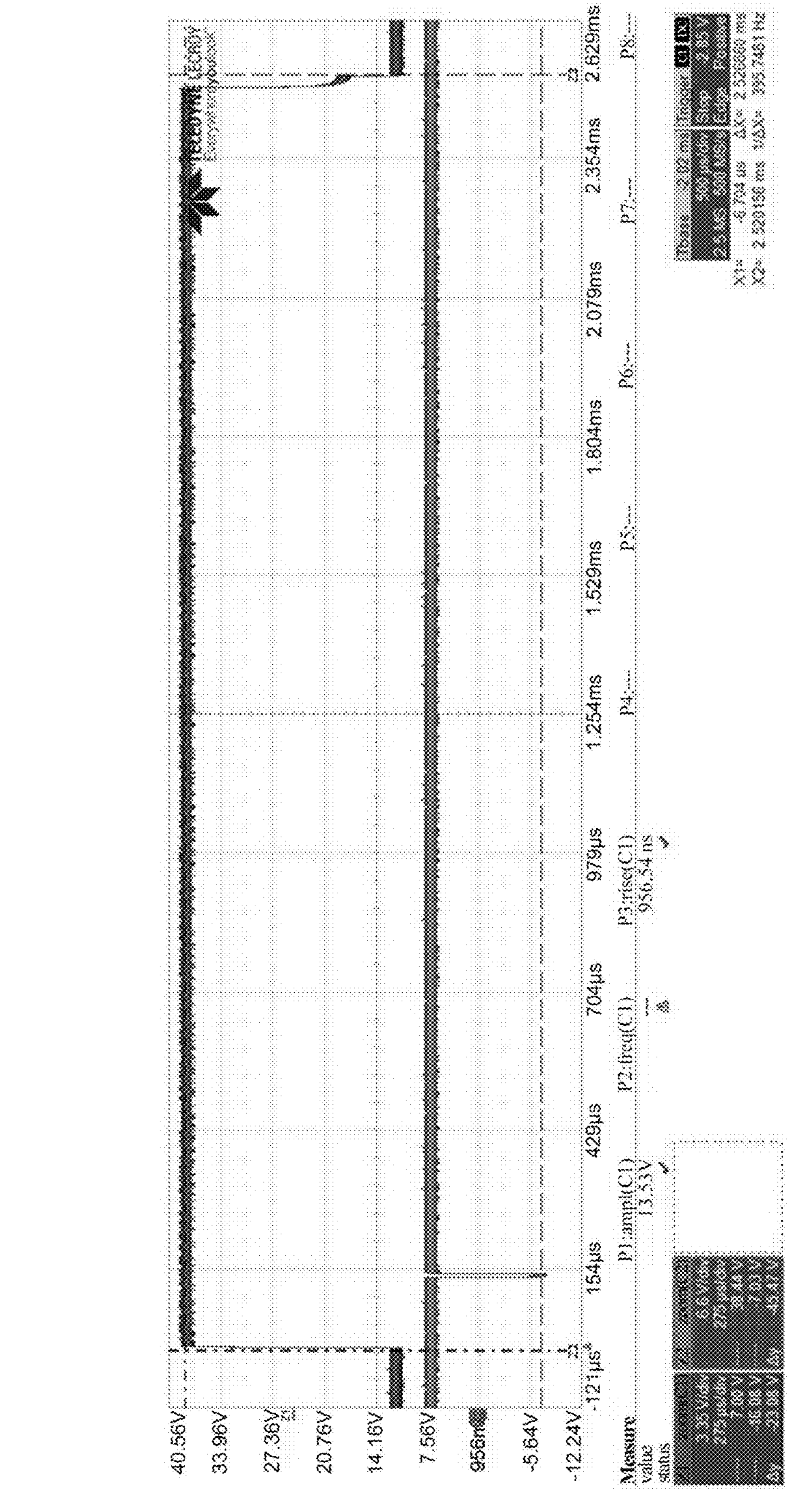
Figure 23:
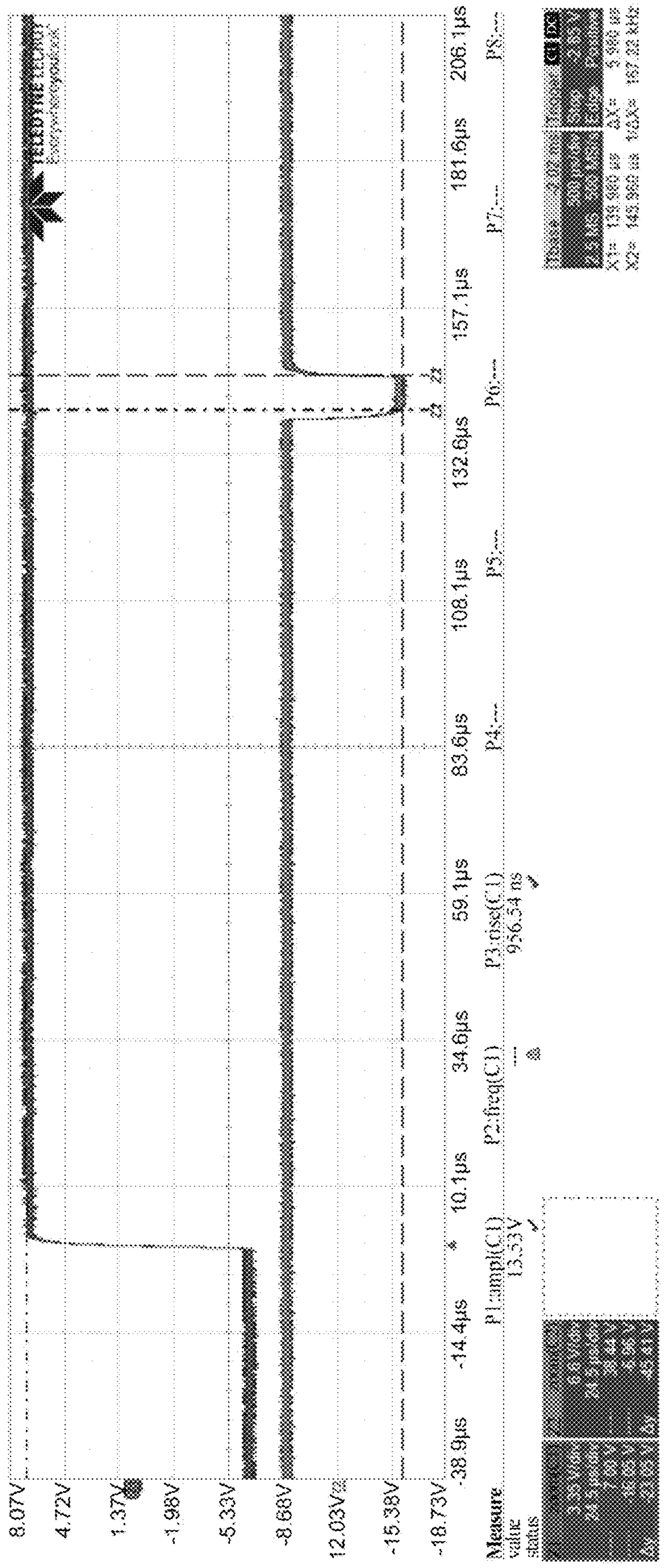
Figure 24:
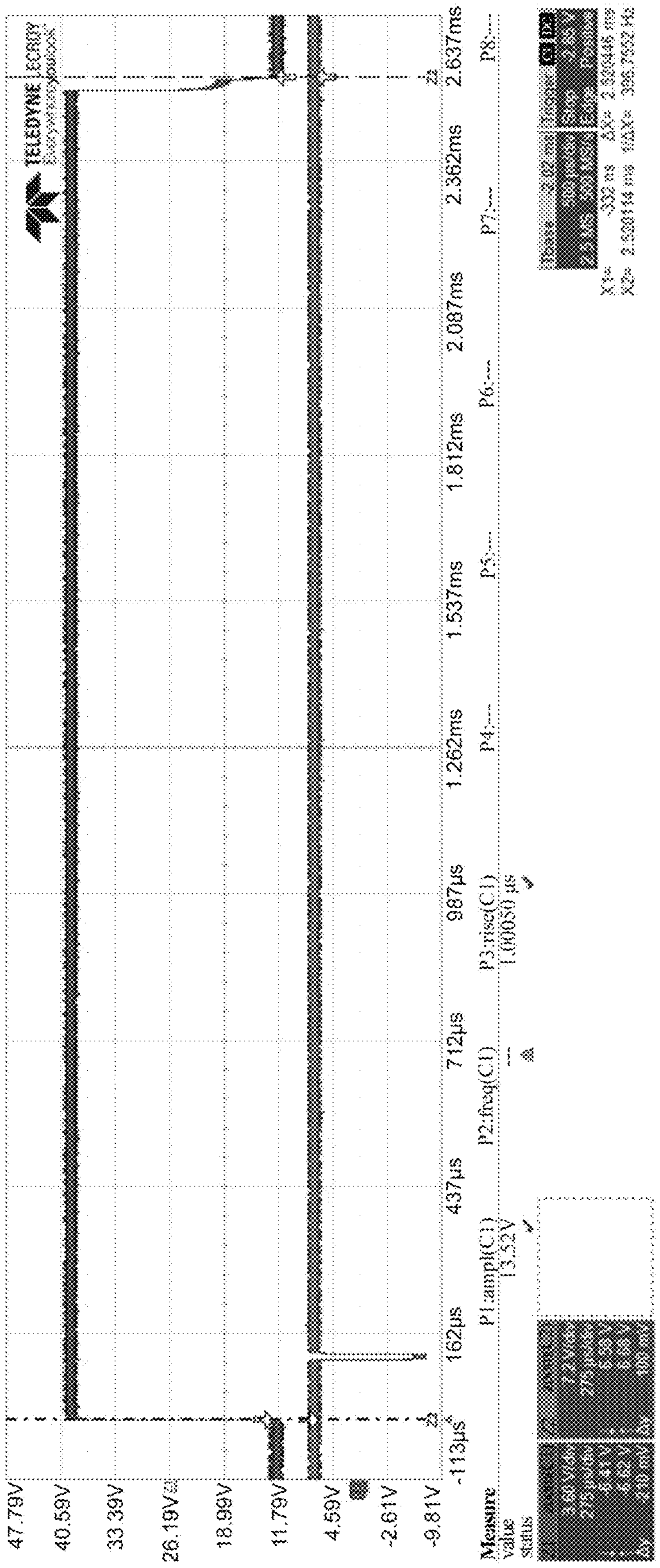
Figure 25:
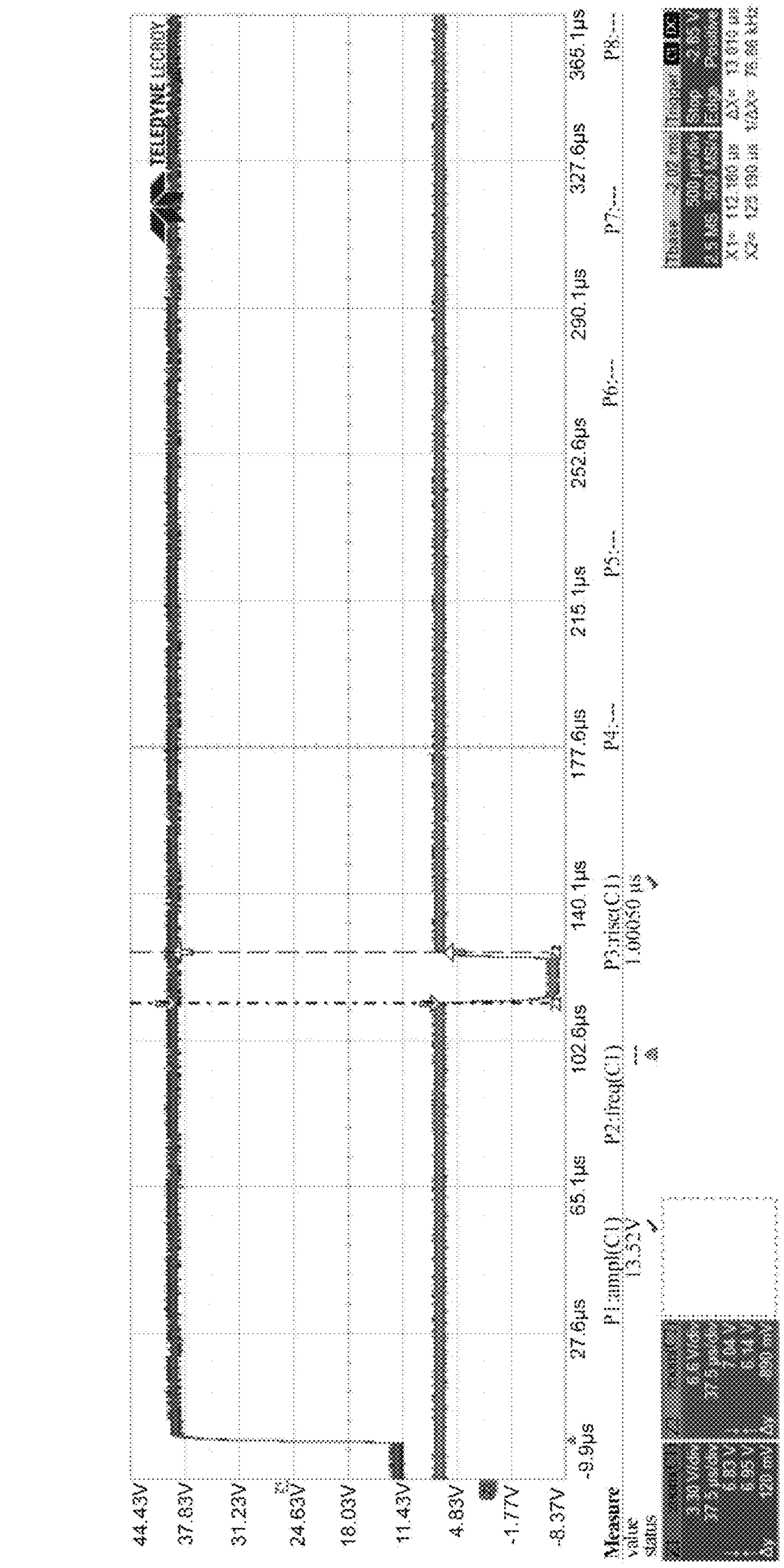
Figure 26:
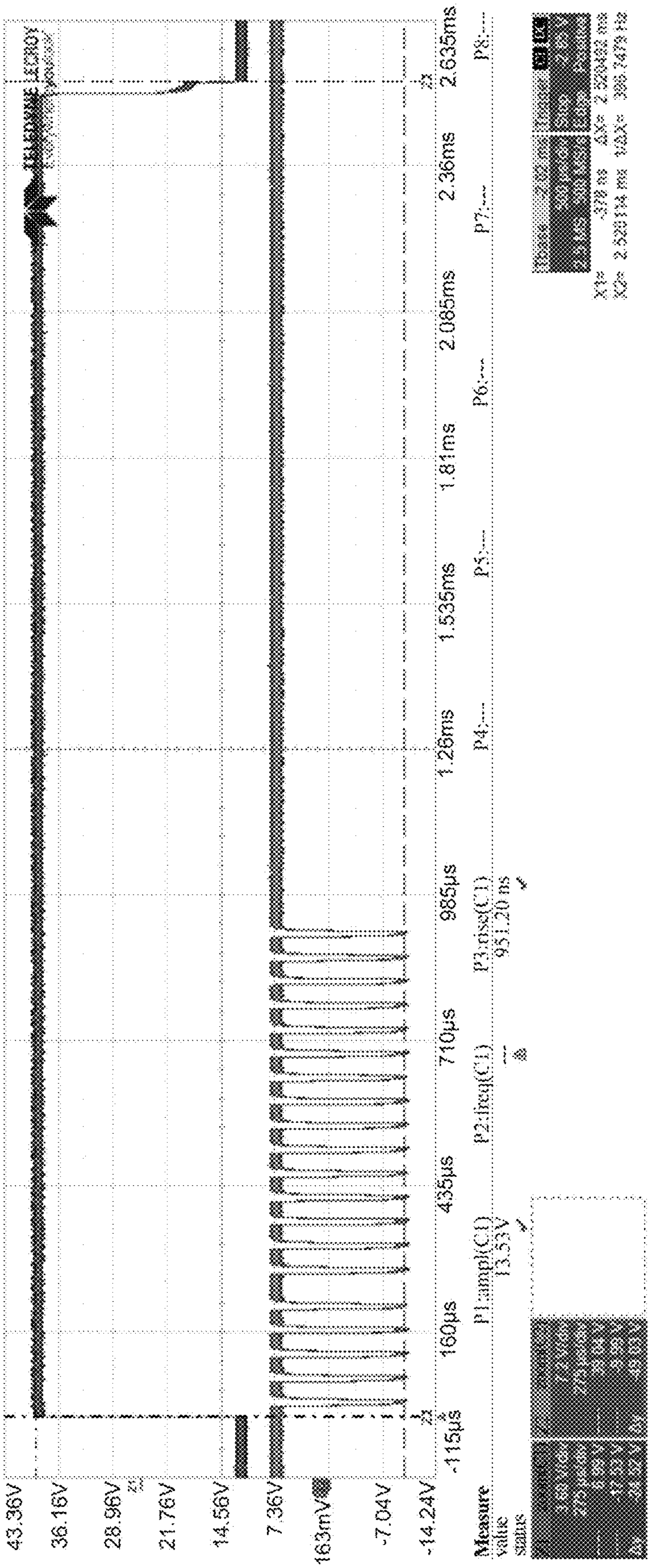
Figure 27:
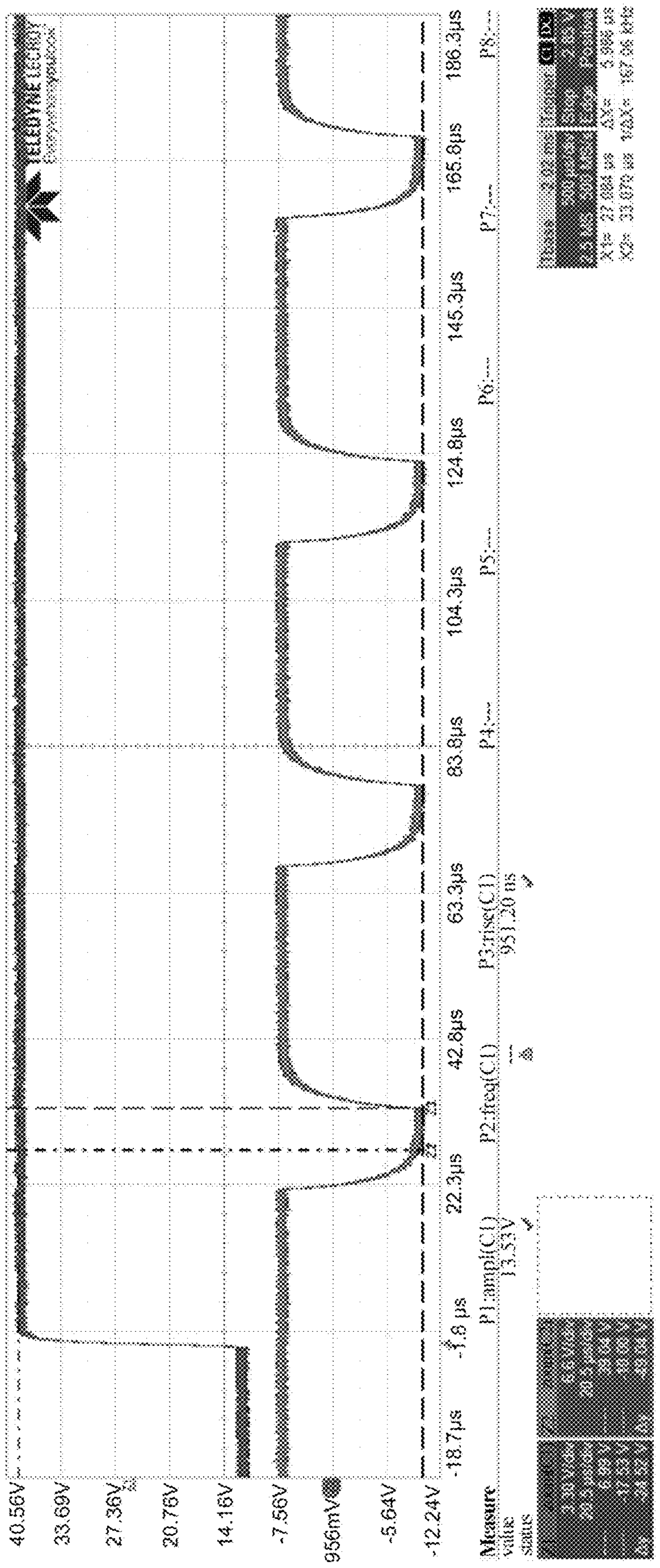

In an exemplary embodiment, a duty cycle of a driving current being 85% is illustrated in FIGS. 22 to 27 as an example. As shown in FIGS. 22 and 23, what's in the upper portion is a waveform graph of an output signal of a light emitting driving circuit, and what's in the lower portion is a waveform graph of an output signal of a scan driving circuit, wherein FIG. 23 is an enlarged view of FIG. 22. It can be seen from FIGS. 22 and 23 that a period of time during which the scan driving circuit outputs signals is about 5.98 microseconds. As shown in FIGS. 24 and 25, what's in the upper portion is a waveform graph of an output signal of a light emitting driving circuit, and what's in the lower portion is a waveform graph of an output signal of a reset driving circuit, wherein FIG. 25 is an enlarged view of FIG. 24. As shown in FIGS. 26 and 27, what's in the upper portion is a waveform graph of an output signal of a light emitting driving circuit, and what's in the lower portion is a waveform graph of an output signal of a driving circuit which can output pulse voltages, wherein FIG. 27 is an enlarged view of FIG. 26.

Figure 28:
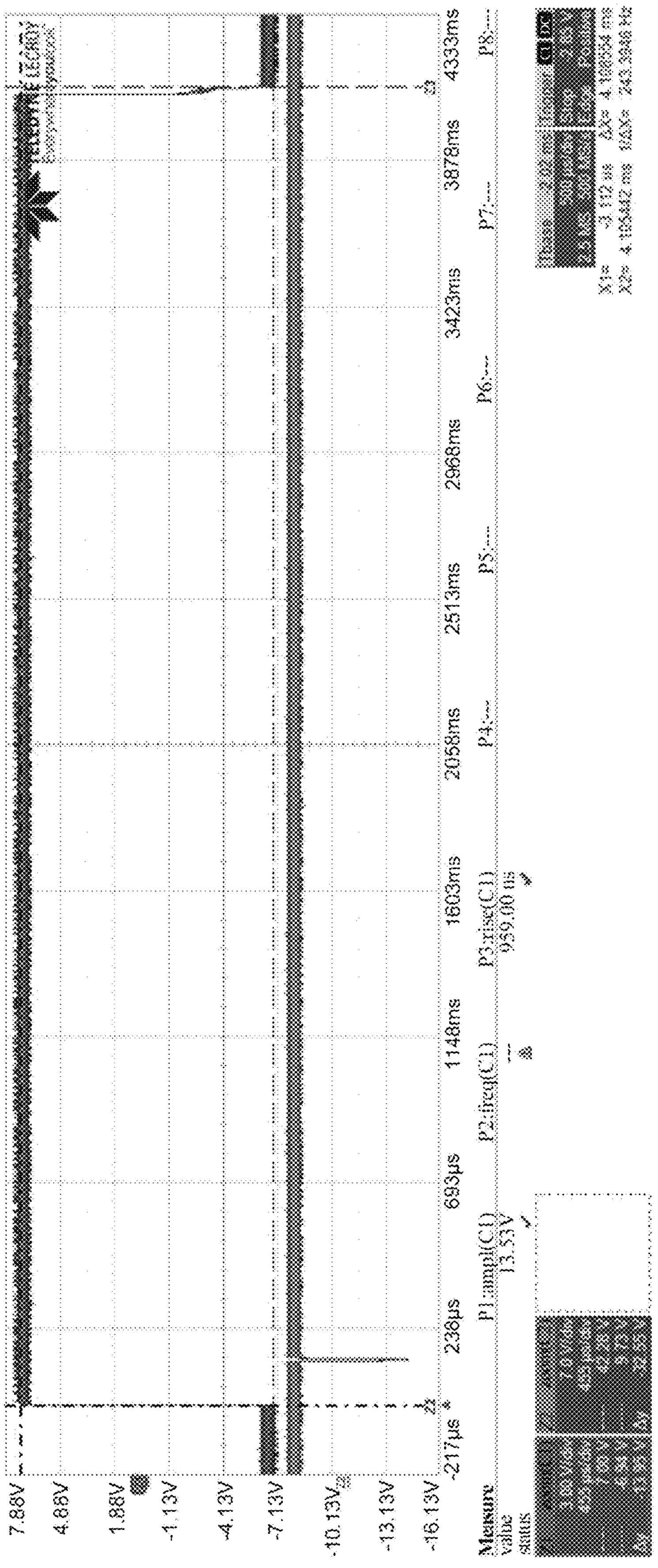
Figure 29:
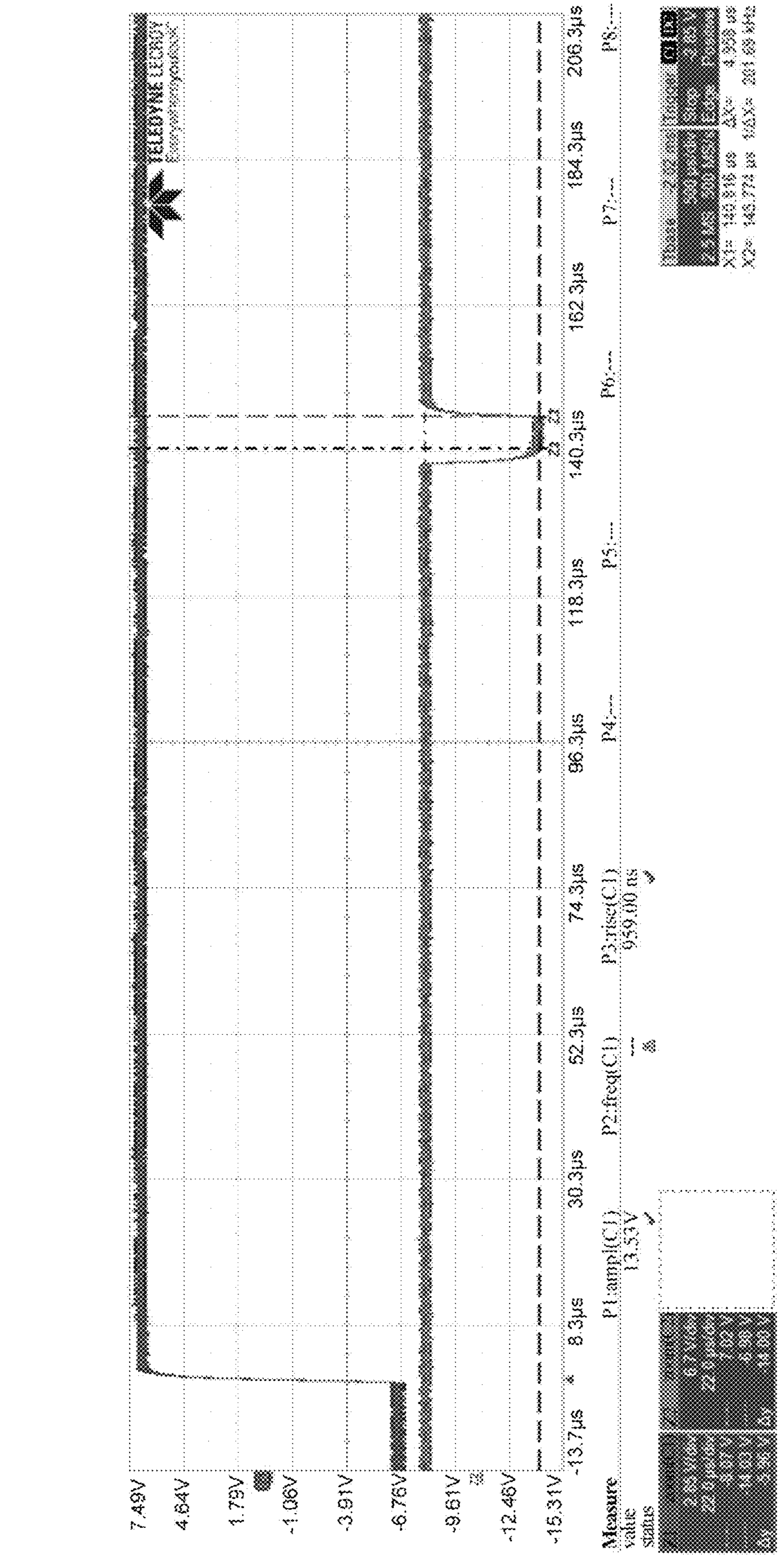
Figure 30:
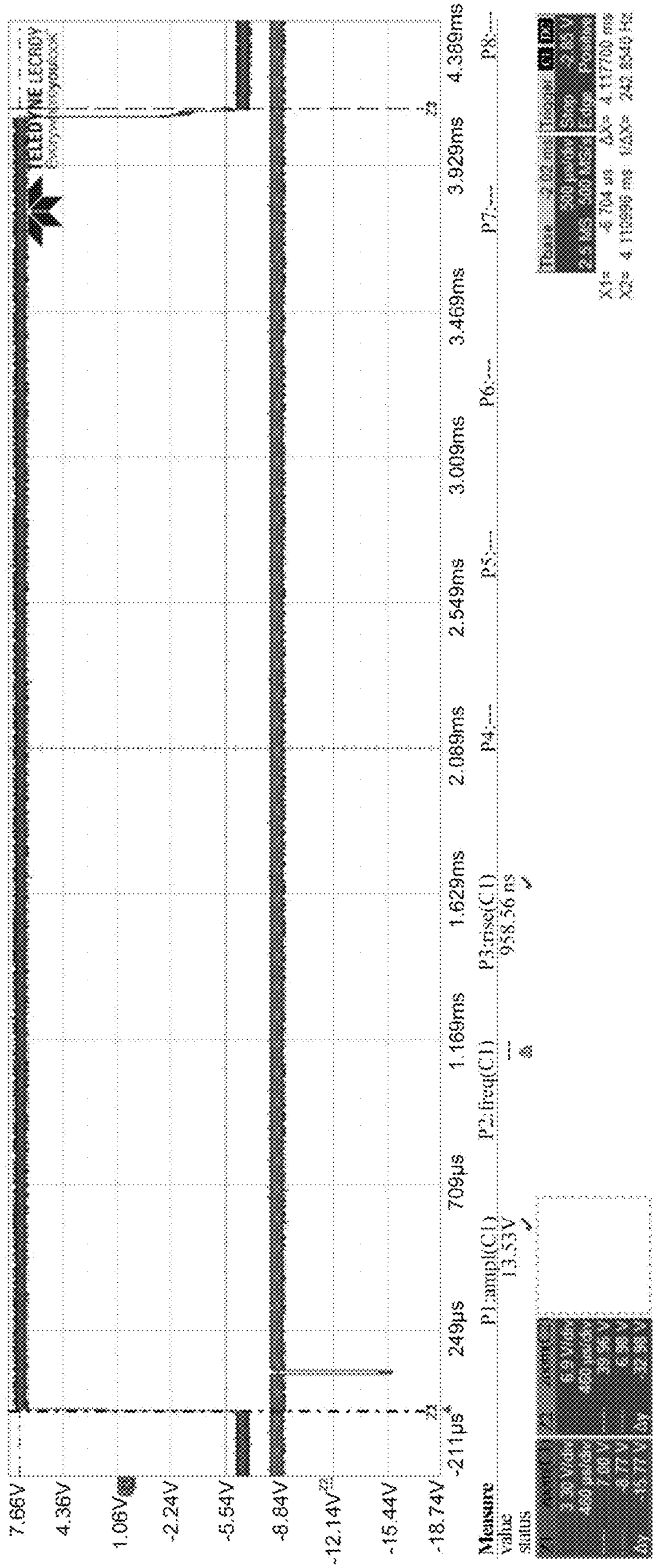
Figure 31:
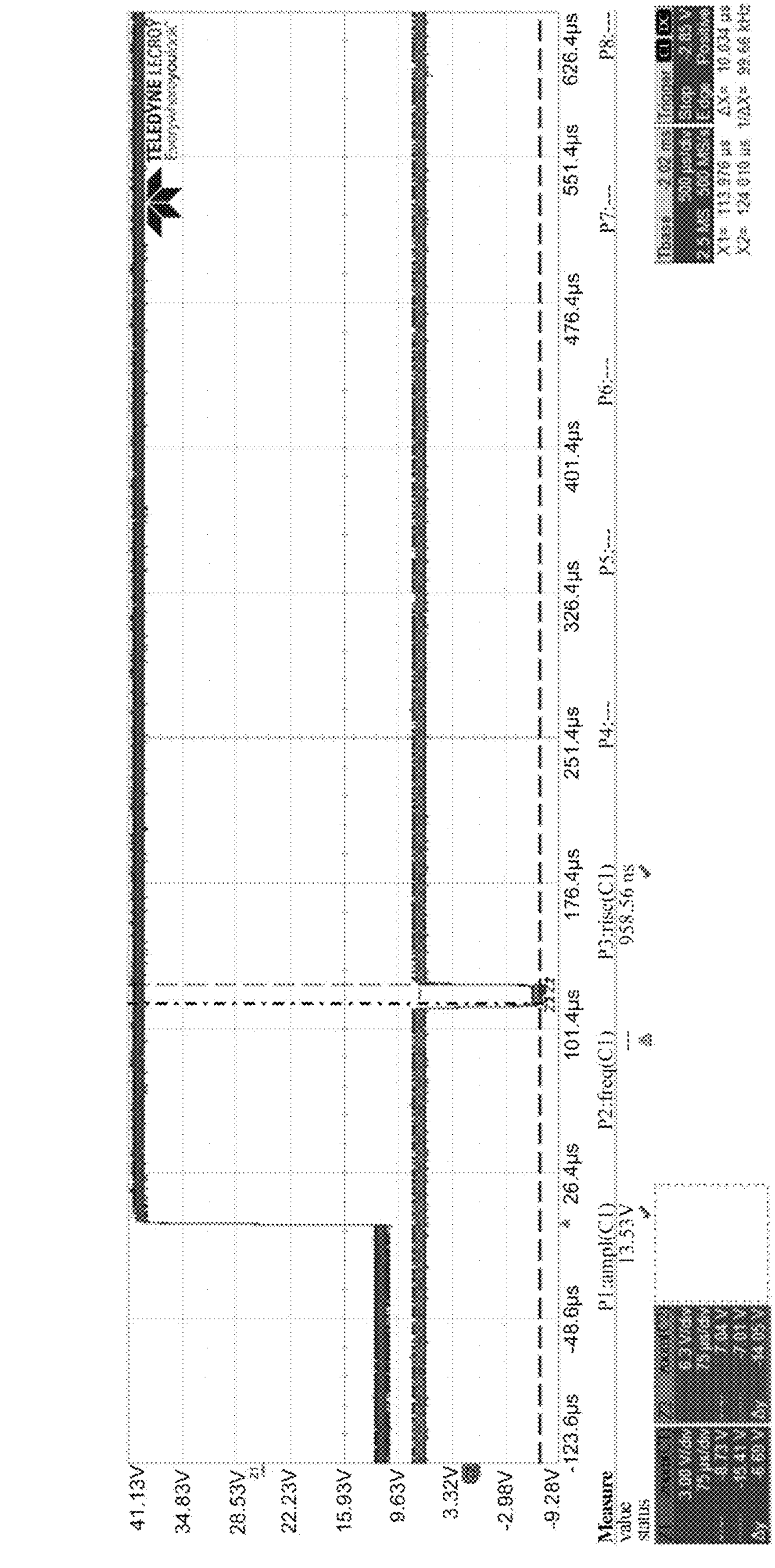
Figure 32:
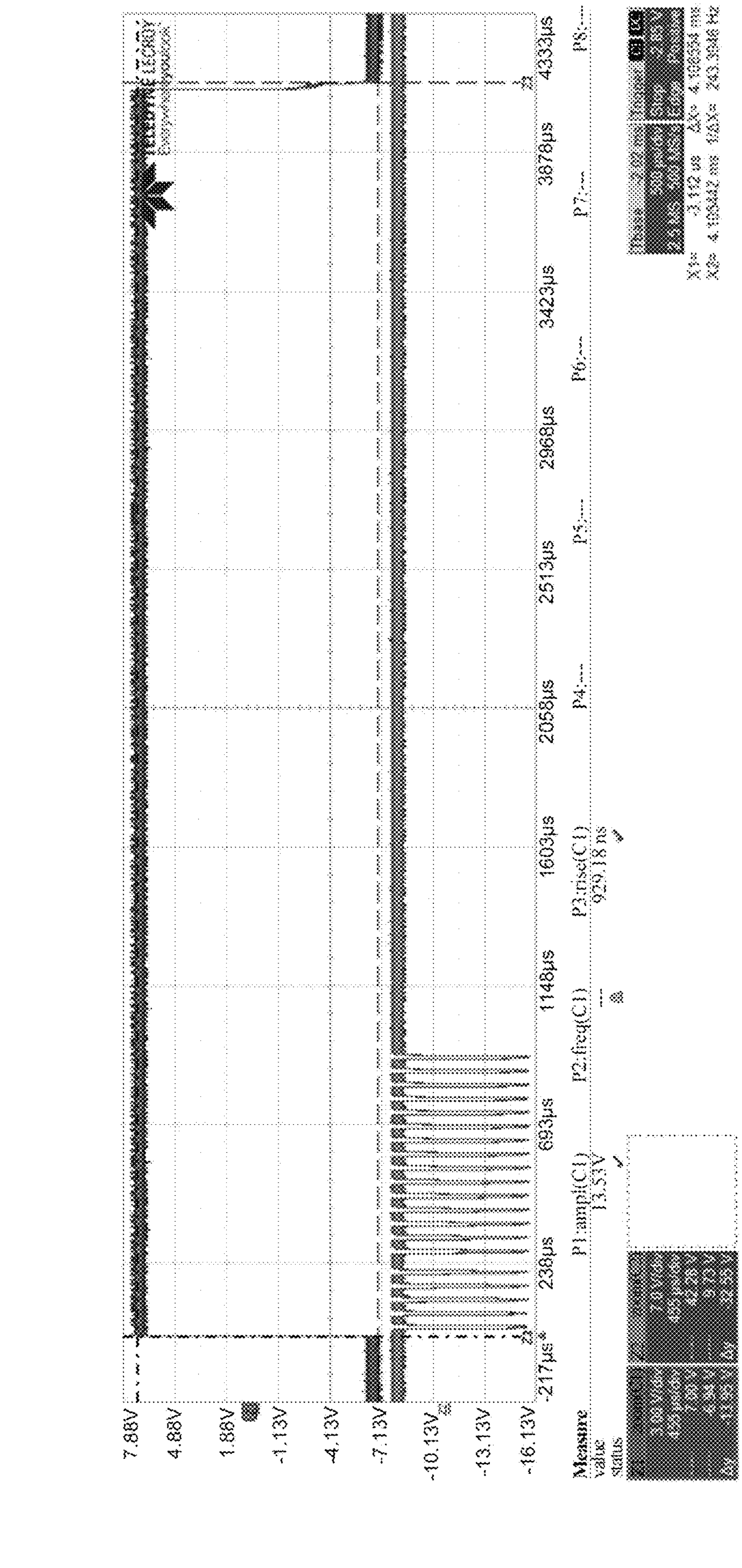
Figure 33:
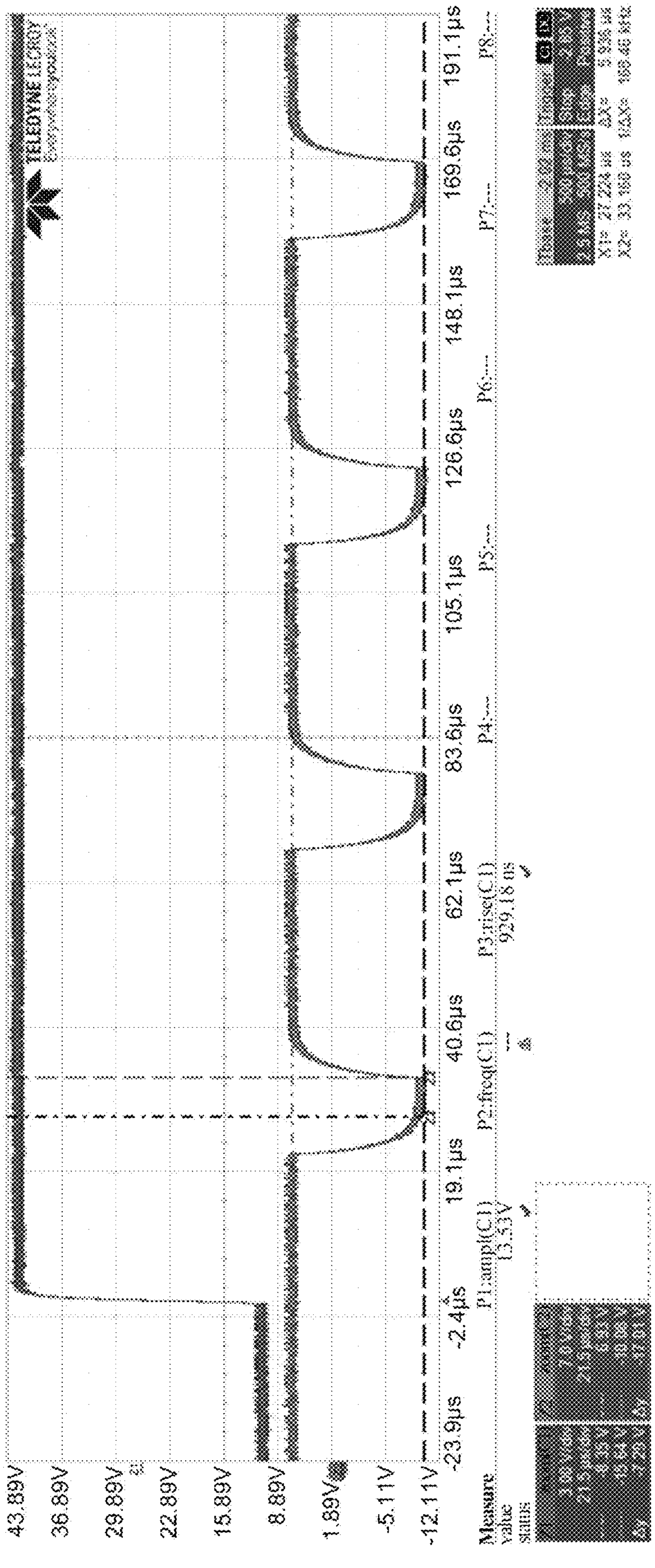

In an exemplary embodiment, FIGS. 28 to 33 are waveform graphs of output signals of driving circuits in accordance with an exemplary embodiment. A duty cycle of a driving current being 75% is illustrated in FIGS. 28 to 33 as an example. As shown in FIGS. 28 and 29, what's in the upper portion is a waveform graph of an output signal of a light emitting driving circuit, and what's in the lower portion is a waveform graph of an output signal of a scan driving circuit, wherein FIG. 29 is an enlarged view of FIG. 28. As shown in FIGS. 30 and 31, what's in the upper portion is a waveform graph of an output signal of a light emitting driving circuit, and what's in the lower portion is a waveform graph of an output signal of a reset driving circuit, wherein FIG. 31 is an enlarged view of FIG. 30. As shown in FIGS. 32 and 33, what's in the upper portion is a waveform graph of an output signal of a light emitting driving circuit, and what's in the lower portion is a waveform graph of an output signal of a driving circuit which can output pulse voltages, wherein FIG. 33 is an enlarged view of FIG. 32.

The embodiments of the present disclosure further provide a display device including a display panel.

In an exemplary embodiment, the display device may be any product or component with any display function, such as a display, a television, a mobile phone, a tablet computer, a navigator, a digital photo frame and a wearable display product.

The display panel is the display panel in accordance with any one of the preceding embodiments, and their implementation principles and implementation effects are similar, and will not be repeated herein.

The accompanying drawings of the present disclosure relate only to the structures involved in the embodiments of the present disclosure, and the other structures may be understood with reference to conventional designs.

For the sake of clarity, the thickness and size of a layer or a micro structure is enlarged in the accompanying drawings used to describe the embodiments of the present disclosure.

It can be understood that when an element such as a layer, film, region or substrate is described as being "on" or "under" another element, this element can be "directly" located "on" or "under" the other element, or an intermediate element may exist.

Although the embodiments disclosed in the present disclosure are described as above, the described contents are only implementations which are used in order to facilitate understanding of the present disclosure, and are not intended to limit the present disclosure. Any skilled person in the art to which the present disclosure pertains can make any modifications and alterations in forms and details of implementation without departing from the spirit and scope of the present disclosure. However, the patent protection scope of the present disclosure should be subject to the scope defined by the appended claims.

The invention claimed is:

1. A display panel comprising a display area and a non-display area, wherein the display area comprises pixel units arranged in array, at least one of the pixel units comprises a sub-pixel of a first color, a sub-pixel of a second color and a sub-pixel of a third color, the first color, the second color and the third color are different colors, at least one sub-pixel comprises a pixel circuit and a light emitting element, and the pixel circuit is connected to an anode of the light emitting element; the non-display area comprises an anode voltage driving circuit connected to a sub-pixel and configured to provide an anode voltage control signal to a pixel circuit of the connected sub-pixel to provide a voltage signal to the anode of the light emitting element;

the anode voltage driving circuit comprises K anode voltage driving sub-circuits arranged along a row direction; and each of the anode voltage driving sub-circuits is connected to sub-pixels of at least one color, and different anode voltage driving sub-circuits are connected to sub-pixels of different colors, K being a positive integer greater than or equal to 2;

wherein the display area further comprises 3N column of data signal lines, M rows of scan signal lines, M rows of reset signal lines and M rows of initial voltage lines, wherein M is the total number of rows of pixel units and N is the total number of columns of pixel units;

the pixel circuit comprises a first transistor to a seventh transistor and a storage capacitor;

a control electrode of the first transistor is connected to a reset signal terminal, a first electrode of the first transistor is connected to an initial voltage terminal, a second electrode of the first transistor is connected to a second node, a control electrode of the second transistor is connected to a scan signal terminal, a first electrode of the second transistor is connected to the second node, and a second electrode of the second transistor is connected to a third node; a control electrode of the third transistor is connected to the second node, a first electrode of the third transistor is connected to a first node, and a second electrode of the third transistor is connected to the third node; a control electrode of the fourth transistor is connected to the scan signal terminal, a first electrode of the fourth transistor is connected to a data signal terminal, and a second electrode of the fourth transistor is connected to the first node; a control electrode of the fifth transistor is connected to a light emitting signal terminal, a first electrode of the fifth transistor is connected to a first power terminal, and a second electrode of the fifth transistor is connected to the first node; a control electrode of the sixth transistor is connected to the light emitting signal terminal, a first electrode of the sixth transistor is connected to the third node, and a second electrode of the sixth transistor is connected to the light emitting element; a control electrode of the seventh transistor is connected to an anode voltage control terminal, a first electrode of the seventh transistor is connected to an anode voltage signal terminal, a second electrode of the seventh transistor is connected to the anode of the light emitting element, a first end of the storage capacitor is connected to the first power terminal, and a second end of the storage capacitor is connected to the second node; and for a pixel circuit of a sub-pixel in row i and column j, the data signal terminal is connected to a data signal line in column j, the scan signal terminal is connected to a scan signal line in row i, the reset signal terminal is connected to a reset signal line in row i, and the initial voltage terminal is connected to an initial voltage line in row i, $1 \le i \le M$, $1 \le j \le 3N$.

2. The display panel according to claim 1, wherein when K=2, the K anode voltage driving sub-circuits are respectively a first anode voltage driving sub-circuit and a second anode voltage driving sub-circuit; the first anode voltage driving sub-circuit comprises M cascaded first anode voltage driving shift registers, and the second anode voltage driving sub-circuit comprises M cascaded second anode voltage driving shift registers; the display area further comprises 2M rows of anode voltage control lines and 2M rows of anode voltage signal lines;

an anode voltage control line in row 2i-1 is connected to a first anode voltage driving shift register at stage i, and is connected to anode voltage control terminals of pixel circuits of sub-pixels of the first color and sub-pixels of the second color located in row i;

an anode voltage control line in row 2i is connected to a second anode voltage driving shift register at stage i, and is connected to anode voltage control terminals of pixel circuits of sub-pixels of the third color located in row i;

an anode voltage signal line in row 2i-1 is connected to anode voltage signal terminals of the pixel circuits of the sub-pixels of the first color and the sub-pixels of the second color located in row i; and an anode voltage signal line in row 2i is connected to anode voltage signal terminals of pixel circuits of sub-pixels of the third color located in row i.

3. The display panel according to claim 2, wherein when the sub-pixels are displayed, a driving mode of each sub-pixel comprises a first driving mode, a second driving mode and a third driving mode;

when the driving mode of the sub-pixel is the first driving mode, the pixel circuit is configured to apply a driving current to the light emitting element continuously;

when the driving mode of the sub-pixel is the second driving mode, the pixel circuit is configured to apply a driving current to the light emitting element periodically, and stop applying the driving current during a time interval between any two adjacent applications of the driving current;

when the driving mode of the sub-pixel is the third driving mode, the pixel circuit is configured to apply a driving current to the light emitting element periodically, and to provide a negative bias voltage signal to the anode of the light emitting element during a time interval between any two adjacent applications of the driving current to cause the light emitting element not to emit light; and driving modes of sub-pixels connected to the same anode voltage driving shift register are the same.

4. The display panel according to claim 3, wherein when K=2, the driving modes of a sub-pixel of the first color and a sub-pixel of the second color are the same; the driving modes of the sub-pixel of the first color and the sub-pixel of the third color are different or the same; and when the driving modes of the sub-pixel of the first color and the sub-pixel of the third color located in row i are the same, a second duty cycle of an anode voltage control signal outputted by the first anode voltage driving shift register at stage i is different from a second duty cycle of an anode voltage control signal outputted by the second anode voltage driving shift register at stage i, and/or a voltage of a signal provided from the anode voltage signal line in row 2i-1 is different from a voltage of a signal provided from the anode voltage signal line in row 2i, wherein the second duty cycle is a ratio of a duration in which the anode voltage control signal is an inactive-level signal to second time, and the second time is the sum of the duration in which the anode voltage control signal is the inactive-level signal and a duration in which the anode voltage control signal is an active-level signal.

5. The display panel according to claim 4, wherein the non-display area further comprises a scan driving circuit, a reset driving circuit and a light emitting driving circuit;

the scan driving circuit is connected to a sub-pixel and configured to provide a scan control signal to a pixel circuit of the connected sub-pixel to provide a data signal to the first node, the reset driving circuit is connected to a sub-pixel and configured to provide a reset control signal to a pixel circuit of the connected sub-pixel to reset the second node, and the light emitting driving circuit is connected to a sub-pixel and configured to provide a light emitting control signal to a pixel circuit of the connected sub-pixel to provide a driving current to the light emitting element;

the light emitting driving circuit is located at one side of the display area, the scan driving circuit is located at one side of the light emitting driving circuit close to the display area, and the anode voltage driving circuit and the reset driving circuit are respectively located between the light emitting driving circuit and the scan driving circuit and between the scan driving circuit and the display area;

the scan driving circuit comprises M cascaded scan shift registers, a scan shift register at stage i being connected to the scan signal line in row i; and the reset driving circuit comprises M cascaded reset shift registers, a reset shift register at stage i being connected to a reset signal line in row i.

6. The display panel according to claim 5, wherein the light emitting driving circuit comprises M cascaded first light emitting shift registers, and the display area further comprises M rows of light emitting signal lines; and a light emitting signal line in row i is connected to a first light emitting shift register at stage i, and is connected to light emitting signal terminals of all sub-pixels located in row i.

7. The display panel according to claim 6, wherein the anode voltage driving shift register comprises M1 bias transistors and M2 bias capacitors, and the anode voltage driving shift register comprises a first anode voltage driving shift register, a second anode voltage driving shift register or a third anode voltage driving shift register;

the light emitting shift register comprises M3 light emitting transistors and M4 light emitting capacitors, and the light emitting shift register comprises a first light emitting shift register, a second light emitting shift register or a third light emitting shift register;

each scan shift register comprises M5 scan transistors and M6 scan capacitors; each reset shift register comprises M5 reset transistors and M6 reset capacitors; a way to connect the M5 scan transistors with the M6 scan capacitors is the same as a way to connect the M5 reset transistors with the M6 reset capacitors, wherein M3 is not equal to M5 and M4 is not equal to M6;

M1 and M2 satisfy: M1=M5 and M2=M6 or M1=M3 and M2-M4;

when M1=M5 and M2-M6, a way to connect the M1 bias transistors with the M2 bias capacitors is the same as the way to connect the M5 scan transistors with the M6 scan capacitors; and when M1=M3 and M2=M4, the way to connect the M1 bias transistors with the M2 bias capacitors is the same as a way to connect the M3 light emitting transistors with the M4 light emitting capacitors.

8. The display panel according to claim 7, wherein for each sub-pixel, when M1=M3 and M2=M4, a difference between the duration in which the signals of the light emitting signal terminal are the inactive-level signals and the duration in which the signals of the anode voltage control terminal are the active-level signals is less than a threshold time difference, and the duration in which the signals of the anode voltage control terminal are the active-level signals is greater than a duration in which signals of the scan signal terminal are active-level signals.

9. The display panel according to claim 7, wherein for each sub-pixel, when M1=M5 and M2=M6, a difference between the duration in which the signals of the light emitting signal terminal are the inactive-level signals and the duration in which the signals of the anode voltage control terminal are the active-level signals is greater than the threshold time difference, and the duration in which the signals of the anode voltage control terminal are the active-level signals is equal to the duration in which the signals of the scan signal terminal are active-level signals.

10. The display panel according to claim 5, wherein the light emitting driving circuit comprises K light emitting driving sub-circuits arranged along the row direction;

when K=2, the K light emitting driving sub-circuits are respectively a first light emitting driving sub-circuit and a second light emitting driving sub-circuit; the first light emitting driving sub-circuit comprises M cascaded first light emitting shift registers, and the second light emitting driving sub-circuit comprises M cascaded second light emitting shift registers;

the display area further comprises 2M rows of light emitting signal lines;

a light emitting signal line in row 2i-1 is connected to a first light emitting shift register at stage i, and is connected to light emitting signal terminals of the pixel circuits of the sub-pixels of the first color and the sub-pixels of the second color located in row i;

a light emitting signal line in row 2i is connected to a second light emitting shift register at stage i, and is connected to light emitting signal terminals of the pixel circuits of the sub-pixels of the third color located in row i;

a first duty cycle of a light emitting control signal outputted by the first light emitting shift register at stage i is different from a first duty cycle of a light emitting control signal outputted by the second light emitting shift register at stage i, wherein the first duty cycle is a ratio of a duration in which the light emitting control signal is an active-level signal to first time, and the first time is the sum of a duration in which the light emitting control signal is an inactive-level signal to the duration in which the light emitting control signal is the active-level signal;

when K=3, the K light emitting driving sub-circuits are respectively a first light emitting driving sub-circuit, a second light emitting driving sub-circuit and a third light emitting driving sub-circuit; the first light emitting driving sub-circuit comprises M cascaded first light emitting shift registers, the second light emitting driving sub-circuit comprises M cascaded second light emitting shift registers, and the third light emitting driving sub-circuit comprises M cascaded third light emitting shift registers; the display area further comprises 3M rows of light emitting signal lines;

a light emitting signal line in row 3i-2 is connected to a first light emitting shift register at stage i, and is connected to light emitting signal terminals of the pixel circuits of the sub-pixels of the first color located in row i;

a light emitting signal line in row 3i-1 is connected to a second light emitting shift register at stage i, and is connected to light emitting signal terminals of the pixel circuits of the sub-pixels of the second color located in row i;

a light emitting signal line in row 3i is connected to a third light emitting shift register at stage i, and is connected to light emitting signal terminals of the pixel circuits of the sub-pixels of the third color located in row i; and first duty cycles of light emitting control signals outputted by the first light emitting shift register at stage i, the second light emitting shift register at stage i and the third light emitting shift register at stage i are different.

11. The display panel according to claim 10, wherein the sum of the first duty cycle and the second duty cycle is less than 1; and the first duty cycle is about 30% to 99%.

12. The display panel according to claim 5, wherein the non-display area further comprises a timing controller; an image displayed by the display panel comprises N frames;

the timing controller is configured to provide a driving signal to a driving circuit to cause the same sub-pixel to implement switching between different driving modes within different frames; and the driving circuits comprise the anode voltage driving circuit, the light emitting driving circuit, the scan driving circuit and the reset driving circuit.

13. The display panel according to claim 4, wherein a value of the voltage of the signal provided from the anode voltage signal line is about −0.1 volts to −10 volts, and the value of the voltage of the signal provided from the anode voltage signal line is less than a reverse breakdown voltage of the light emitting element.

14. The display panel according to claim 3, wherein when K=3, the driving modes of at least two of a sub-pixel of the first color, a sub-pixel of the second color and a sub-pixel of the third color are different or the driving modes of the sub-pixel of the first color, the sub-pixel of the second color and the sub-pixel of the third color are the same; and when the driving modes of the sub-pixels of the three colors located in row i are the same, second duty cycles of at least two of anode voltage control signals outputted by the first anode voltage driving shift register at stage i, the second anode voltage driving shift register at stage i and the third anode voltage driving shift register at stage i are different, and/or voltages of at least two of signals provided from the anode voltage signal line in row 3i-2, the anode voltage signal line in row 3i-1 and the anode voltage signal line in row 3i are different, wherein the second duty cycle is a ratio of a duration in which the anode voltage control signal is an inactive-level signal to second time, and the second time is the sum of the duration in which the anode voltage control signal is the inactive-level signal and a duration in which the anode voltage control signal is an active-level signal.

15. The display panel according to claim 3, wherein when the driving mode of the sub-pixel is the second driving mode or the third driving mode, a frequency at which the pixel circuit applies the driving current to the light emitting element is about 1 Hz to 360 Hz.

16. The display panel according to claim 3, wherein for the pixel circuit of each sub-pixel, when signals of the light emitting signal terminal are active-level signals, signals of the anode voltage control terminal are inactive-level signals, and when the signals of the anode voltage control terminal are active-level signals, the signals of the light emitting signal terminal are inactive-level signals; a duration in which the signals of the light emitting signal terminal are the inactive-level signal is greater than a duration in which the signals of the anode voltage control terminal are the active-level signal.

17. The display panel according to claim 3, wherein a working process of the pixel circuit comprises a light emitting stage and a non-light emitting stage; when signals of the light emitting signal terminal are active-level signals, the pixel circuit is in the light emitting stage, and when signals of the light emitting signal terminal are inactive-level signals, the pixel circuit is in the non-light emitting stage;

when the driving mode of the sub-pixel is the second driving mode or the third driving mode, the non-light emitting stage includes a first non-light emitting sub-stage and a plurality of second non-light emitting sub-stages, the light emitting stage includes a plurality of light emitting sub-stages, the first non-light emitting sub-stage occurs before the light emitting stage, and the second non-light emitting sub-stages occur between adjacent light emitting sub-stages;

the light-emitting sub-stages are divided into L first periods of time, and the second non-light emitting sub-stages are divided into L second periods of time; the signals of the anode voltage control terminal in the second non-light emitting sub-stages are active-level signals;

for the m-th light emitting sub-stage and the n-th second non-light emitting sub-stage, the s-th second period of time occurs between the s-th first period of time and the (s+1)-th first period of time, and the t-th first period of time occurs between the (t−1)-th second period of time and the (s+1)-th second period of time, $1 \le m \le Q$, $1 \le s < L$, $1 < t \le L$, and Q being the number of light emitting sub-stages.

18. The display panel according to claim 1, wherein when K=3, the K anode voltage driving sub-circuits are respectively a first anode voltage driving sub-circuit, a second anode voltage driving sub-circuit and a third anode voltage driving sub-circuit; the first anode voltage driving sub-circuit comprises M cascaded first anode voltage driving shift registers, the second anode voltage driving sub-circuit comprises M cascaded second anode voltage driving shift registers, and the third anode voltage driving sub-circuit comprises M cascaded third anode voltage driving shift registers; the display area further comprises 3M rows of anode voltage control lines and 3M rows of anode voltage signal lines;

an anode voltage control line in row 3i-2 is connected to the first anode voltage driving shift register at stage i, and is connected to the anode voltage control terminals of the pixel circuits of the sub-pixels of the first color located in row i;

an anode voltage control line in row 3i-1 is connected to the second anode voltage driving shift register at stage i, and is connected to the anode voltage control terminals of the pixel circuits of the sub-pixels of the second color located in row i;

an anode voltage control line in row 3i is connected to a third anode voltage driving shift register at stage i, and is connected to the anode voltage control terminals of the pixel circuits of the sub-pixels of the third color located in row i;

an anode voltage signal line in row 3i-2 is connected to the anode voltage signal terminals of the pixel circuits of the sub-pixels of the first color located in row i;

an anode voltage signal line in row 3i-1 is connected to the anode voltage signal terminals of the pixel circuits of the sub-pixels of the second color located in row i; and an anode voltage signal line in row 3i is connected to the anode voltage signal terminals of the pixel circuits of the sub-pixels of the third color located in row i.

19. A display device comprising the display panel according to claim 1.

* * * * *